United States Patent [19]

Asakura et al.

[11] Patent Number: 4,958,175
[45] Date of Patent: Sep. 18, 1990

[54] MOTOR DRIVEN CAMERA

[75] Inventors: Yasuo Asakura; Toshiyuki Toyofuku, both of Hachioji; Yuji Imai, Higashiyamoto, all of Japan

[73] Assignee: Olympus Optical Co., Ltd., Japan

[21] Appl. No.: 311,634

[22] Filed: Feb. 16, 1989

[30] Foreign Application Priority Data

| Feb. 18, 1988 | [JP] | Japan | 63-35527 |
| Feb. 18, 1988 | [JP] | Japan | 63-35528 |
| Jul. 8, 1988 | [JP] | Japan | 63-170251 |
| Aug. 30, 1988 | [JP] | Japan | 63-215380 |

[51] Int. Cl.$^5$ ............................................. G03B 1/12
[52] U.S. Cl. ........................... 354/152; 354/173.1; 354/234.1; 354/484
[58] Field of Search ................ 354/484, 152, 173.1, 354/173.11, 234.1

[56] References Cited

U.S. PATENT DOCUMENTS

| 4,429,975 | 2/1984 | Shioyawa et al. | 354/202 |
| 4,615,600 | 10/1986 | Nakajima et al. | 354/451 |
| 4,616,913 | 10/1986 | Suzuki et al. | 354/173.1 |
| 4,647,169 | 3/1987 | Suzuki et al. | 354/173.1 |
| 4,816,851 | 3/1989 | Fukohori et al. | 354/173.1 |

FOREIGN PATENT DOCUMENTS 53-141615 12/1978 Japan.
62-129533 8/1987 Japan.

*Primary Examiner*—Michael L. Gellner
*Attorney, Agent, or Firm*—Louis Weinstein

[57] ABSTRACT

A motor driven camera includes a plurality of motors for independently driving individual actuators of a camera such as film winder, shutter charger, a drive associated with a movable reflecting mirror and diaphragm driver. In addition, the camera includes a storage battery, a drive circuit for feeding the power from the battery to the plurality of motors, and a controller which controls the drive circuit. In accordance with the invention, a film winding rate or the rotational speed of a motor which performs a shutter charging operation or the speed of operation of the movable reflecting mirror or the voltage of the power supply is detected, and the plurality of motors are automatically switched between the concurrent drive and the sequential drive in accordance with the detected value. Subsequent to the switching, either drive to which the operation is switched is maintained.

35 Claims, 34 Drawing Sheets

FIG. 13A  FIG. 13B
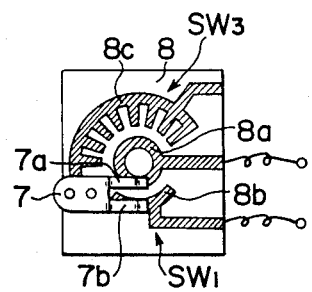
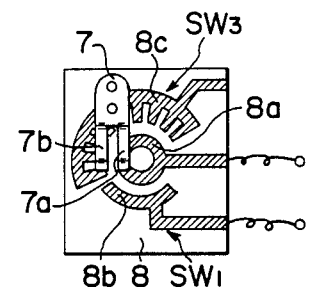
FIG. 14A  FIG. 14B
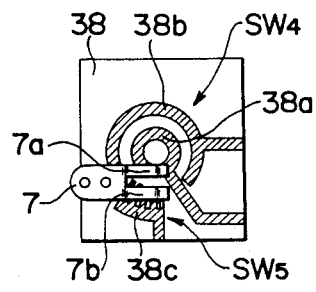
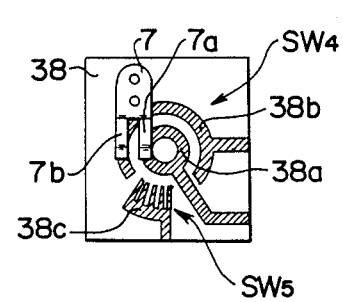
FIG. 15
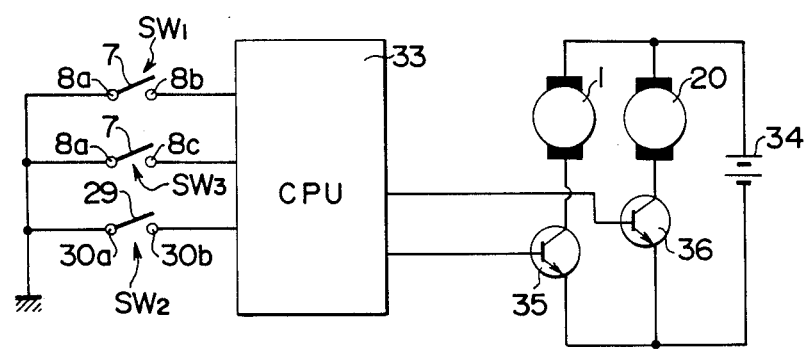

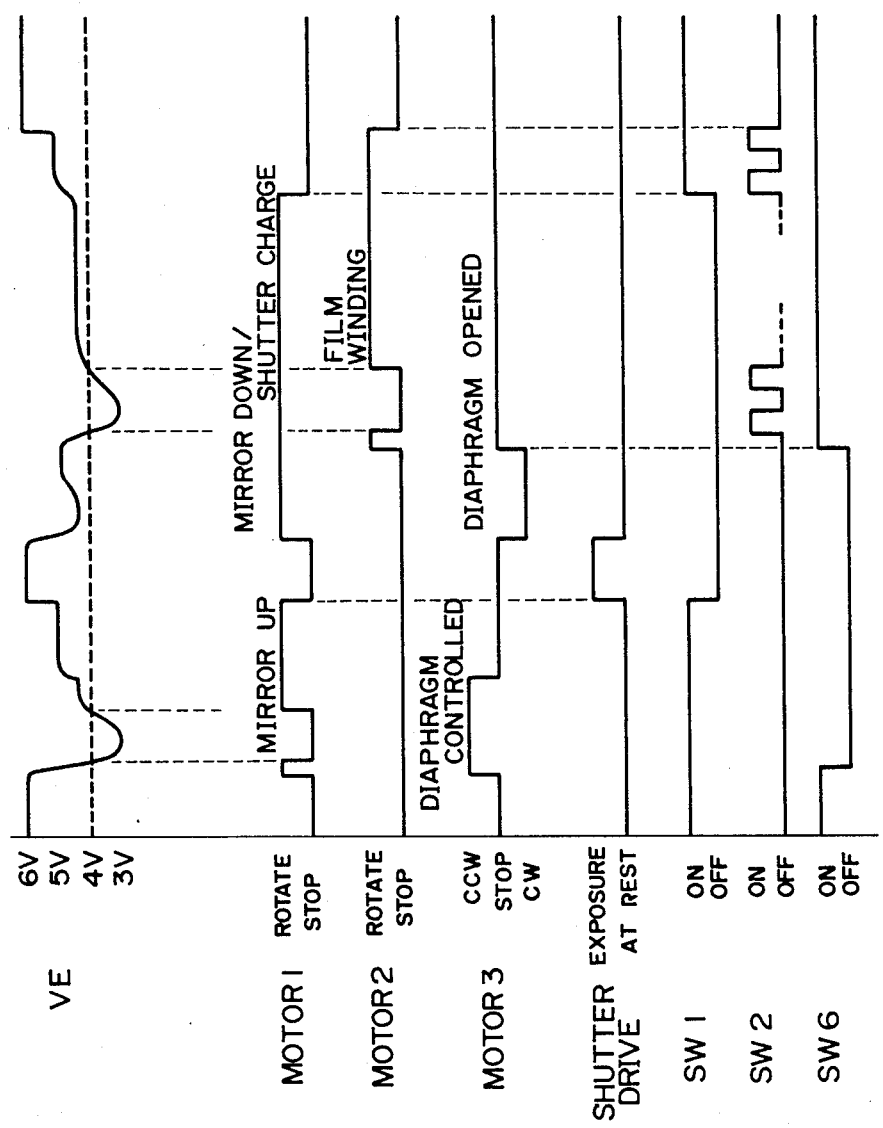

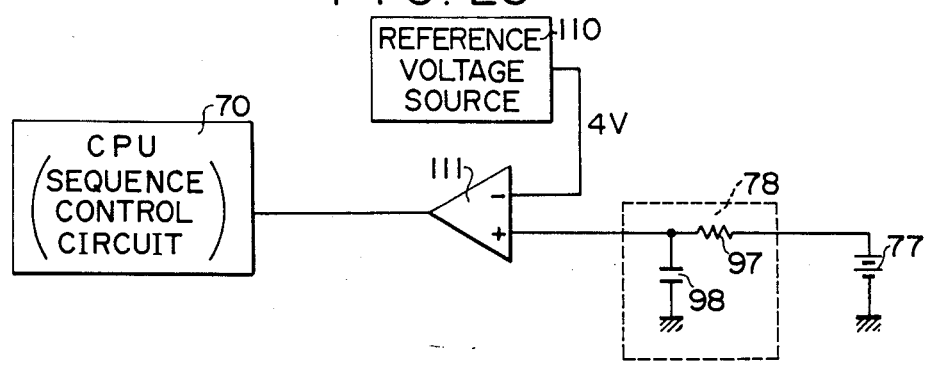
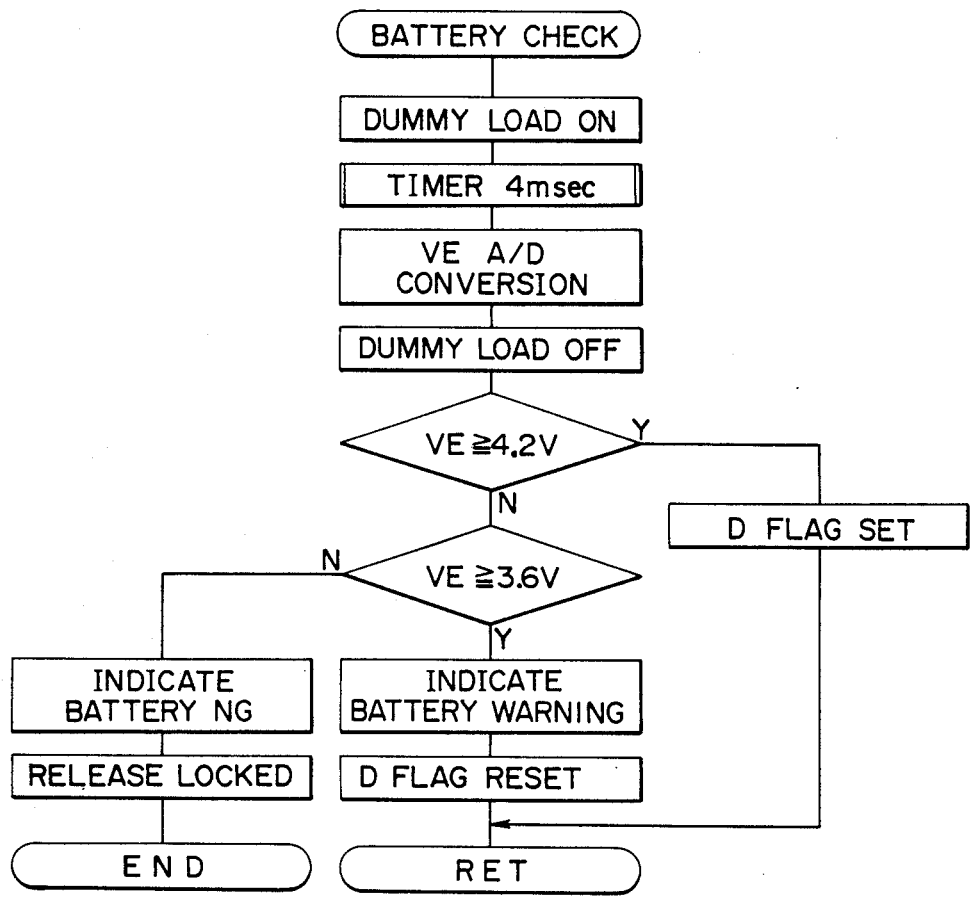

MOTOR DRIVEN CAMERA

FIELD OF THE INVENTION AND RELATED ART STATEMENT

The invention relates to a motor driven camera, or more particularly, to a camera in which a plurality of respective devoted motors are employed to achieve a film winding operation, a shutter charging operation, a displacement of a movable mirror or a drive of a diaphragm mechanism.

A motorization is increasingly employed in recent cameras, and in a single lens reflex camera, a film winding operation, a shutter charging operation and a displacement of a mirror take place automatically by means of internally housed motors of the camera.

There are a variety of motor driven cameras including one disclosed in Japanese Laid-Open Patent Application No. 141,615/1978 in which a single motor internally housed within a camera is used to achieve a film winding operation and a shutter charging operation, another disclosed in Japanese Laid-Open Patent Application No. 194,433/1985 in which a single motor internally housed within a camera is associated with two reduction gear trains which are selectively operated to achieve a film winding operation and a shutter charging operation, by switching the direction of rotation of the motor in accordance with the condition of a supply battery and a load condition, and a further one disclosed in Japanese Laid-Open Patent Application No. 254,028/1985 in which a film winding operation and a shutter charging operation are performed by independent motors.

Additionally, Japanese Laid-Open Patent Application No. 195,230/1982 discloses a drive for a camera including an external power supply which may be mounted on a camera, enabling different operational sequences to be used for a pair of motors when the drive is connected to a power supply internally housed within a camera or when it is connected to an external power supply.

In a technique as disclosed in Japanese Laid-Open Patent Application No. 141,615/1978 in which a single motor is required to drive an increased load such as a film winding and a shutter charging simultaneously, it will be seen that a greater output is required of the motor as well as a high speed drive, thus representing an increased power dissipation of the motor. If the storage battery which is employed as the power supply is a fresh one, or when the environment temperature in which it is used is high, it will be fully capable of feeding the electric power, but when the battery is exhausted to a degree or when the internal resistance of the battery increases as a result of a degradation caused by low temperatures, the battery will be unable to feed sufficient power. As a consequence, a number of photographic films on which pictures can be taken will be reduced without changing the battery.

When two gear trains are provided to cooperate with a single motor as disclosed in Japanese Laid-Open Patent Applications No. 194,433/1985 or No. 254,028/1985 in order to accommodate for the described difficulty, a high speed drive can be accomplished when the storage battery is a fresh one and the load applied is low, while enabling the full functioning by changing the gear train in response to a degradation of the battery or an increase in the load applied. On the contrary, this arrangement suffers from a disadvantage that an increased size of the camera is unavoidable as a result of the provision of the two gear trains.

With the technique disclosed in Japanese Laid-Open Patent Application No. 195,230/1982, the use of different drive sequences between the choice of an internally housed battery and an external power supply permits a proper sequence to be selected in accordance with the supply capability. However, it is to be noted that the selection of the drive sequence is not made in accordance with the partial exhaustion of the storage battery, a change in the supply capability which results from temperature fluctuations or the magnitude of a load applied. Additionally, in this arrangement, where a high speed drive is required, it becomes necessary to use an external supply, resulting in an increased size of the camera.

Considering the power required to drive various operating mechanisms housed within a camera, it will be noted that a power of substantially increased magnitude is required for a film winding operation and a shutter charging operation as compared with the operation of other operating mechanisms. In particular, a film winding operation is greatly influenced by the temperature, causing an increased loading when the temperature is reduced. For example, at a temperature of $-20°$ C., a hardening of the film causes the film winding load to be increased as much as three to five times that which prevails under normal temperatures. It is also recognized that the storage battery is greatly influenced by temperatures, and a storage battery having a sufficient capacity to prevent any reduction in the voltage output under normal temperatures may experience a reduction in the voltage output when it is used under a low temperature environment.

On the other hand, it is also to be noted that a single lens reflex camera which is recently offered on the market tends to require an increased power for a shutter charging operation as a result of the demand on increasing a shutter blind speed to achieve a high speed shutter operation.

In view of the foregoing observations, it will be seen that it is desirable to utilize devoted motors for the film winding operation and the shutter charging operation and that both motors may be selectively driven in concurrent (parallel) or a sequential (series) mode depending on the condition of the storage battery and the load applied.

Such demand is recently met by an arrangement disclosed in Japanese Laid-Open Utility Model Application No. 129,533/1987. Specifically, a motor driven film feeding apparatus for a camera disclosed therein is illustrated in FIG. 34. Specifically, upon completion of an exposure process as a result of a shutter operation, a drive initiate signal S3 assumes its H level. Concurrently, a drive control signal S1 from a control circuit 205 assumes its H level, whereby a storage battery 203 feeds both a shutter drive motor 201 and a film feeding motor 202 through a drive circuit 204.

As a shutter charging operation is initiated by the rotation of the shutter drive motor 201, a film winding operation is initiated by the rotation of the film feeding motor 202. During the time the film winding operation takes place, the feed rate is detected by a feed rate detector 206. When the speed detected is equal to or greater than a preselected reference value, a rate detect signal S2 assumes its H level, whereby the control circuit 205 operates to maintain the drive control signal S1 at its H level. Accordingly, in this instance, both motors 201 and 202 continue to be energized concurrently or in a parallel mode, thus continuing the film winding operation as well as the shutter charging operation.

On the other hand, if the film rate is less than the reference value, the rate detect signal S2 assumes its L level, whereby the control circuit 205 causes the drive control signal S1 to be driven to its L level. Thereupon, the drive circuit 204 delivers a drive initiate signal of an H level, which is effective to momentarily cease the parallel drive mode of both motors 201, 202 while continuing the energization of only the shutter drive motor 201. Accordingly, the motor 201 is effective to perform a shutter, a mirror or a diaphragm charging operation alone. At the time when such drive is complete, the film feeding motor 202 is driven again to perform a film winding operation. After a series of drive operations are complete, the arrangement returns to its initial condition in preparation for a next shutter release.

The use of such means enables a normal functioning of a camera by allowing a high speed drive when a film load is low or the storage battery exhibits no degradation in its performance while enabling a different operational sequence to be utilized in response to the detection of a film feed rate whenever the film load increases or in response to a degradation in the performance of the storage battery.

However, the use of such means requires the detection of a film feed rate as well as its associated calculating means, again causing an increased size of camera. In addition, the circuit arrangement becomes complex disadvantageously because it is necessary to detect the rate while simultaneously controlling and driving a plurality of actuators.

OBJECT AND SUMMARY OF THE INVENTION

It is a first object of the invention to eliminate the described inconveniences of the prior art as mentioned above. It is a second object of the invention to eliminate the described inconveniences by providing a motor driven camera including a pair of motors which are for devoted uses in the film winding operation and the shutter charging operation and in which a film winding rate is detected to provide a concurrent drive where the storage battery has a sufficient capacity and the magnitude of the load applied is low and to switch automatically to a sequential drive when the battery performance is degraded combined with an increased load wherein once the operation switches to a sequential drive, such drive is maintained subsequently.

It is a third object of the invention to provide a motor driven camera in which an operational sequence of the camera can be changed in accordance with a detected film winding rate.

It is a fourth object of the invention to provide a motor driven camera including a pair of motors for devoted uses in the film winding operation and the shutter charging operation and in which subsequent to a shutter operation, a motor which is devoted for the shutter charging operation is initially driven, followed by a concurrent drive by driving another motor which is devoted for the film winding operation also in response to a detected rotational speed of the first mentioned motor, indicating that the storage battery has a sufficient capacity and a load applied is low, while if the battery performance is degraded concurrently with an increased load, an automatic switching takes place to a sequential drive in which the film winding motor is driven upon completion of the shutter charging operation and wherein once the sequential drive is entered, such drive is subsequently maintained.

It is a fifth object of the invention to provide a motor driven camera including a pair of motors which are devoted for a film winding operation and a combined shutter charging and a mirror driving function, respectively, and in which the speed of operation of the mirror is detected during its upward or downward movement for comparison against a given value in order to determine a choice between a concurrent or sequential drive of the motors.

It is a sixth object of the invention to provide a motor driven camera which is capable of selecting a particular drive sequence taking into consideration varying factors such as the degree of exhaustion of a storage battery, a temperature fluctuation, a variation in the power supply capability and a load condition.

It is a seventh object of the invention to provide a motor driven camera which selects among a plurality of motor operating sequences, by utilizing timer means which determines a time duration from the initiation of energization of a motor.

BRIEF DESCRIPTION OF THE DRAWINGS

FIGS. 13A and 13B are plan views, to an enlarged scale, illustrating the manner of operation of a shutter charging complete switch and a mirror speed detecting switch used in the second embodiment;

FIGS. 14A and 14B are enlarged plan views illustrating the manner of operation of a shutter charging complete switch and a mirror speed detecting switch which are used in a third embodiment of the invention;

FIG. 15 is a schematic view illustrating a relationship between motors, a shutter charging complete switch, a mirror speed detecting switch, a film winding rate detecting switch and associated control means;

FIGS. 25A, 25B and 25C are timing charts and a flow chart illustrating the operation of the motor driven camera according to the fourth embodiment;

FIG. 26 is a schematic view of a modification of the fourth embodiment, showing part of a motor driven camera according to a fifth embodiment;

FIG. 29 is a flow chart of the operation of a motor driven camera according to a seventh embodiment of the invention;

DETAILED DESCRIPTION OF PREFERRED EMBODIMENTS

Figure 1:
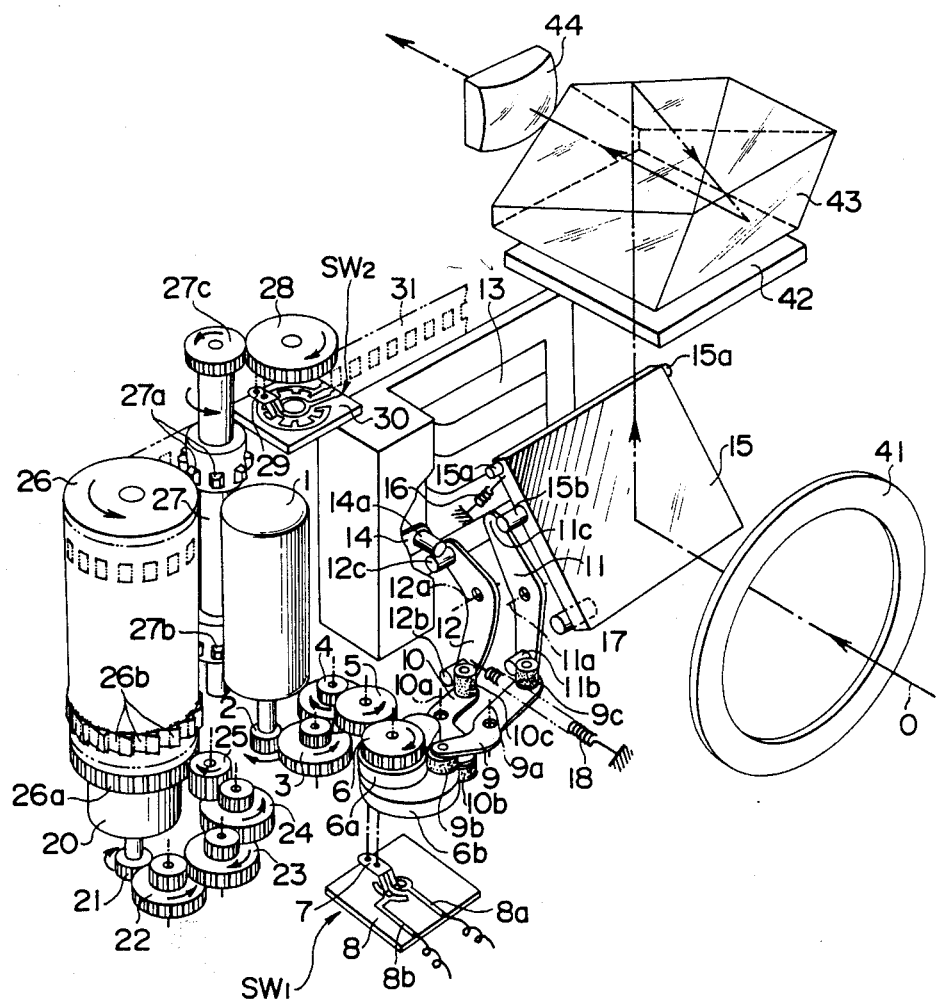
FIG. 1 is a perspective view of essential parts of a motor driven camera according to a first embodiment of the invention.

FIG. 1 shows a single lens reflex camera incorporating a running focal plane shutter to which the invention is applied. A camera body includes a lens mount 41 on which a taking lens, not shown, is mounted. Light passing through the taking lens enters the interior of the camera body, and is reflected upwardly by a movable reflecting mirror 15 which is disposed on a taking optical axis 0 at an angle of 45° for transmitting through and being diffused by a focussing screen. A light image from the screen 42 passes through a pentaprism 43 and an eyepiece 44 to be viewed as an erect image in a viewfinder.

A motor 1 is utilized to perform a shutter charging operation and a mirror drive. An output gear 2 comprising a pinion gear is fixedly mounted on the rotary shaft of the motor. Transmission gears 3 and 4 are each formed by a stepped gear having different diameters, and function to transmit the rotating drive from the output gear 2 to an intermediate gear 5 with a speed reduction. A cam drive gear 6 is in meshing engagement with the gear 5, and has a mirror driving disc cam 6a and a shutter charging disc cam 6b integrally mounted thereon. It carries a conductive contact 7 on its bottom surface which rotationally slides along a substrate 8. A first drive lever 9 is rotatably mounted on a shaft 9a which is laterally adjacent to the disc cam 6a. On its one arm, it rotatably carries a small roller 9b adjacent to the arm end for sliding movement along the cam surface of the mirror driving disc cam 6a. Another small roller 9c is rotatably mounted on the end of the other arm of the lever. A mirror drive lever 11 is rotatably mounted on a shaft 11a at a location laterally adjacent to the movable reflecting mirror 15, and fixedly carries a pin 11b on its lower end for abutment against the small roller 9c. As mentioned, the mirror 15 is disposed on the optical axis O so as to be pivotable upwardly about a pivot 15a. However, it is normally urged to its lower position shown by a mirror urging spring 16 which extends between the mirror and a stationary member, not shown, whereby it is maintained in abutment against a mirror positioning pin 17 when a viewfinder is being viewed. However, when the lever 11 rotates clockwise about its shaft 11a, its upper end 11c presses against a pin 15b which is fixedly mounted on the mirror 15 on its lateral side towards its top end, whereby the mirror 15 is driven upward.

A second drive lever 10 is rotatably mounted on a shaft 10a at a location laterally adjacent to the disc cam 6b. A small roller 10b is rotatably mounted on the end of one arm of the lever 10 for sliding movement along the cam surface of the shutter charging disc cam 6b. Another small roller 10c is rotatably mounted on the end of the other arm of the lever. A shutter charging lever 12 is rotatably mounted on a shaft 12a at a location adjacent to the mirror 15, and fixedly carries a pin 12b on its lower end for abutment against the roller 10c. A connecting pin 12c is fixedly mounted on the top end of the lever 12. A spring 18 of a reduced resilience extends between the lever 12 and a stationary member, not shown, for urging it to rotate counter-clockwise.

A running focal plane shutter 13 which is in itself known in the art is disposed rearwardly of the mirror 15. When the lever 12 rotates clockwise against the resilience of the spring 18, the pin 12c presses against the pin 14a fixedly mounted on the shutter charging member 14, whereby the shutter is charged.

A film take-up spool 26 has a film winding motor 20 disposed therein, with an output gear 21, formed by a pinion gear, fixedly mounted on its rotary shaft. Each of transmission gears 22, 23, 24 is formed by a stepped gear having different diameters, and serves to transmit the rotation of the output gear 21 to an intermediate gear 25 with a speed reduction. The gear 25 is in meshing engagement with a drive gear 26a mounted on the spool 26. The spool 26 is formed with a plurality of detent claws 26b around its outer periphery, so that as the spool 26 rotates, such claws engage perforations in a film 31 to wind it up. A follower sprocket shaft 27 has a pair of engaging pawls 27a, 27b which are adapted to engage perforations in the film 31, and a gear 27c mounted on its top end, the shaft 27 being rotated in synchronism with the movement of the film 31. A gear 28 meshes with the gear 27c and integrally carries a conductive contact 29 on its bottom surface for sliding along a substrate 30 as it rotates.

Figure 2A:
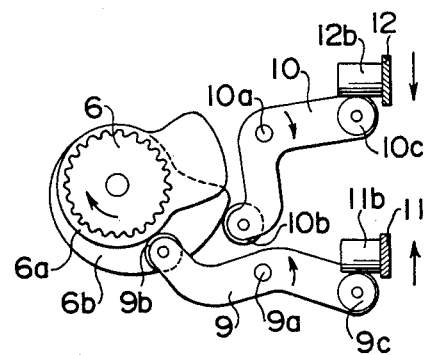
FIGS. 2A and 2B are plan views, to an enlarged scale, illustrating the manners of operation of a disc cam which drives a movable reflecting mirror and another disc cam which is used for shutter charging operation, respectively.
Figure 2B:
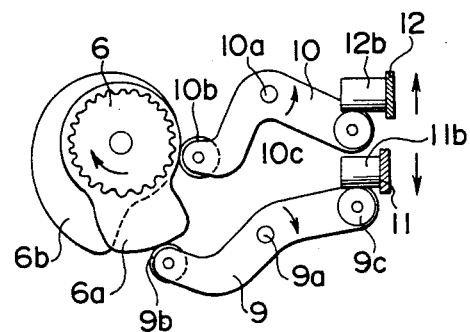

FIGS. 2A and 2B are enlarged views illustrating the operation of the disc cams 6a and 6b which are integrally mounted on the cam drive gear 6. FIG. 2A corresponds to a point in time when viewing a viewfinder before a shutter release takes place while FIG. 2B corresponds to a point in time when the mirror 15 has jumped upward to enable an exposure operation. In FIG. 2A, the first drive lever 9 has rotated clockwise under the tension of the mirror spring 16, and the roller 9b abuts against the disc cam 6a at its bottom dead center. Under this condition, the mirror 15 is positioned to enable a viewing of a viewfinder. On the other hand, the second drive lever 10 maintains a shutter charging complete condition as a result of its counterclockwise rotation since the roller 10b abuts against the disc cam 6b at its top dead center position.

If a release operation now takes place to cause the cam drive gear 6 to rotate in a direction indicated by an arrow, the disc cams 6a, 6b cause the levers 9, 10, 11 and 12 to rotate in respective directions indicated by arrows, which eventually reach a condition shown in FIG. 2B. The roller 9b now abuts against the disc cam 6a at its top dead center position where the mirror 15 has been raised against the resilience of the mirror spring 16, thus enabling a photographing operation. On the other hand, the second drive lever 10 has rotated clockwise under the tension of the spring 18 while the roller 10b abuts against the disc cam 6b at its bottom dead center position. Under this condition, the shutter 13 is ready to run. After the completion of running of the shutter blades in response to a shutter operation and when the cam drive gear 6 further rotates in a direction indicated by an associated arrow, the disc cams 6a, 6b cause the individual levers 9, 10, 11 and 12 to rotate in respective directions indicated by arrows as indicated in FIG. 2B, with the consequence that the shutter 13 is charged and the mirror 15 is brought down to resume the condition shown in FIG. 2A.

Figure 3A:
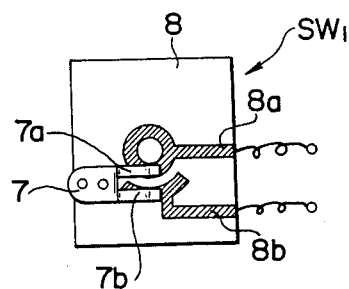
FIGS. 3A and 3B are plan views, to an enlarged scale, illustrating the manner of operation of a shutter charging complete switch.
Figure 3B:
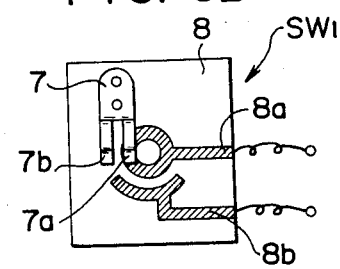

FIGS. 3A and 3B show the conductive contact 7 mounted on the cam drive gear 6 and the substrate 8 in detail. An annular conductive pattern 8a and an arcuate conductive pattern 8b are defined on the substrate 8, and are connected to control means (CPU) shown in FIG. 5. The conductive contact 7 has its free end shaped into a fork, with each tip being disposed for sliding contact with the respective conductive patterns on the substrate 8. One tip 7a is maintained in contact with the conductive pattern 8a as the gear 6 rotates. The other tip 7b of the conductive contact 7 is brought into contact with the conductive pattern 8b at a time when the shutter charging operation is complete, and is brought out of contact with the pattern 8b when the mirror 15 has completed its upward movement. FIG. 3A corresponds to a point in time when viewing a viewfinder before a shutter release, with the conductive patterns 8a and 8b being connected together by the conductive contact 7. FIG. 3B corresponds to a point in time when the mirror 15 has been brought up, enabling an exposure operation.

Figure 4:
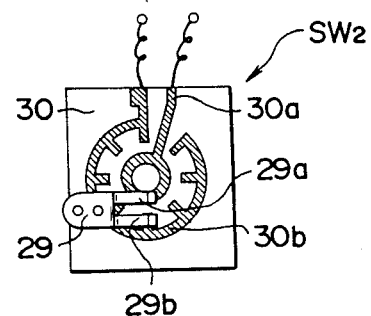
FIG. 4 is an enlarged plan view of a switch which is used to detect a film winding rate.

FIG. 4 shows the conductive contact 29 mounted on the gear 28 and the substrate 30 in detail. Again, the free end of the conductive contact 29 is shaped into a fork, with individual tips 29a, 29b being disposed for sliding contact with individual conductive patterns 30a, 30b defined on the substrate 30. Specifically, the tip 29a is maintained in contact with the annular conductive pattern 30a while the other tip 29b is disposed for contact with a plurality of radially extending fingers which extend from the conductive pattern 30b at a given angular interval. The patterns 30a, 30b are also connected to control means (CPU) shown in FIG. 5.

Figure 5:
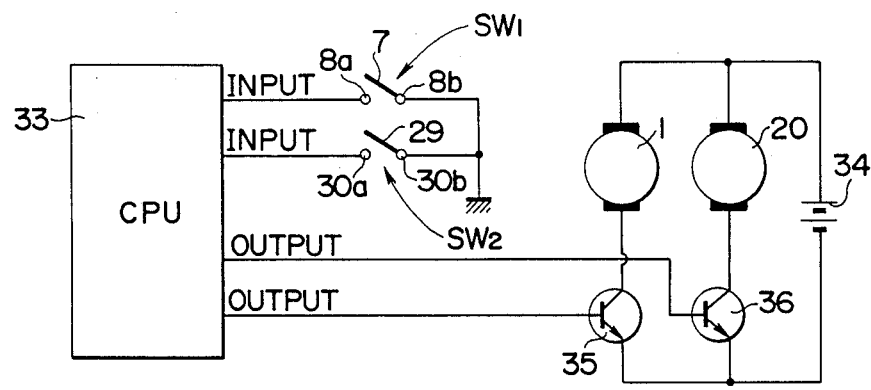
FIG. 5 is a schematic view illustrating a relationship between a motor, a shutter charging complete switch, a film winding rate detecting switch and associated control means.

Control means 33 used in the present embodiment is shown in FIG. 5 and comprises a CPU. It receives as inputs an open or closed signal from a charging complete switch SW1 comprising the conductive contact 7 and the conductive patterns 8a, 8b, and a film winding rate detecting switch SW2 comprising the conductive contact 29 and the conductive patterns 30a, 30b, and delivers a control signal to transistors 35, 36 which control the energization of the motors 1 and 20, respectively. When the transistors 35, 36 are turned on, the motors 1, 20 are fed from a storage battery 34. In addition to the described control, the control means (CPU) 33 completely performs a sequence control of the camera.

In operation, when viewing a viewfinder as illustrated in FIG. 1, the control means 33 causes the rotary shaft of the motor 1 to rotate clockwise in response to a release signal which is inputted thereto. This causes the output gear 2 and the gears 3, 4, 5 and 6 to rotate in directions indicated by associated arrows. Consequently, the shutter 13 is released from the condition which it maintained since the completion of the charging operation, and is enabled to run while the mirror 15 moves up. The control means 33 ceases to energize the motor 1 when a connection between the conductive contact 7 and the conductive pattern 8b on the substrate 8 is interrupted (see FIG. 3B) as the upward movement of the mirror is completed as a result of the rotation of the cam drive gear 6.

Subsequently, the shutter 13 is operated to perform an exposure process. Subsequent to the exposure, the control means 33 again causes the motor 1 to rotate clockwise. This causes the output gear 2 and the gears 3, 4, 5 and 6 to rotate in directions indicated by associated arrows, whereby the mirror 15 moves down and a charging operation of the shutter 13 is initiated.

On the other hand, at the same time as the initiation of rotation of the motor 1 or at a given time period thereafter, the control means 33 causes the rotary shaft of the film winding motor 20 to rotate clockwise. This causes the output gear 21, the gears 22, 23, 24, 25 and 26a and the spool 26 to rotate in the respective directions indicated by associated arrows. Consequently, the film 31 is taken up on the spool 26, and the follower sprocket shaft 27 rotates in a direction indicated by an arrow as the film 31 runs. The rotation of the sprocket shaft 27 causes the gear 28 to rotate in a direction indicated by an arrow, whereby the conductive contact 29 slides along the substrate 30 to establish and interrupt the conduction between the conductive patterns 30a and 30b as the film 31 moves. This enables the control means 33 to detect how the film 31 is being fed. Specifically, it determines if a given number of pulses are produced by the conductive pattern 30b within a given length of time. If the film feed rate is higher than a given value, the control means 33 continues to energize both motors 1 and 20 (concurrent drive). When the number of pulses which are formed by the establishment and interruption of the conduction between the conductive patterns 30a and 30b reaches a given value which corresponds to one frame of the film, the control means 33 ceases the rotation of the motor 20, thus completing a film winding operation. Also, the control means 33 ceases the rotation of the motor 1 in response to the establishment of the conduction between the conductive contact 7 and the conductive pattern 8b on the substrate 8 when the shutter 13 has been charged by the rotation of the motor 1. A series of photographing operations for one frame is completed when both motors 1, 20 cease to operate, and the camera is now ready to initiate another series of photographing operations for the next frame.

The operation which occurs when the storage battery 34 becomes degraded, when the battery performance is degraded as a result of a reduction in the temperature of the environment in which the camera is used or when a film winding load has increased will now be described. The operation from a shutter release to the exposure which occurs by operating the shutter 13 remains the same as before. After the exposure, the control means 33 causes the motor 1 to rotate clockwise again, whereby the mirror 15 moves down and the shutter 13 begins to be charged. At the same time as the initiation of the rotation of the motor 1 or at a given time delay with respect thereto, the control means 33 causes the motor 20 to rotate clockwise, thus taking up the film 31 on the spool 26. The film feeding rate is detected by means of the manner of change in the conduction between the conductive patterns 30a and 30b. If the rate is retarded with respect to a given value, the control means 33 immediately ceases to rotate the motor 20, thus reducing the loading upon the storage battery 34 while the motor 1 continues its rotation until its operation is stopped by the control means 33 when the conduction between the conductive contact 7 and the conductive pattern 8b on the substrate 8 is established by the completion of a shutter charging operation. The control means 33 then continues to operate by rotating the motor 20, thus resuming the film winding operation (sequential drive). When the number of pulses corresponding to the establishment and the interruption of the conduction between the conductive patterns 30a and 30b on the substrate 30 reaches a given value which corresponds to one frame of the film, the control means 33 ceases to rotate the motor 20, thus completing a film winding operation and also completing a series of photographing operations for one frame.

Figure 6A:
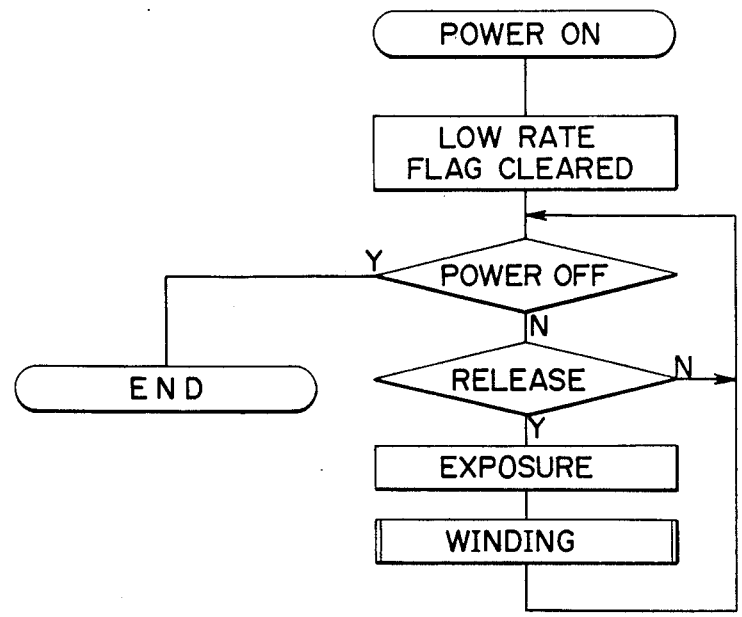
FIGS. 6A and 6B are flow charts illustrating a photographing operation of the camera according to the present embodiment.

FIG. 6A is a flow chart illustrating a sequence of operations of the camera according to the first embodiment of the invention. Specifically, when the power supply is turned on, a low rate flag is initially cleared. A power switch within the control means 33 or CPU is then examined to see if it is off. If the power supply is found to be normal, a release operation is then examined. If it is found that a release operation follows a "Y" path, an exposure operation is performed, and an exposed film is taken up by the motor 20 in the manner mentioned above. The motor 1 performs a shutter charging operation, thus completing a photographing sequence for one frame.

When a consecutive photographing operation is attempted by maintaining a release button depressed, it is likely that a reduction in the battery voltage as may be caused by a change in the environment occurs to bring it around a threshold between a concurrent and a sequential drive. A sequential drive may be activated for the first frame while a concurrent drive may be activated for the next following frame in a unstable manner, due to a change in the loading. In such instance, in accordance with the invention, the sequential drive is maintained once it is entered as a result of switching.

Figure 6B:
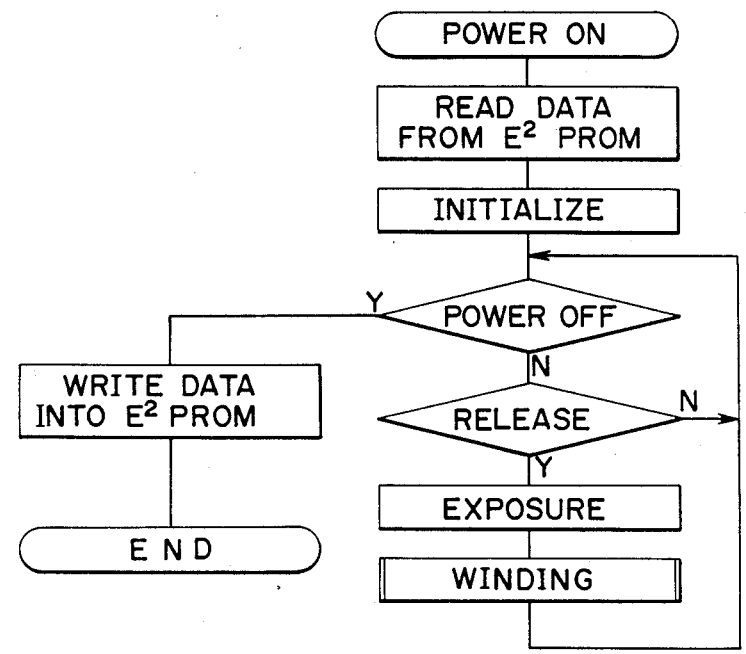
Figure 7:
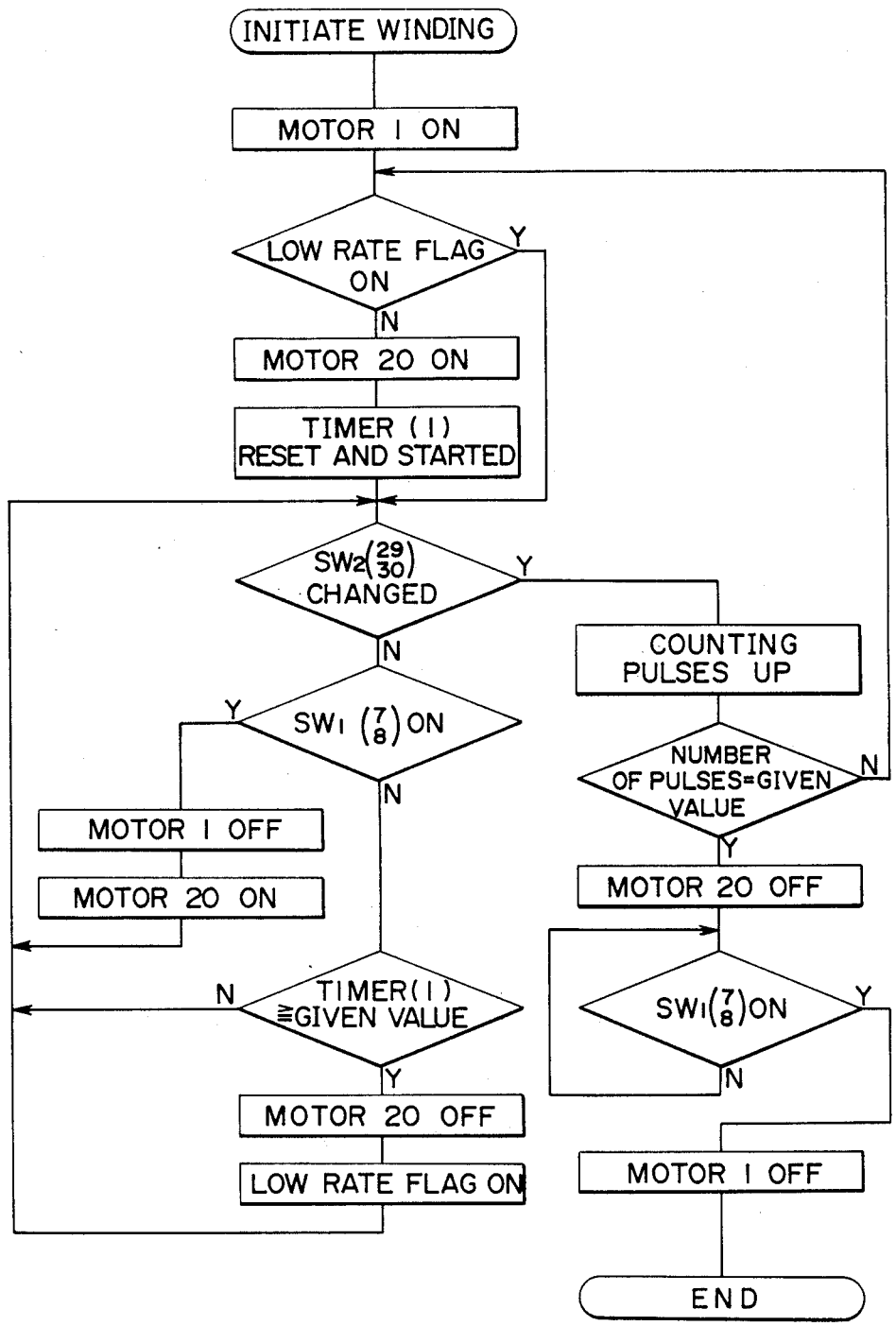
FIG. 7 is a flow chart of an exemplary operation in which motors are switched from a concurrent to a sequential drive.

FIG. 7 is a flow chart of a subroutine for a film winding operation shown in FIGS. 6A and 6B. Specifically, when a winding operation occurs first, the motor 1 is turned ON, and a low rate flag is examined if it is ON. As indicated by the flow chart of FIG. 6A, during the initial release subsequent to the power on, the low rate flag is cleared. Accordingly, the program proceeds to "N" in FIG. 7 upon examining the flag. The motor 20 is then turned ON, starting a timer (1). The winding rate detecting switch SW2 is examined, and if it is found that the film is being wound up at a rate faster than a given rate which is preset by the timer (1), the program follows a "Y" path to count the number of pulses until a given value is reached. Thereupon, the motor 20 ceases to operate, and the charging complete switch SW1 is examined. If the answer is "Y", the motor 1 ceases to operate. However, if the film winding rate is slow, the motor 20 is turned OFF, thus switching to a sequential drive.

In this operation, since the detecting switch SW2 exhibits no change at the time when it is examined, a decision results in an "N" path, and since the shutter charging operation is not yet complete when determining ON or not of the switch SW1, the decision results in an "N" path. In the subsequent decision to see if timer (1) $\geq$ a given value, the program exits from a "Y" path, thus turning OFF motor 20 and setting the low rate flag. The winding rate detecting switch SW2 is examined again, but since the motor 20 ceases to operate, the decision exits from an "N", followed by the examination of the switch SW1. If the shutter charging operation has been completed by that time, the switch SW1 assumes ON, whereby the decision exits through a "Y" path, thus ceasing to operate the motor 1. At the same time, the motor 20 is turned ON, resuming the film winding operation. When the switch SW2 is examined, the decision exits from a "Y" path, and the number of pulses is counted. If it reaches a given value, the decision exits from a "Y" path, thus ceasing to operate the motor 20. If the number of pulses does not reach a given value, the decision exits from an "N" path, and then the low rate flag is examined to see if it is ON. The switch SW2 is then examined. The program loops around in this manner until the number of pulses reaches a given value, whereupon the motor 20 is turned OFF to complete a photographing operation.

During a subsequent release operation, the low rate flag is set, so that the timer (1) is inhibited from operation, and hence the motor 20 does not operate until the charging complete switch SW1 is turned on by the motor 1. Thus, once the operation switches into the sequential drive, the sequential drive is maintained during all subsequent sequences. The flag is cleared when the power switch is once turned OFF and then turned ON. Accordingly, when the power supply is turned on for the second time, again the film feeding rate is detected to determine the choice between the concurrent and the sequential drive.

In the above description, the motor 20 will be turned off if even one pulse is retarded so as to be less than a given value. However, a mean value over several pulses may be chosen for purpose of comparison or several initial pulses may be neglected, taking into consideration the fact that the initial several pulses will take a longer time because of the acceleration of the overall system.

In the flow chart shown in FIG. 7, a single timer has been employed, but another timer may be used which clears the low rate flag at a given time interval later.

Figure 8:
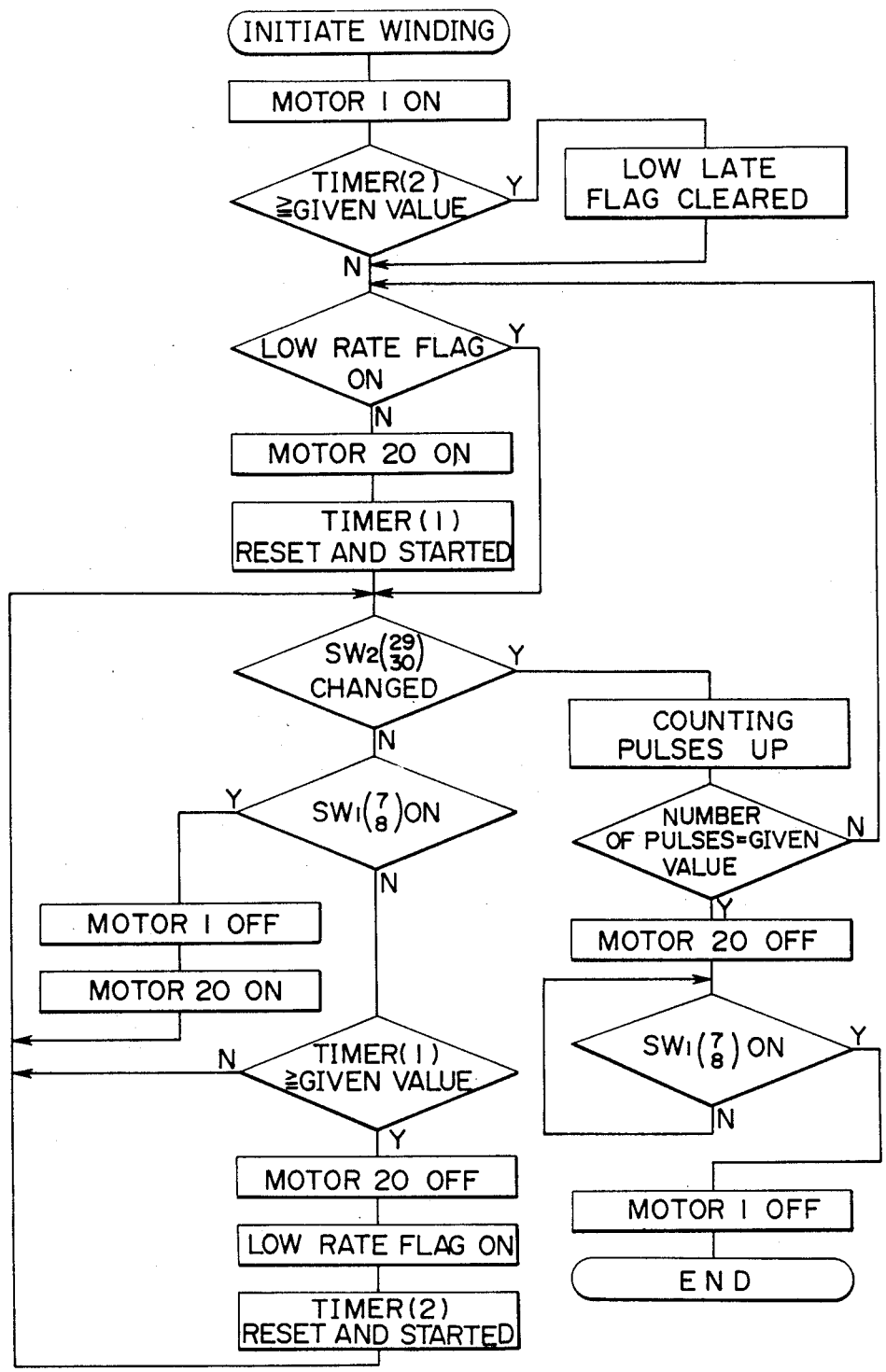
FIG. 8 is a flow chart of another example of operation in which motors are switched from a concurrent to a sequential drive.

FIG. 8 is a flow chart which illustrates such use. Specifically, when the motor 20 is turned OFF to switch to the sequential drive and when the low rate flag is turned ON, the time interval which passes until the low rate flag is cleared is loaded into a timer (2), and an arrangement is made to examine the inequality timer (2) ≧ a given value. In this manner, once the sequential drive is entered, the sequential drive with the low rate flag turned on prevails for all release operations which occur within the given time interval loaded into the timer (2). The length of time is determined by the timer (2), and after the given time interval, the low rate flag is cleared.

Figure 9:
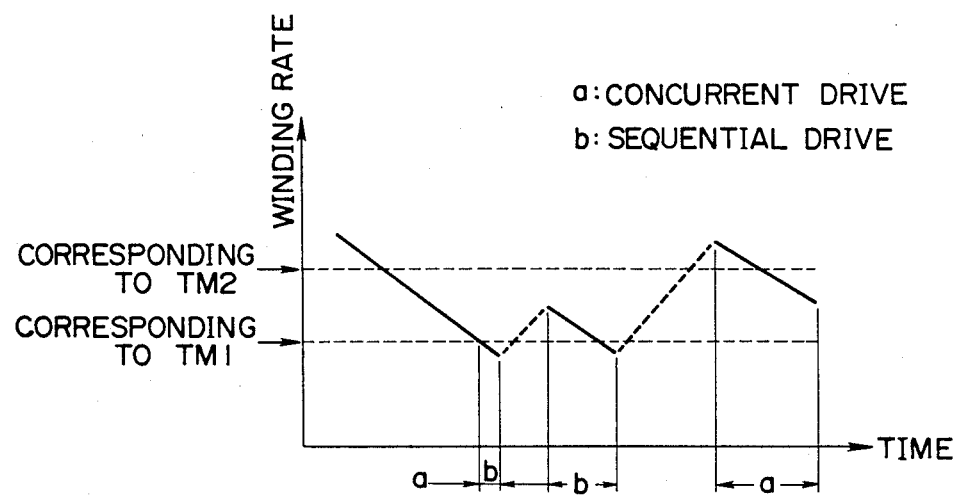
FIG. 9 graphically shows a relationship between the winding rate plotted against time when a threshold at which a switching from the concurrent to the sequential drive takes place is varied.

Alternatively, a hysteresis may be provided in detecting the film feed rate, and a pair of thresholds TM (TM1, TM2) may be used for the timer in order to accommodate for a recovery of the battery performance. This choice is illustrated in FIG. 9 where the ordinate indicates the film winding rate while the abscissa indicates the time. As shown, the winding rate decreases with a reducing battery performance. Data relating to the detected rate is inputted to timer thresholds TM1 and TM2. When the power supply is turned on, TM1 is initially used. In this instance, when the film winding operation which has been performed by the concurrent drive (a) is immediately switched to the sequential drive (b) as soon as it becomes retarded to less than TM1. At this time, the threshold is raised from TM1 to TM2. Accordingly, the sequential drive is maintained until the battery performance has recovered enough to produce a winding rate which is equal to TM2. It will be seen that this prevents an unstable operation at a level corresponding to TM1 that the operation may return to the concurrent drive (a) as soon as the battery performance is slightly recovered and then switches again to the sequential drive (b) in response to a degraded performance.

Figure 10:
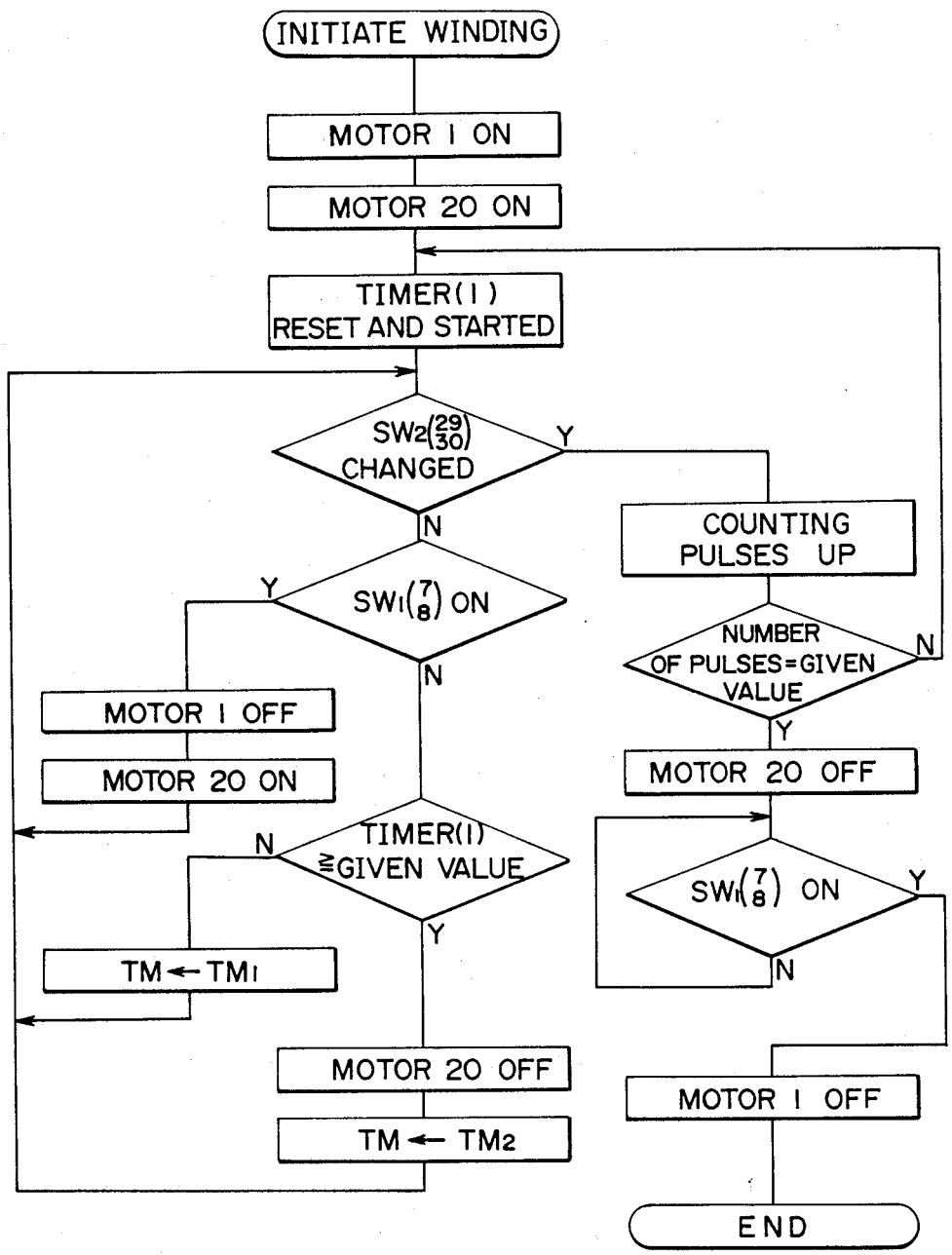
FIG. 10 is a flow chart of an operation which occurs in response to a change in the level to switch the motors from a concurrent to a sequential drive.

Once the film winding rate exceeds TM2, the threshold is reduced to TM1, maintaining the concurrent drive (a) until the rate reduces below TM1. FIG. 10 shows a flow chart of this operation. Specifically, when the winding rate detecting switch SW2 exhibits no change and the charging complete switch SW1 does not assume its ON condition, a threshold preset in the timer is examined. If the threshold is equal to TM1, the motor 20 ceases to operate, thus switching to the sequential drive, and the threshold is increased from TM1 to TM2. Upon recovery of the battery performance, the threshold is returned to TM1. In other respects, the operation remains similar to that shown in the flow chart of FIG. 7.

The timer threshold TM may be initialized by choosing TM1 when the power supply is turned on as mentioned above, or alternatively, a non-volatile memory such as $E^2$ PROM may be used as shown in FIG. 6B to store data which was used during the previous photographing operation as the power supply is turned off. When the power supply is turned on for the next time, the previous rate data may be read from $E^2$ PROM to load a threshold into the timer. As a further alternative, TM1 may be chosen as the threshold TM at the time the battery is changed. By utilizing such technique, a switching from the sequential to the concurrent drive is avoided during the consecutive photographing operation, thus preventing an inconvenience as mentioned previously.

Figure 11:
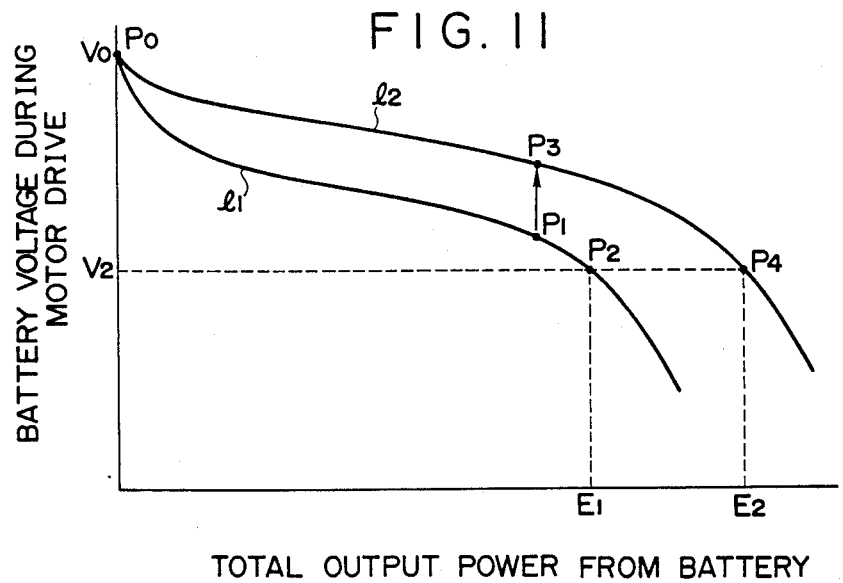
FIG. 11 graphically illustrates an operating performance of a storage battery which may be used in the camera according to the present embodiment.

FIG. 11 graphically shows the effect of the present embodiment as viewed in terms of the battery performance. In this Figure, the ordinate represents the battery voltage applied to the motor as the latter is being driven while the abscissa represents an accumulated output power from the battery. To simplify the description, it is assumed that the electric input power to the shutter charging motor 1 and that to the film winding motor 20 are equal to each other and that the minimum operating voltage $V_2$ for the respective motors are also equal to each other. Since the electric power required to move the mirror upward is less than that required for the shutter charging operation or the winding operation, the mirror drive is neglected, thus considering only the shutter charging and winding operation. A curve l1 represents the voltage response of the battery during a concurrent drive of the shutter charging motor 1 and the film winding motor 20, and the curve l2 represents the voltage response of the battery when the sequential drive is employed and hence only one motor is driven at any one time. It will be seen that because the current drain is greater for the curve l1 than for the curve l2, the voltage applied to the motor will be greatly reduced due to the influence of the internal resistance of the battery.

When both motors are concurrently driven, the battery voltage applied to the motors will shift from a voltage $V_0$ located at point $P_0$ along the curve l1, and reaches the minimum operating voltage $V_2$ at point $P_2$ where the battery is no longer effective. The total accumulated power from the battery is equal to E1, meaning that a number of film frames corresponding to E1 can be exposed without changing the battery.

On the other hand, during the sequential drive of the motors, the battery voltage applied to the motor will shift from voltage $V_0$ at point $P_0$ along the curve l2, and becomes ineffective when it reaches the minimum operating voltage $V_2$ at point $P_4$. The total accumulated power from the battery is equal to E2, which is greater than E1. In particular, at low temperatures where the internal resistance of the battery increases, the ratio between E1 and E2 will be increased significantly. For the described reasons, it will be seen that if the motors are concurrently driven, the number of film frames which can be exposed will be reduced even though the length of time required to expose one frame will be reduced. On the other hand, when the sequential drive is used for the motors, the number of film frames which can be exposed will be increased even though the length of time to expose one frame will increase.

In the present embodiment, the concurrent drive of the motors is employed when the battery exhibits a sufficient voltage or when a film winding load is low, and in this instance the voltage from the battery which is applied to the motor will shift from the initial voltage $V_0$ at point $P_0$ along the curve l1. In response to a degradation in the battery performance or an increase in the film winding load to cause a reduced winding rate, the motors are switched to the sequential drive, which is subsequently maintained. Accordingly, the voltage from the battery which is applied to the motor will shift from point $P_1$ to point $P_3$ and then shifts along the curve l2, and is effective until the minimum operating voltage $V_2$ at point $P_4$ is reached.

Figure 12:
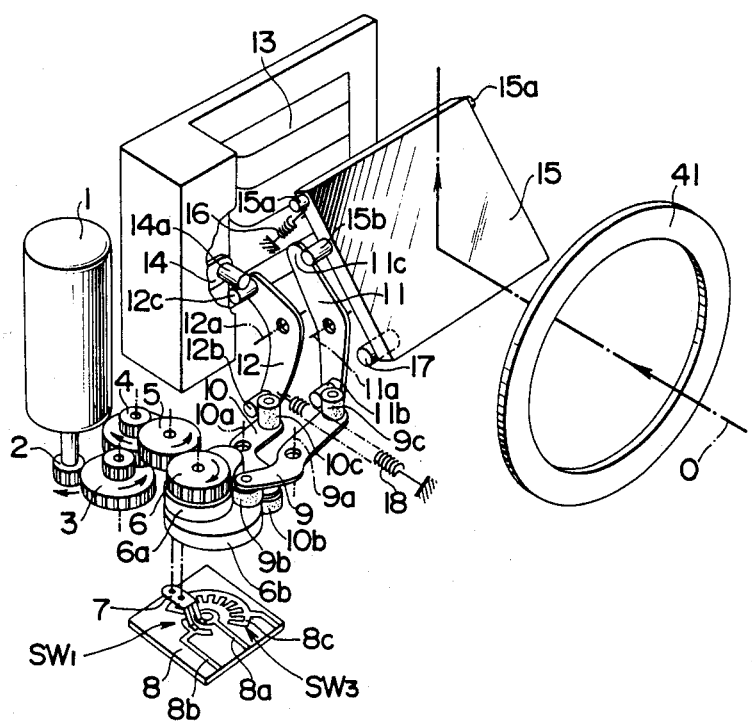
FIG. 12 is a perspective view of essential parts of a motor driven camera according to a second embodiment of the invention.

Referring to FIG. 12, a second embodiment of the invention will now be described. The motor driven camera of the second embodiment accomplishes the third and the fourth objects of the invention. The mechanism within the motor driven camera remains substantially similar to that of the first embodiment (see FIG. 1), and the difference only relates to a section which detects the rotational speed of the devoted shutter charging motor. Accordingly, similar parts are designated by like reference numerals or characters as before, and only the differences will be described.

As shown in FIGS. 12, 13A and 13B, in the second embodiment, a mirror speed detecting switch SW3 is formed on the substrate 8 on which the shutter charging complete switch SW1 is disposed. Specifically, the substrate 8, with which the conductive contact 7 integrally mounted on the cam drive gear 6 is disposed for sliding contact, is centrally formed with an annular conductive pattern 8a, an arcuate conductive pattern 8b which surrounds the pattern 8a, and another conductive pattern 8c having conductive fingers which extend radially therefrom at a given angular interval. Each pattern is connected to control means 33 (CPU) shown in FIG. 15. The conductive contact 7 has its free end shaped into a fork, with each tip being disposed for sliding contact with each conductive pattern on the substrate 8. Specifically, one tip 7a is maintained in contact with the conductive pattern 8a as the gear 6 rotates. Another tip 7b is disposed for contact with the conductive pattern 8b at the time the shutter charging operation is complete and is moved out of contact therefrom at a time the mirror 15 has completed its upward movement. The tip 7b is disposed for contact with the conductive pattern 8c at a given angular interval during the downward movement of the mirror 15 and the charging operation of the shutter 13. FIG. 13A corresponds to a point in time when viewing a viewfinder before a shutter release, and the conductive patterns 8a and 8b are connected together by the conductive contact 7. FIG. 13B corresponds to a point in time when the mirror 15 has moved up, enabling an exposure operation.

The control means 33 used in the second embodiment of FIG. 15 also comprises a CPU, and receives as inputs, an open/close signal from a charging complete switch SW1 formed by the conductive contact 7 and the conductive patterns 8a, 8b; a mirror speed detecting switch SW3 formed by the conductive contact 7 and the conductive patterns 8a, 8c; and a film winding rate detecting switch SW2 formed by the conductive contact 29 and the conductive patterns 30a, 30b. It delivers a control signal to transistors 35, 36 which respectively control the energization of the motor 1 and the motor 20. As before, when these transistors are turned on, the motors 1 and 20 are fed from the battery 34. In addition, the control means 33 performs a sequence control of the entire camera as before.

In operation, when viewing a viewfinder as shown in FIG. 12, in response to a release signal input to the control means 33, the latter causes the rotary shaft of the motor 1 to rotate clockwise. This causes the output gear 2 and the gears 3, 4, 5 and 6 to rotate in directions indicated by associated arrows. Accordingly, the shutter 13 is released from the condition which it maintains at the completion of the charging operation, and is enabled for running while the mirror 15 moves upward. The control means 33 ceases to operate the motor 1 when the conduction between the conductive contact 7 and the conductive pattern 8b on the substrate 8 is interrupted (FIG. 13B) at the completion of the upward movement of the mirror which is caused by the rotation of the cam drive gear 6.

Subsequently, the exposure process is conducted by operating the shutter 13, and after the exposure, the control means 33 again causes the motor 1 to rotate clockwise. This causes the output gear 2 and the gears 3, 4, 5 and 6 to rotate in directions indicated by associated arrows, causing the mirror 15 to move down and initiating the charging operation for the shutter 13. At the same time, the rotation of the gear 6 is effective to cause the conductive contact 7 to slide along the substrate 8, whereby the conduction between the conductive patterns 8a and 8c are repeatedly made and broken, thus allowing the operating speed of the mirror to be detected as it moves down. In this manner, the control means 33 detects the rotational speed of the motor 1 in terms of the rotational speed of the gear 6. If the rotational speed of the motor 1 is higher than a given value because the battery 34 exhibits a sufficient performance, the control means 33 causes the rotary shaft of the film winding motor 20 (see FIG. 1) to rotate clockwise. This causes the output gear 21, the gears 22, 23, 24, 25 and 26A and the spool 26 to rotate in directions indicated by associated arrows. As a consequence, the film 31 is taken up on the spool 26, and the follower sprocket shaft 27 rotates in a direction indicated by an arrow as the film 31 runs. The rotation of the sprocket shaft 27 causes the gear 28 to rotate in a direction indicated by an arrow, whereby the conductive contact 29 repeatedly makes and brakes the conduction between the conductive patterns 30a and 30b in accordance with the running of the film 31 as it slides along the substrate 30 (see FIG. 4). This enables the control means 33 to detect the feeding condition of the film 31. When the number of pulses, which are developed as a result of the establishment and interruption of the conduction between the conductive patterns 30a and 30b, reaches a value corresponding to one film frame, the control means 33 ceases the rotation of the motor 20, thus completing a film winding operation. Upon completion of a charging operation of the shutter 13 which is accomplished by the rotation of the motor 1, the conductive contact 7 establishes a conduction between the conductive patterns 8a and 8b on the substrate 8, causing the control means 33 to cease the rotation of the motor 1. When the motors 1 and 20 cease to operate, a series of photographing operations for one frame are completed, enabling another series of photographing operations for the next frame to be initiated.

The operation which occurs when the battery 34 becomes degraded as by a reduction in the environmental temperature will now be considered. In this instance, both motors are used in the sequential drive. For a consecutive photographing operation, the operation is once switched to the sequential drive, which is thereafter maintained. The process from a shutter release to an exposure process takes place in the similar manner as mentioned above. After the exposure operation, the control means 33 causes the motor 1 to rotate clockwise again, moving the mirror 15 down and initiating the charging operation of the shutter 13. At the same time, the control means 33 detects the rotational speed of the motor 1 in terms of rotation of the gear 6, or detects the speed of downward movement of the mirror 15 by way of the mirror speed detecting switch SW3. If the rotational speed of the motor 1 is less than a given value, the control means 33 allows the rotation of the motor 1 to continue, thus continuing the shutter charging operation. Upon completion of the shutter charging operation when the conductive contact 7 establishes the conduction between the conductive patterns 8a and 8b on the substrate 8, the control means 33 ceases the rotation of the motor 1. The control means 33 then continues its operation by causing the motor 20 to rotate clockwise, thus taking up the film 31 on the spool 26. When the number of pulses, developed by a change in the conduction between the conductive patterns 30a, 30b, reaches a value corresponding to one film frame, the control means 33 ceases the rotation of the motor 20 to complete a film winding operation, which also completes a series of photographing operations for one frame.

Figure 16:
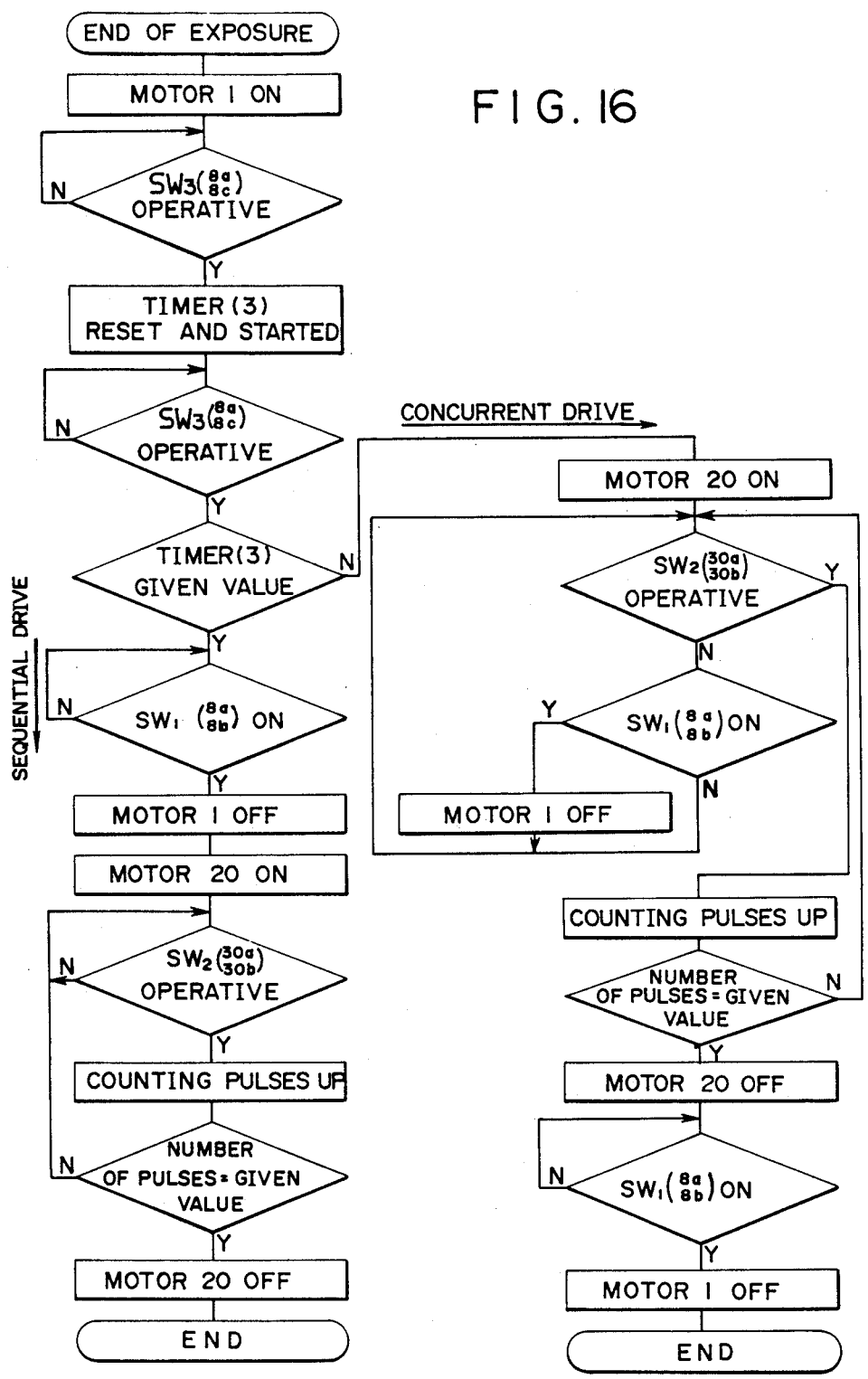
FIG. 16 is a flow chart which illustrates the operation of the camera according to the second embodiment subsequent to the completion of an exposure process.

FIG. 16 is a flow chart of the shutter charging operation and the film winding operation mentioned above. Specifically, upon completion of the exposure process, the motor 1 is turned ON, and then the switch SW3 is examined. If the program exits from a "Y" path, a timer (3), which is loaded a given rotational speed of the motor 1 per unit length of time, is reset and then started. The mirror speed detecting switch SW3 is examined again to see if the speed of the downward movement of the mirror or the rotational speed of the motor 1 is greater or not than the given speed which is loaded into the timer (3). If the rotational speed of the motor is less, the rotation of only the motor 1 is continued in the sequential drive. Subsequently, the charging complete switch SW1 is examined to see if it is turned ON or not, if it is ON, indicating that the charging operation has been completed, the motor.1 is turned OFF. The film winding motor 20 is then turned ON to initiate a film winding operation, and the film winding rate detecting switch SW2 is examined if it is operative. If it is operative, the number of pulses developed by the switch SW2 is counted until a given count is reached, whereupon the motor 20 is turned OFF since a film length corresponding to one frame has been wound up.

On the other hand, if the detected rotational speed of the motor 1 is greater, the film winding motor 20 is turned ON to enter the concurrent drive mode. The film winding rate detecting switch SW2 is examined to see if it is operative, and if it is operative, the number of pulses developed by the switch SW2 is counted until it reaches a given count, whereupon the motor 20 is turned OFF since the length of film corresponding to one frame has been wound up. The charging complete switch SW1 is examined to see if it is ON, and if it is ON, the motor 1 is turned OFF since the shutter charging operation has been completed. If the film winding rate detecting switch SW2 is not operative when the motor 20 has been turned ON, the charging complete switch SW1 is examined, and if it is ON, the motor 1 is then turned OFF while the switch SW2 is examined again to see if it is ON. In this manner, it will be seen that in this flow chart, a decision is rendered to choose either the concurrent drive or the sequential drive for the motors 1 and 20 by comparing the count in the timer (3) against the width of the pulse developed as the switch SW3 is turned on and off.

In the camera of the second embodiment, the mirror speed detecting switch SW3 is constructed so that the speed of the downward movement of the mirror 15 is detected in terms of the rotational speed of the motor 1. Alternatively, the speed of the upward movement of the mirror 15 may be detected in terms of the rotational speed of the motor 1.

Figure 17:
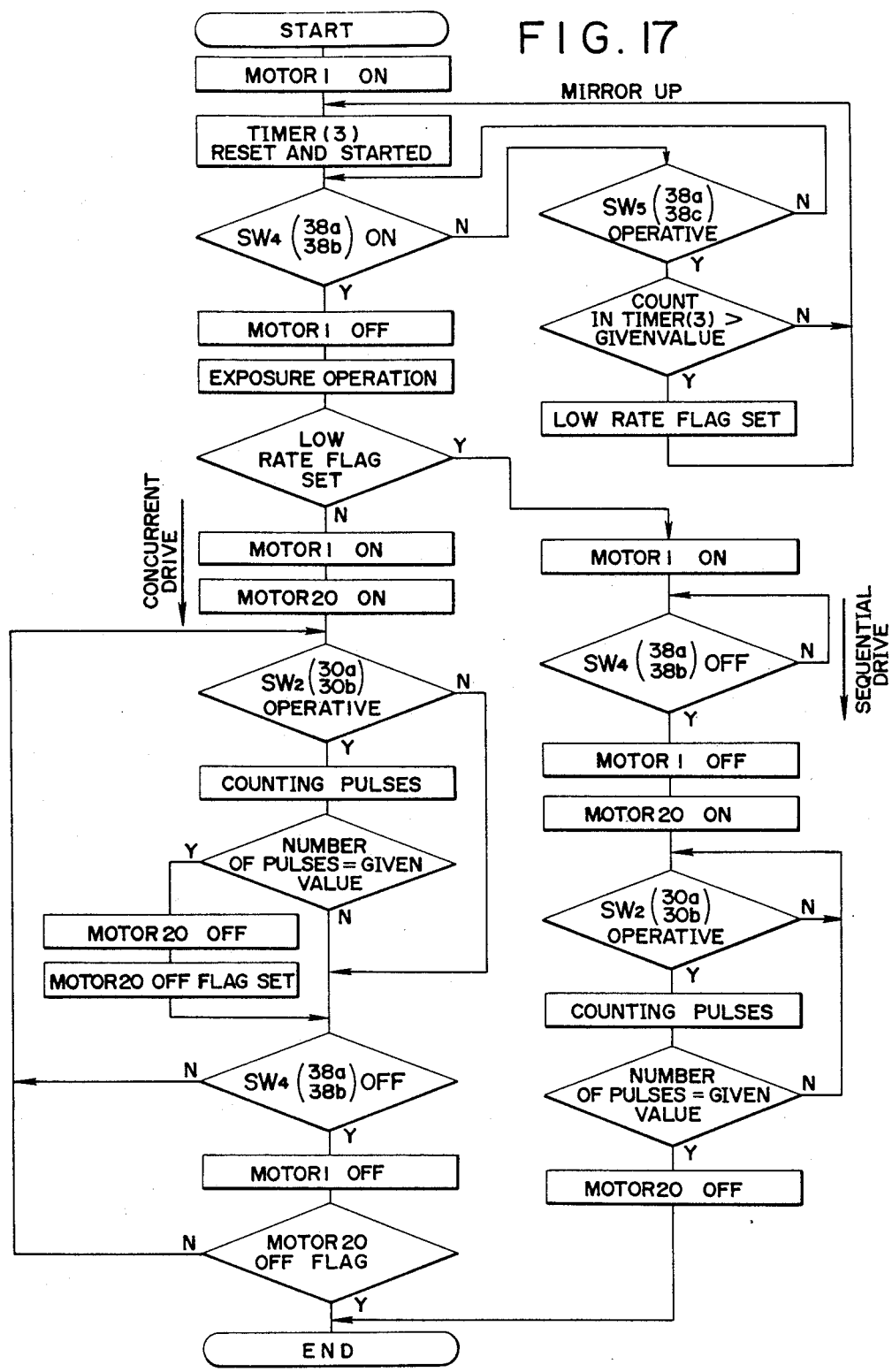
FIG. 17 is a flow chart of the operation of the camera according to the third embodiment which employs the switches shown in FIGS. 14A and 14B.

This arrangement is illustrated as a third embodiment of the invention in FIGS. 14A, 14B and 17. In the third embodiment, a charging complete switch SW4 and a mirror speed detecting switch SW5, which are constructed in the manner illustrated in FIGS. 14A and 14B, are substituted for the charging complete switch SW1 and the mirror speed detecting switch SW3. In other respects, the arrangement is similar to FIG. 12.

Referring to FIGS. 14A and 14B, the charging complete switch SW4 comprises an annular conductive pattern 38a centrally formed on the substrate 38, and another conductive pattern 38b which surrounds the conductive pattern 38a around substantially 3/4 the perimeter thereof. The mirror speed detecting switch SW5 comprises a comb-like conductive pattern 38c including radially extending fingers and which extends across the remaining one-fourth the perimeter which cooperates with the pattern 38a. It is to be understood that these conductive patterns are connected to control means, not shown. As before, the conductive contact 7, which is disposed for sliding contact with the substrate 38, has its free end shaped into a fork, including one tip 7a which is maintained in contact with the pattern 38a as the gear 6 rotates and another tip 7b which comes into contact with the pattern 38b when the upward movement of the mirror 15 has been completed and which moves away from contact with the pattern 38b when the shutter charging operation is completed. During the process of the upward movement of the mirror 15, it is repeatedly brought into contact with the pattern 38c at a given angular interval. FIG. 14A corresponds to a point in time when viewing a viewfinder before a shutter release takes place while FIG. 14B corresponds to a point in time when the mirror 15 has been moved up, enabling an exposure process. The switch motors used in the third embodiment includes a circuit arrangement which is similar to that of the second embodiment mentioned above, and therefore will not be described.

In operation, when viewing the viewfinder as shown in FIG. 12, the control means causes the rotary shaft of the motor 1 to rotate clockwise in response to a release signal which is input thereto. This causes the output gear 2 and gears 3, 4, 5 and 6 to rotate in respective directions indicated by associated arrows. Consequently, the shutter 13 is released from the condition which it maintains at the completion of the charging operation and thus is enabled for running while the mirror 15 begins to be driven upward. Simultaneously, as the gear 6 rotates, the contact 7 slides along the substrate 38, making and braking the connection between the conductive patterns 38a and 38c. In this manner, the control means is capable of detecting the rotational status of the motor 1 in terms of the rotational speed of the gear 6. The control means then stores the rotational speed of motor 1 and determines if and the rotational speed of the motor 1 is greater or less than a given value due to an influence of the battery performance. Upon completion of the upward movement of the mirror 15, the control means ceases the operation of the motor 1 when a conduction is established between the conductive patterns 38a and 38b.

Subsequent to the exposure process which takes place by the operation of the shutter 13, the control means activates a drive sequence for the motors 1 and 20 on the basis of stored information representing the rotational speed of the motor 1 during the time the mirror 15 is in the process of its upward movement. If the battery exhibits a satisfactory performance and the rotational speed of the motor 1 is greater than a given value, the control means allows the motors 1 and 20 to rotate clockwise substantially simultaneously, thus initiating the downward movement of the mirror 15, a charging operation of the shutter 13 and the winding operation of the film 31. When a number of pulses from the film winding rate detecting switch SW2 reaches a value corresponding to one film frame as the film 31 runs, the control means ceases the rotation of the motor 20, thus completing the film winding operation. On the other hand, the control means ceases the rotation of the motor 1 upon completion of the charging operation of the shutter 13 as the conduction between the conductive patterns 38a and 38b are broken. When both motors come to a stop, a series of is photographing operations for one frame is completed, and the camera is now ready to initiate another series of photographing operations for the next frame.

On the contrary, if the rotational speed of the motor 1 or the speed of the upward movement of the mirror 15 is less than a given value due to a degradation in the battery performance or a reduction in the environmental temperature, the control means operates as follows: thus subsequent to the exposure process which is performed by the operation of the shutter 13, it causes the motor 1 to rotate clockwise, thus initiating a downward movement of the mirror 15 and the charging operation of the shutter 13. The control means ceases the rotation of the motor 1 upon completion of the charging operation of the shutter 13 as the conduction between the conductive patterns 38a and 38b is broken. It then causes the motor 20 to rotate clockwise, initiating a film winding operation. When the number of pulses from the switch SW2 reaches a value corresponding to one film frame, the control means ceases the rotation of the motor 20 to complete a film winding operation and also a series of photographing operations for one frame. For a consecutive photographing operation, the continued photographing operation takes place with the sequential drive. In this manner, in accordance with the invention, once the operation is switched to the sequential drive, the latter is maintained during the subsequent photographing operation. The described progress of a program is illustrated in FIG. 17 where it is to be noted that a low rate flag is set or not depending on the result of detection of the speed of upward movement of the mirror and is utilized to make a choice between the concurrent drive and the sequential drive of the motors subsequent to the exposure.

In the embodiment shown in FIGS. 14A, 14B and 17, the operational sequence for the motors which is used to perform a shutter charging operation and the film winding operation may be determined during the upward movement of the mirror so that where a satisfactory battery performance is available, the motors can be started immediately upon completion of the exposure process to expedite the drive of the camera and to increase the number of frames which can be exposed per unit length while starting only the motor 1 to achieve a downward movement of the mirror in a rapid manner in order to shorten the length of time during which no image can be viewed through the viewfinder in the event the battery performance is degraded.

In the described embodiment, the motors 1 and 20 are started substantially simultaneously upon completion of the exposure process where a satisfactory battery performance is available, but it should be understood that the timing to start the respective motors may be slightly offset from each other in order to prevent an increased rush current of the individual motors.

Figure 18:
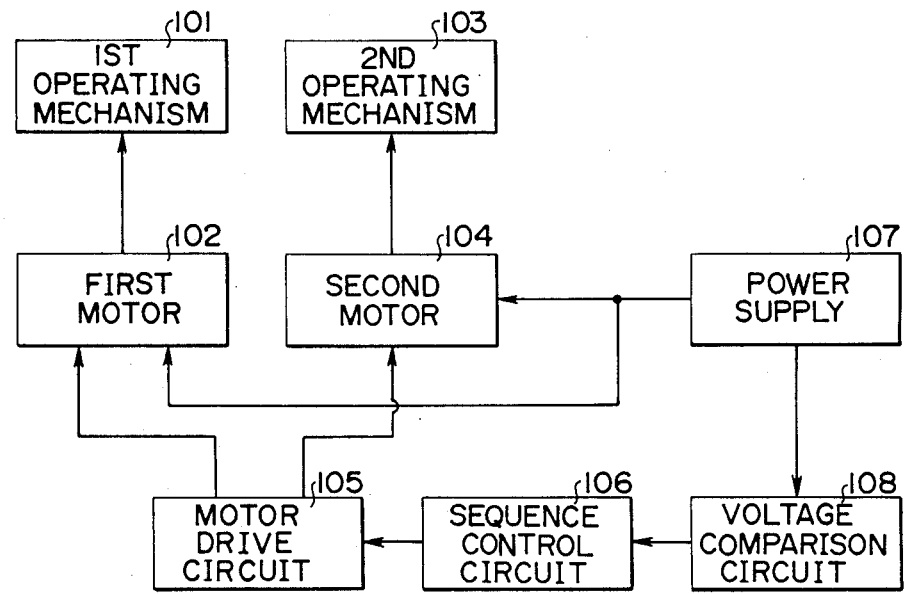
FIG. 18 is a block diagram illustrating the concept of the invention which accomplishes a fifth object of the invention.

FIG. 18 illustrates the concept of the invention which accomplishes the fifth object of the invention. The arrangement shown comprises a first operating mechanism 101, a first motor 102 which drives the first operating mechanism, a second operating mechanism 103, a second motor 104 which drives the second operating mechanism, a drive circuit 105 for driving the first and the second motor, a sequence control circuit 106 which controls the first and the second motor, a power supply 107 which feeds the first and the second motor, and a voltage comparison circuit 108 which compares the voltage of the power supply against a given voltage level and delivers a result of the comparison to the sequence control circuit 106. In response to an output from the voltage comparison circuit 108, the sequence control circuit 106 establishes a concurrent drive control in which the first and the second motor are simultaneously driven if the supply voltage is greater than the given voltage level, and initially drives either one of the first and the second motor, followed by the driving of the other motor if the supply voltage is less than the given voltage level.

Figure 19:
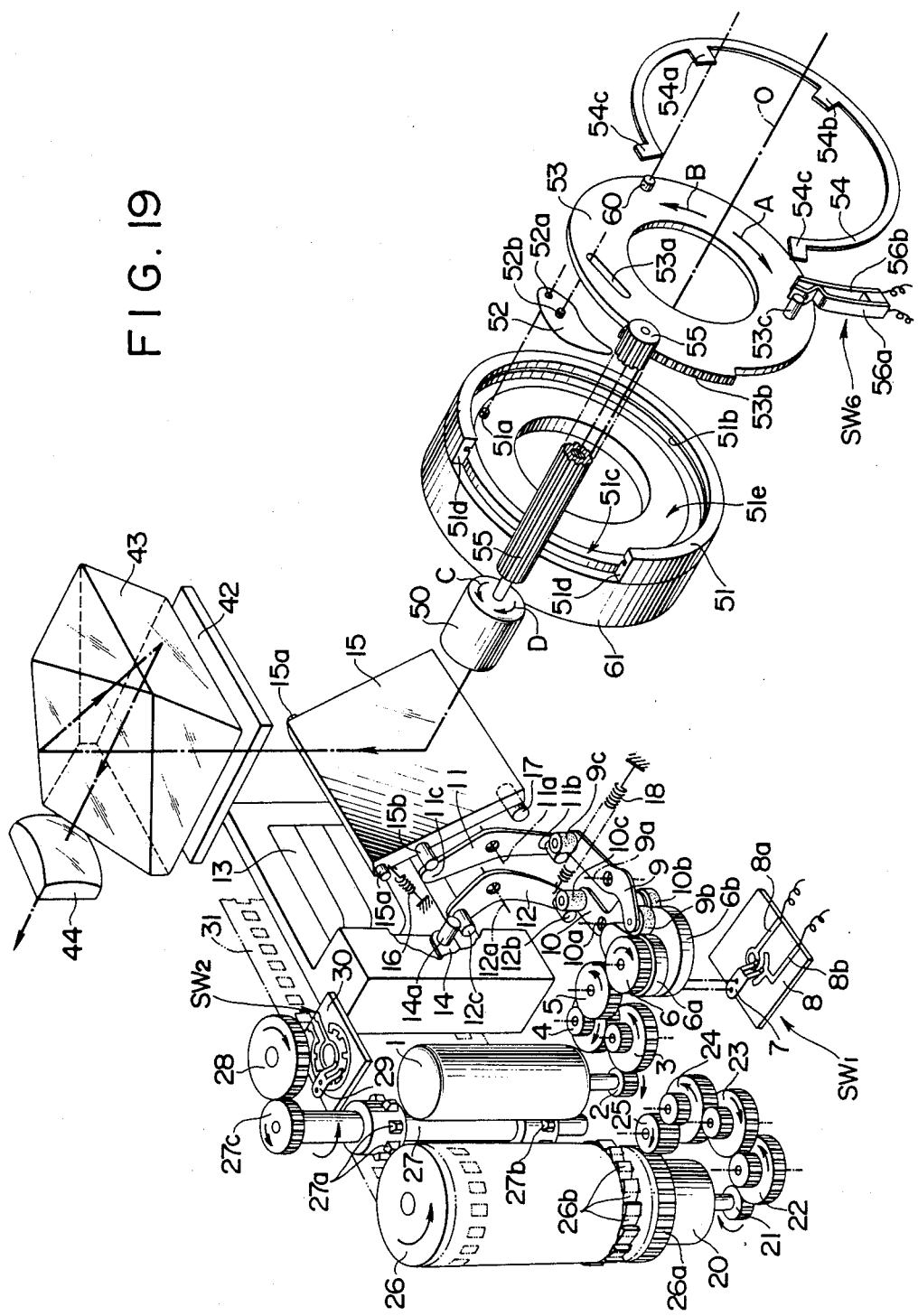
FIG. 19 is an exploded, perspective view of essential parts of a mechanical construction of a motor driven camera which incorporates the invention illustrated in FIG. 18.

FIG. 19 shows a mechanism portion of a motor driven camera which incorporates the concept of the invention illustrated in FIG. 18, and which is formed as a single lens reflex camera including a focal plane shutter of running type. In FIG. 19, light passing through a taking lens (not shown) which is mounted within a camera body impinges along a taking optical axis O, and is reflected upward by a movable reflecting mirror 15 which is diposed at an angle of 45° with respect to the optical axis for transmission through, and diffusion into a focussing screen 42. A tight image formed on the focussing screen 42 may be viewed as an erect image within a viewfinder through a pentaprism 43 and an eyepiece 44.

A stepping motor 50 serves as a diaphragm control and includes a rotary shaft which fixedly carries a driving output gear 55. A diaphragm casing 51 is formed by a short, doughnut-shaped sleeve having a bottom wall 51e on which a plurality of support pins 51a (only one being shown in this Figure) are arranged at equal intervals and extending in a direction parallel to the optical axis. A diaphragm blade 52 (only one being shown) has a support hole 52a formed therein adjacent to its one end, which is engaged with the support pin 51a, whereby the blade is rotatably mounted. The blade 52 fixedly carries a drive pin 52b adjacent to the support hole 52a, which extends in a direction parallel to the optical axis. A diaphragm control member 53 includes a plurality of cam slots 53a (only one being shown), which are equal in number to the number of blades, and each drive pin 52b is fitted into a corresponding cam slot. As is well recognized, the diaphragm control member 53 is formed as a doughnut-shaped disc which is fitted inside the diaphragm casing 51 so as to be rotatable about the optical axis O, with a sector gear 53b formed around part of its perimeter and projecting therefrom. The sector gear 53b is fitted into a notch 51c formed in the sidewall of the casing 51 and having an angular extent which is required by the sector gear 53b. The sector gear 53b is in meshing engagement with a drive gear 55.

The diaphragm control member 53 is locked against movement in the direction of the optical axis by a C-ring 54 which is fitted into a peripheral groove 51b formed in the inner peripheral surface of the diaphragm casing 51 toward its front end. The C-ring 54 is formed with ears 54c at its opposite ends, which abut against the opposite ends 51d of the notch 51c formed in the casing 51, whereby the C-ring 54 is locked against rotation relative to the casing 51. The diaphragm control member 53 also fixedly carries a rotational stop pin 60 which extends in a direction parallel to the optical axis for abutment against a pair of stops 54a, 54b formed as ears extending radially inward from the C-ring 54 which define a range of angular movement.

Specifically, when the rotary shaft of the motor 50 rotates in a direction indicated by an arrow C, the diaphragm control member 53 rotates in a direction indicated by an arrow A relative to the diaphragm casing 51, whereby a diaphragm aperture defined by the diaphragm blades 52 is reduced. When the pin 60 abuts against the stop 54b, the diaphragm achieves a minimum aperture. Conversely, when the rotary shaft of the motor 50 rotates in a direction indicated by an arrow D, the diaphragm control member 53 rotates in a direction indicated by an arrow B, whereby a diaphragm aperture increases. A maximum diaphragm aperture is reached when the pin 60 abuts against the stop 54a.

The diaphragm control member 53 also fixedly carries a switch operating pin 53c which extends in a direction parallel to the optical axis. The pin 53c is adapted to bear against conductive contacts 56a and 56b of a diaphragm open switch SW6 to establish a conduction therebetween under an open diaphragm condition as the diaphragm control member 53 rotates.

It is to be noted that while only one of each of the support pins 51a, cam slots 53a and diaphragm blades 52 is shown in FIG. 19, in actuality, five to seven of them are disposed around the optical axis O. The cam slot 53a is configured to define a cam such that F-number changes by one step in response to a given angular movement of the diaphragm control member 53, for example, through 6°, so that the diaphragm aperture can be reduced in a maximum of about eight steps or corresponding to an angle of rotation of the diaphragm control member 53 through 48°. The diaphragm unit thus constructed is mounted in the camera by integrally connecting the casing 51 with a stationary frame 61 of a lens barrel.

The motor 1 is designed for performing a shutter charging operation and a mirror driving operation. A shutter charging mechanism and a mirror drive mechanism which are adapted to be driven by the motor 1 are constructed and operate in the same manner as that of the first embodiment shown in FIG. 1 as is a film winding mechanism which is adapted to be driven by the motor 20. Accordingly, the corresponding parts are designated by like reference numerals or characters without repeating their description.

Figure 20:
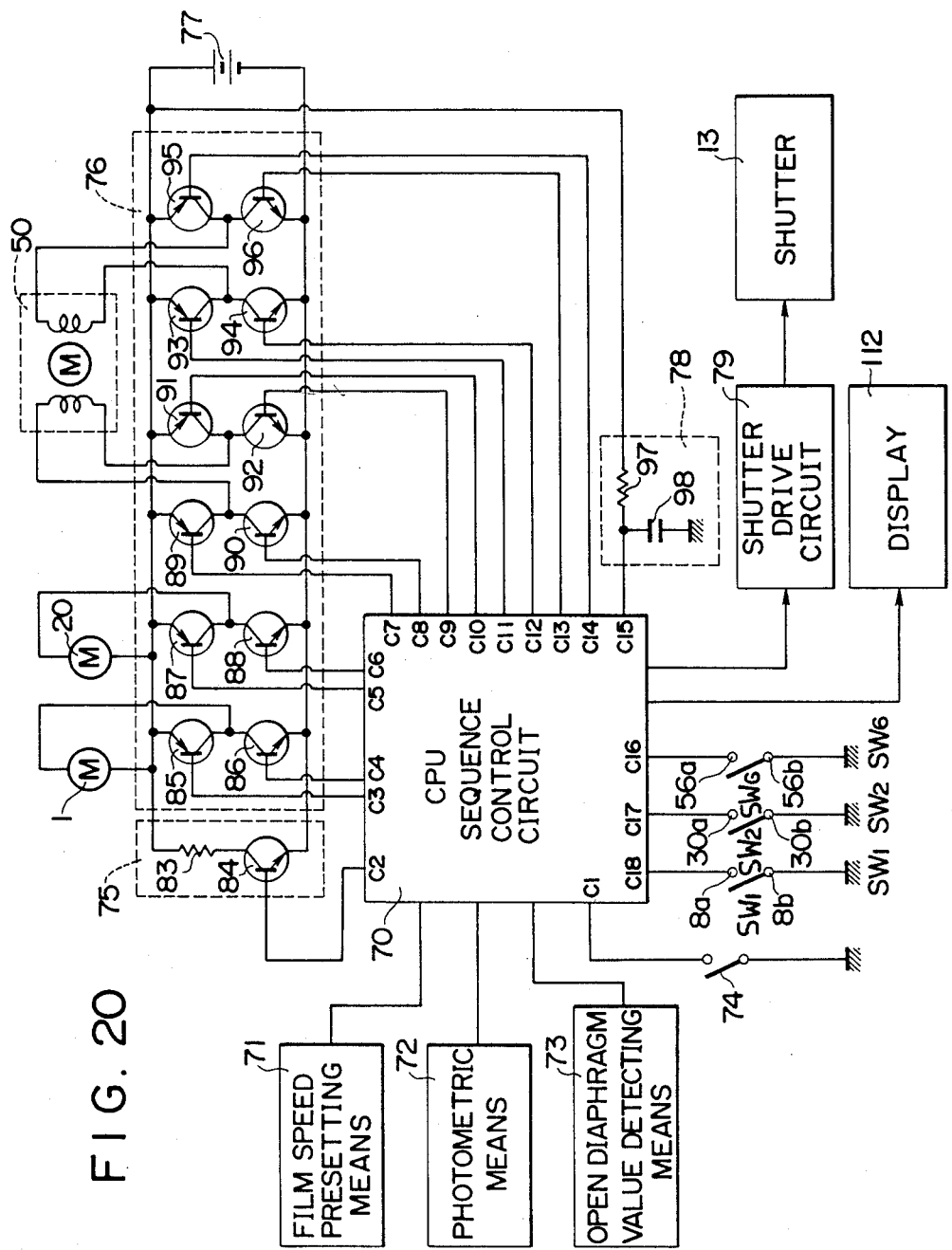
FIG. 20 is a schematic view of an electrical circuit of the motor driven camera shown in FIG. 19.

FIG. 20 shows an electrical circuit of the motor driven camera shown in FIG. 19. Specifically, a sequence control circuit 70 is formed by CPU having an internal A/D converter. CPU 70 is connected to film speed preset means 71 which reads the DX code on a film patrone, photometric means 72 which is disposed within an optical system of the viewfinder, and open diaphragm value detecting means 73, all of which feed an SV value representing film speed, a BV value representing the brightness of an object being photographed and an AVO value representing an open diaphragm value. A release switch 74 is used by a photographer to initiate a photographing operation. An on/off signal from the switch 74 is input to an input terminal C1 of CPU 70.

A dummy load 75 is used when examining a storage battery, and comprises a switching transistor 84 and a resistor 83. It is to be understood that an examination of a storage battery is better performed by applying a dummy load, which approximates an actual load applied during a motor drive rather than checking an open circuit voltage of the battery. The dummy load is used at this end.

A motor drive circuit 76 drives the motors 1 and 20 and the stepping motor 50. A pair of transistors 86, 88 are used to drive the motors 1, 20, respectively. Switching transistors 85, 87 are used to brake these motors by shortcircuiting thereacross. Switching transistors 89 to 96 are used to drive the stepping motor 50. The motors 1 and 20, the stepping motor 50, the dummy load and the sequence control circuit are fed from a power supply 77.

A low pass filter 78 comprises a resistor 97 and a capacitor 98, and functions to reduce noises on the supply voltage. CPU 70 includes an A/D conversion input port C15, to which an output from the filter 78 is input for A/D conversion. In this manner, CPU 70 is capable of recognizing the supply voltage as a result of such A/D conversion. The running focal plane shutter 13 mentioned above is adapted to be driven by a shutter drive circuit 79, to which a control signal is delivered from CPU 70 in accordance with a calculated shutter speed information TV value. The charging complete switch SW1 formed by the conductive contact 7 and the conductive patterns 8a and 8b, the film feed rate detecting switch SW2 formed by the conductive contact 29 and the conductive patterns 30a, 30b, and the diaphragm open switch SW6 formed by the conductive contacts 56a, 56b deliver signals representing their on/off conditions to input terminal C18, C17 and C16 of CPU 70.

On the other hand, a diaphragm aperture or an exposure period which is calculated by CPU 70 as well as the result of a battery check are displayed by display means 112, which comprises a liquid crystal display element in the present embodiment. A drive circuit for the display element is internally housed within CPU 70. Finally, it is to be understood that CPU 70 is capable of performing an overall sequence control of the camera in addition to the controls mentioned above.

Figure 21:
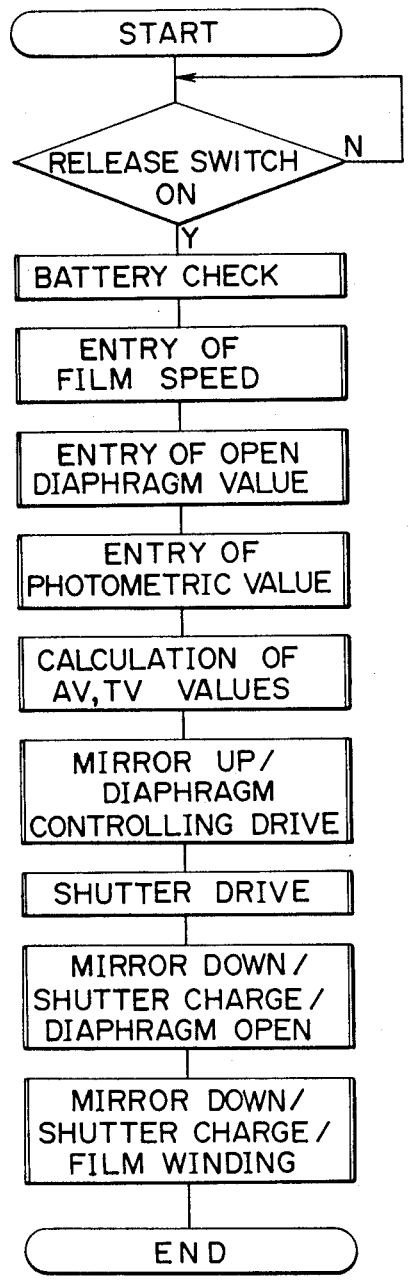
FIGS. 21 to 24 are flow charts illustrating the operation of a motor driven camera according to the fourth embodiment shown in FIG. 20.

The operation of the motor driven camera according to the fourth embodiment of the invention thus constructed will now be described with reference to flow charts shown in FIGS. 21 to 24 and timing charts shown in FIGS. 25A and 25B. FIG. 21 is a flow chart of a general operation. Initially when the release switch 74 (see FIG. 20) assumes ON, CPU 70 detects the ON condition through the terminal C1 and enters a battery check sequence.

In the battery check sequence, CPU 70 places "H" level on the terminal C2, thus turning the dummy load 75 ON. At a given time interval thereafter, the supply voltage applied to the terminal C15 is subject to an A/D conversion. Subsequent to the conversion, CPU 70 places an "L" level on the terminal C2 to turn the dummy load OFF. In accordance with the result of the A/D conversion of the supply voltage, CPU 70 determines the incapability to continue the subsequent photographing sequence and causes the display means 112 to indicate a battery NG condition, thus locking a release if the supply voltage is found to be less than a given threshold. Conversely, if the supply voltage is above the threshold, CPU 70 determines the capability to continue the photographing sequence, into which the operation progresses.

Specifically, CPU 70 makes an entry of a film speed in response to an output from film speed preset means 71, and then makes an entry of an open diaphragm value in response to an output from open diaphragm value detecting means 73, followed by an entry of a photometric value in response to an output from photometric means 72. CPU 70 then performs a calculation in a programmed manner on the basis of the SV, AVO and VB values thus entered, determining a diaphragm value AV and an exposure period TV.

CPU 70 then enters a mirror up and diaphragm controlling sequence. The detail of this sequence will be described later with reference to a flow chart shown in FIG. 22. However, briefly, a mirror up and shutter charging motor 1 is driven simultaneously with the stepping motor 50 which controls the diaphragm operation. Subsequently CPU 70 performs an A/D conversion of a supply voltage VE periodically. If the supply voltage VE is equal to or greater than 4 V, for example, a concurrent drive mode is established for the motors. On the contrary, if the supply voltage VE is less than 4 V, the sequential drive mode is entered in which the motor 1 is turned OFF while the stepping motor 50 is driven alone. The periodic A/D conversion of the supply voltage VE is also repeated subsequently by CPU 70, which switches to the concurrent drive mode if the VE returns to or above 4 V. The threshold value 4 V for the supply voltage VE is a voltage level which assures the operation of the motors 1 and 50. If VE < 4 V, the motor operation cannot be assured. Then follows a shutter drive. CPU 70 drives a shutter by delivering a control signal to a shutter drive circuit in accordance with the calculated TV value.

The operation then enters a mirror down/shutter charging/diaphragm opening sequence. As in the mirror up/diaphragm controlling sequence, a switching between the concurrent drive mode in which the stepping motor 50 and the motor 1 are simultaneously driven and the sequential drive in which the stepping motor 50 is driven alone takes place in accordance with the value of the supply voltage VE as the motor or motors are being driven. Reference is made to a flow chart shown in FIG. 23 for detail, which will be described later.

The operation then enters a mirror down/shutter charging and film winding sequence. During the previous sequence, the diaphragm opening operation has been completed, but the downward movement of the mirror as well as the shutter charging operation are in progresses still now, and hence at the time the diaphragm opening operation has been completed, the motor 20 is turned ON in order to feed the film. Thus, the concurrent drive is used for the mirror down/shutter charging operation and the film winding operation. In this sequence, a switching between the concurrent drive mode for the motors 1 and 20 and the sequential drive mode in which the motor 1 is driven alone takes place sequentially in accordance with the supply voltage VE as the motor or motors are being driven. For detail, attention is directed to FIG. 24. This completes a photographing sequence.

Figure 22:
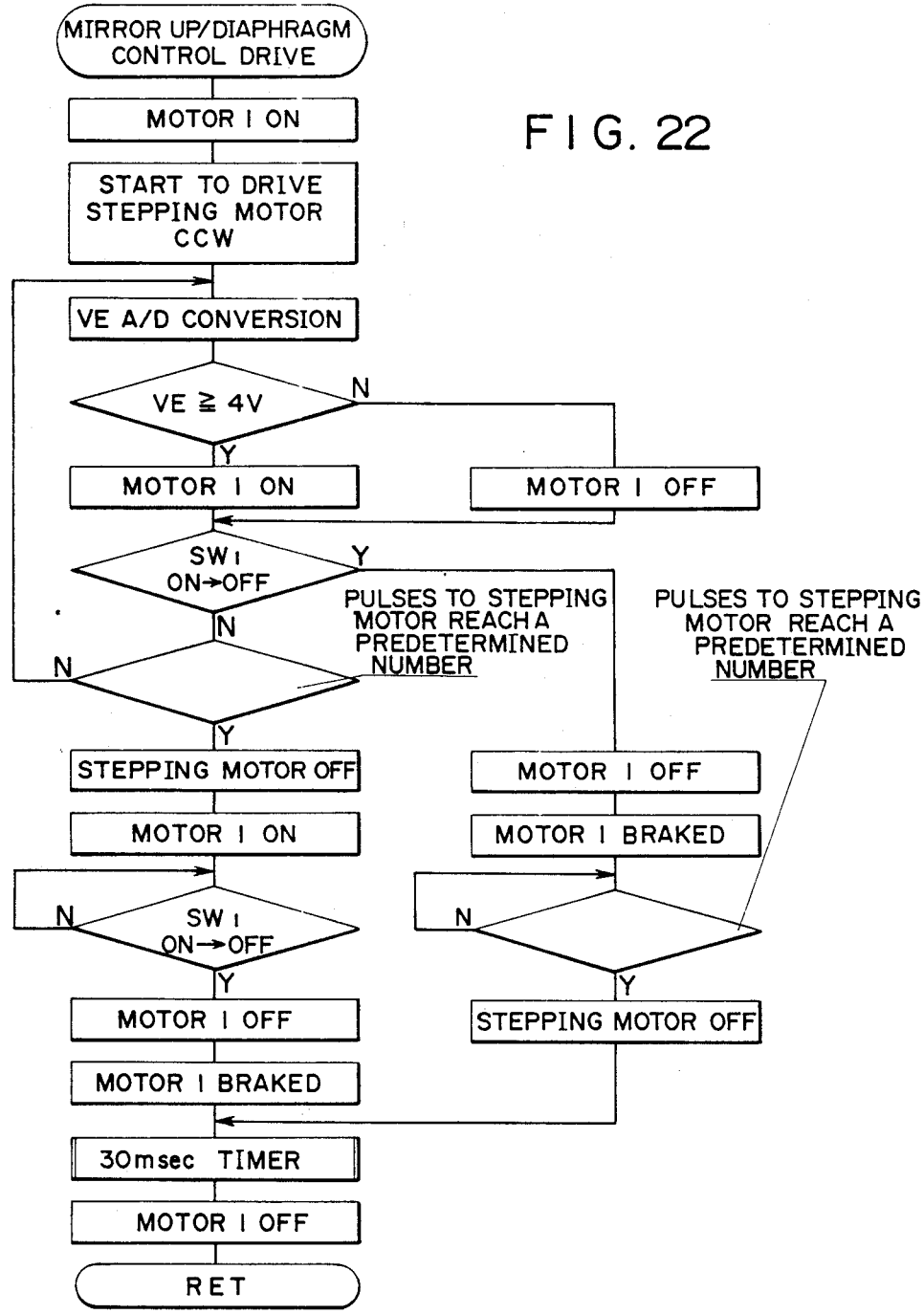

Referring to a flow chart shown in FIG. 22 together with FIG. 19 which shows the mechanism, the mirror up/diaphragm controlling sequence will be described in detail. Referring to FIG. 19 which illustrates a phase of operation viewing the viewfinder, the diaphragm unit disposed within the lens barrel assumes a condition in which the pin 60 on the diaphragm control member 53 abuts against the stop 54a on the C-ring 54 to open the diaphragm blades 52. If a signal is now delivered from CPU 70 which causes the stepping motor 50 to rotate in a direction to reduce the diaphragm aperture, the motor drive circuit 76 successively applies a voltage to the stepping motor 50 which causes its output shaft to rotate in the direction of the arrow C. The rotation of the motor 50 is then transmitted through the drive gear 55 to the sector gear 53b, causing the diaphragm control member 53 to rotate in the direction of the arrow A, whereby the diaphragm blades 52 are driven in a direction to reduce the diaphragm aperture. At this time, the diaphragm open switch SW6 changes from its ON to OFF condition. When the stepping motor 50 has rotated through a number of steps corresponding to αAV value which is calculated by CPU 70, the latter delivers a signal to the motor drive circuit 76 which ceases the motor drive, thus bringing the motor 50 to a stop. Thereupon, the diaphragm control member 53 disposed within the lens barrel also ceases to rotate, and the diaphragm aperture is controlled to a proper value as calculated.

On the other hand, prior to the diaphragm controlling operation, CPU 70 delivers a control signal to the motor drive circuit 76, causing the rotary shaft of the motor 1 to rotate clockwise. This causes the output gear 2 and the gears 3, 4, 5 and 6 to rotate in respective directions of associated arrows. As a result, the shutter 13 is released from the condition which it maintained since the completion of the charging operation and is ready to run while the mirror 15 begins its upward movement. Upon completion of the upward movement of the mirror which is achieved by the rotation of the cam drive gear 6, the circuit between the conductive contact 7 and the conductive pattern 8b on the substrate 8 is broken, whereupon CPU 70 ceases to operate the motor 1.

Considering the operation of the electrical circuit, CPU 70 initially places an "H" level on an output terminal C4 to turn transistor 86 and hence the motor 1 ON. It then starts to drive the stepping motor 50, thus initiating a diaphragm controlling operation. At this time, CPU 70 delivers pulses to output terminals C7 to C14 in a predetermined order, and consequently, transistors 89 to 96 are repeatedly turned ON and OFF to drive the stepping motor 50 counter-clockwise. The A/D conversion of the supply voltage VE is then made. If VE $\geq 4$ V, the concurrent drive mode is established by turning the motor 1 also ON. On the contrary, if VE < 4 V, the motor 1 is turned OFF, thus establishing the sequential drive mode.

CPU 70 then examines the ON/OFF condition of the switch SW1 through an input from the input terminal C18, and if it is ON, it determines that the mirror is in the process of upward movement. It then examines if the number of pulses for the stepping motor has reached a predetermined number, and if it has not, it determines that the diaphragm controlling operation is under way, and returns to the step which precedes the A/D conversion of the supply voltage VE.

When repeating the loop of the concurrent drive for both motors, any change in the level of the supply voltage VE causes a switching between the concurrent drive and the sequential drive. If it is found that the switch SW1 changes from ON to OFF in this loop, it is determined that the upward movement of the mirror has been completed. Accordingly, CPU 70 places an "L" level on its output terminal C4 to turn the motor 1 OFF, and then place an "L" level on its output terminal C3 to turn transistor 85 ON, thus braking the motor 1 by short-circuiting it.

The stepping motor 50 continues to be driven under this condition until the number of pulses reaches a predetermined value, whereupon it is turned OFF. A 30 msec timer is then started, and after the timer has timed out, the motor 1 is turned OFF. The purpose of this timer is to secure a braking time for the motor 1.

If the number of pulses for the stepping motor 50 reaches a predetermined value during the concurrent drive of both motors, it is determined that the diaphragm controlling operation has been completed, thus turning the stepping motor OFF. Since then the motor 1 may be OFF, it is turned ON. The motor 1 is turned OFF at the time when the switch SW1 changes from ON to OFF, followed by a braking action applied to the motor 1. The 30 msec timer is then started, and after it has timed out, the motor is turned OFF. This completes the present sequence.

Figure 23:
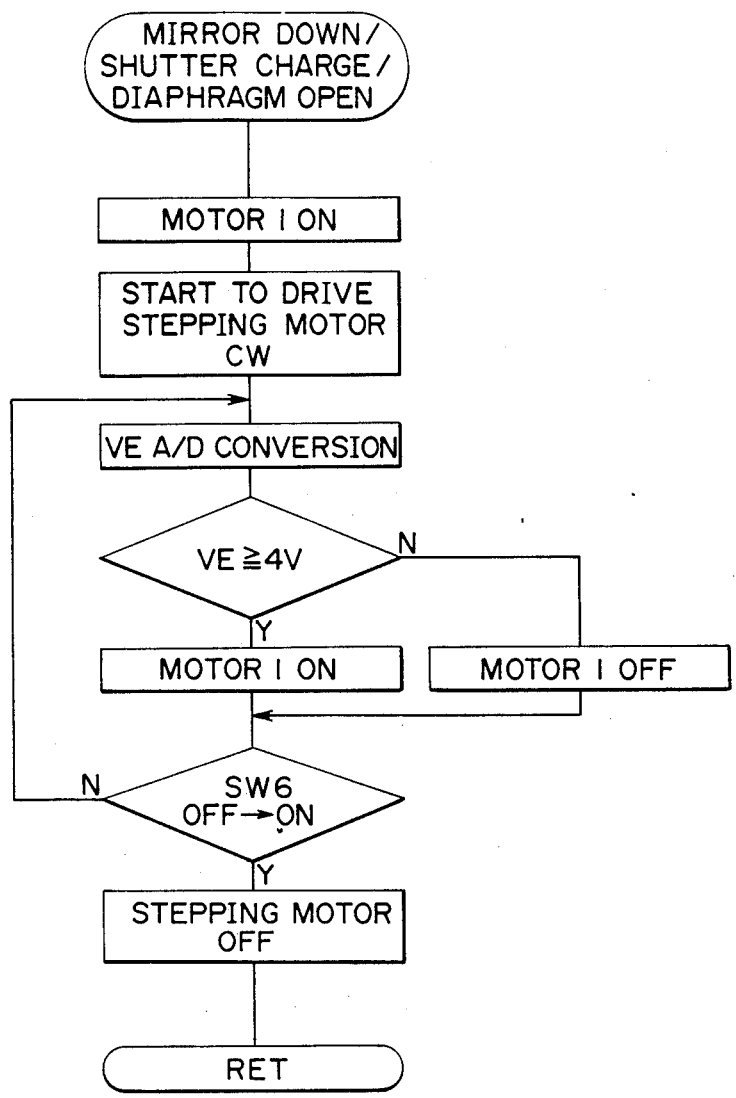

Referring to a flow chart shown in FIG. 23 together with FIG. 19, the mirror down/shutter charging/diaphragm opening sequence will now be described. Initially CPU 70 delivers a signal which causes the stepping motor 50 to rotate in a direction to open the diaphragm. The motor drive circuit 76 successively applies a voltage to the motor 50 which causes its output shaft to rotate in the direction of the arrow D. Consequently the diaphragm control member 53 rotates in the direction of the arrow B, thus opening the diaphragm blades 52. When the pin 60 abuts against the stop 54a, the diaphragm opening switch SW6 changes from OFF to ON. Thereupon CPU 70 detects that the diaphragm has reached its open condition and delivers a stop signal to the motor drive circuit 76, thus ceasing the operation of the motor 50.

Prior to the diaphragm opening operation, CPU 70 delivers a control signal to the motor drive circuit 76 which causes the motor 1 to rotate again clockwise. This causes the output gear 2 and the gears 3, 4, 5 and 6 to rotate in respective directions indicated by associated arrows, whereby the mirror 15 moves down and a charging operation of the shutter 13 is initiated.

When the diaphragm is open and the diaphragm opening switch SW6 has changed to ON, CPU 70 delivers a control signal to the motor drive circuit 76 which causes the output shaft of the film winding motor 20 to rotate clockwise. This causes the output gear 21, the gears 22, 23, 24, 25 and 26a and the spool 26 to rotate in respective directions indicated by associated arrows. As a consequence, the film 31 begins to be taken up on the spool 26 and the follower sprocket shaft 27 rotates in the direction indicated by the arrow as the film 31 runs. The rotation of the sprocket shaft 27 causes the gear 28 to rotate in the direction of the arrow, whereby the conductive contact 29 slides along the substrate 30, thus repeatedly making and braking the circuit between the conductive patterns 30a and 30b. In this manner, CPU 70 detects the amount of film feed. When the number of pulses, developed by the repeated make and brake of the conduction between the patterns 30a and 30b, reaches a number which corresponds to one film frame, CPU 70 ceases the rotation of the motor 20, thus completing the film winding operation. Upon completion of the shutter charging operation achieved by the rotation of the motor 1, the conduction between the conductive contact 7 and the conductive pattern 8b is established, whereupon CPU 70 ceases the rotation of the motor 1. The termination of the operation of the motors 1 and 20 completes a series of photographing operations for one frame, and the camera is now ready to initiate another series of photographing operations for the next frame.

Considering the operation of the electrical circuit which operates the mechanism in the manner mentioned above, the motor 1 is initially turned ON, followed by starting the stepping motor 50. CPU 70 delivers pulses to its output terminals C7 to C14 in a predetermined order which is different from the order used for the diaphragm opening operation, thus driving the stepping motor 50 clockwise. The A/D conversion of the supply voltage VE is then made. If $VE \geq 4V$ the concurrent drive mode is established by turning the motor 1 ON. Alternatively, if $VE < 4V$, the sequential drive mode is established by turning the motor 1 OFF. CPU 70 then examines the ON/OFF condition of the switch SW6 through its input terminal C16. If it is OFF, CPU 70 determines that the diaphragm controlling operation is under way, and returns its operation to a step which precedes the A/D conversion of the supply voltage VE. As the loop containing the concurrent drive for the motors is repeatedly followed, a change in the level of the supply voltage VE causes a switching between the concurrent drive and the sequential drive. If the switch SW6 changes from OFF to ON in this loop, it is determined that the diaphragm opening operation has been completed, and hence the stepping motor is turned OFF to complete the present sequence.

It is to be noted that the length of time required for the mirror down/shutter charging is greater than the length of time required for the diaphragm opening operation, and hence the mirror down/shutter charging operation is under way when the diaphragm opening operation is completed.

Figure 24:
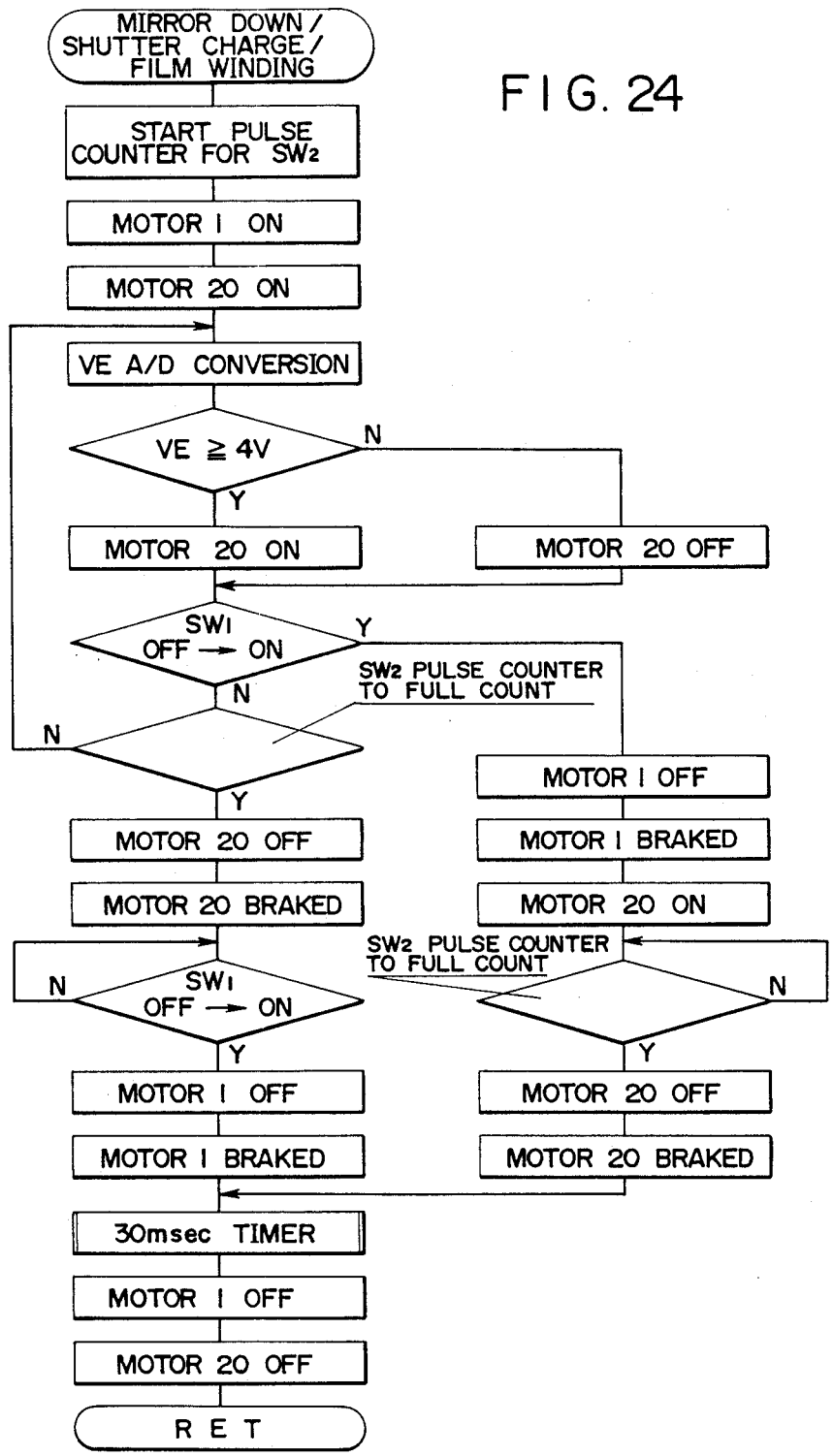
Figure 25A:
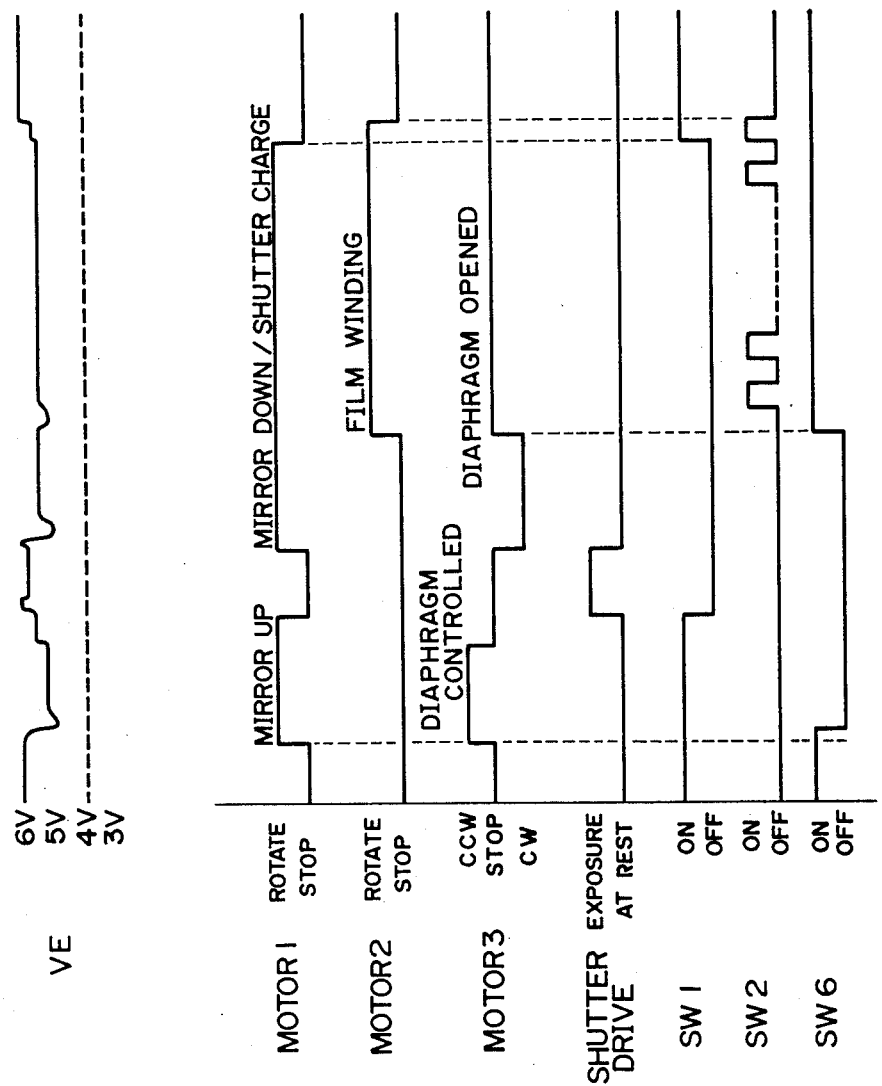

Referring to FIG. 24, the mirror down/shutter charging/film winding sequence will now be described. In the process of film winding, the switch SW2 is repeatedly turned ON and OFF, and the winding operation is determined 25 to be completed when the number of ON/OFF conditions reaches a given value. Accordingly, CPU 70 initializes a count in a pulse counter for the switch SW2, and then starts the counting operation.

The motor 1 is turned ON, and the mirror down/shutter charging operation is continued. CPU 70 continues to place an "H" level on its output terminal C6 to turn transistor 88 ON, thus turning the motor 20 ON. This initiates the film winding operation. The A/D conversion of the supply voltage VE is then made, and depending on the result of such conversion, the motor 20 is turned ON if $VE \geq 4V$ to establish the concurrent drive mode or the motor 20 is turned OFF to establish the sequential drive mode if $VE < 4V$. The ON/OFF condition of the switch SW1 is then examined. If it is OFF, it is determined that the operation is in the process of the mirror down/shutter charging operation, and the program proceeds to a determination to see if the count in the pulse counter associated with the switch SW2 has reached a given value. If not, the program returns to a step preceding the A/D conversion of the supply voltage VE. During such looping operation, a switching between the concurrent and the sequential drive mode is sequentially made in accordance with the change in the supply voltage VE. If the switch SW1 changes from OFF to ON in such loop, it is determined that the mirror down/shutter charging operation has been completed. Accordingly, the motor 1 is turned OFF, and then the motor 1 is braked by short-circuiting it. It is to be noted that it is possible that the motor 20 may be turned OFF at a point preceding this branch. Hence the motor 20 is now turned ON. When a given pulse count for the switch SW2 is reached, the motor 20 is turned OFF, and then braked by short-circuiting it. A 30 msec timer is started, and after it has timed out, the motors 1 and 20 are turned OFF to conclude the present sequence.

The operation of this embodiment will now be described with reference to timing charts shown in FIGS. 25A and 25B. FIG. 25A illustrates the timing of operation when a sufficient power supply capability is available, and in this instance, all the sequences are in the concurrent drive mode. By contrast, in FIG. 25B, it is assumed that the power supply capability has been degraded to a point such that the supply voltage VE is reduced to 4 V or less during the initial phase of the mirror up and the diaphragm controlling sequence. Consequently, the motor 1 is OFF, and the sequential drive mode is employed. However, if subsequently the supply voltage VE returns to a level above 4 V, the concurrent drive mode is entered again. In addition, the supply voltage VE is reduced below 4 V during the initial phase of the mirror down/shutter charging operation and the film winding sequence where the sequential drive mode is temporarily used.

The fourth embodiment described above can be modified or changed in various ways. By way of example, a switching between the concurrent drive and the sequential drive according to the invention may be employed with only one of the three sequences, namely, the mirror up/diaphragm controlling sequence, the mirror down/shutter charging/ diaphragm opening sequence and the mirror down/shutter charging/film winding sequence while the remaining two sequences may be performed with a fixed mode, either the concurrent drive or the sequential drive.

In the present embodiment, a uniform threshold of 4 V is employed for the supply voltage VE in order to determine the choice between the concurrent drive and the sequential drive in all of the three sequences, but it should be understood that different thresholds may be employed for the supply voltage VE so as to meet the requirements of the respective motor responses.

Additionally, in a single sequence, a threshold for the supply voltage VE when switching from the concurrent drive to the sequential drive may be chosen to be equal to 3.8 V while a threshold for the supply voltage VE when switching from the sequential drive to the concurrent drive may be chosen to be equal to 4.0 V, thus providing a hysteresis effect.

Figure 25C:
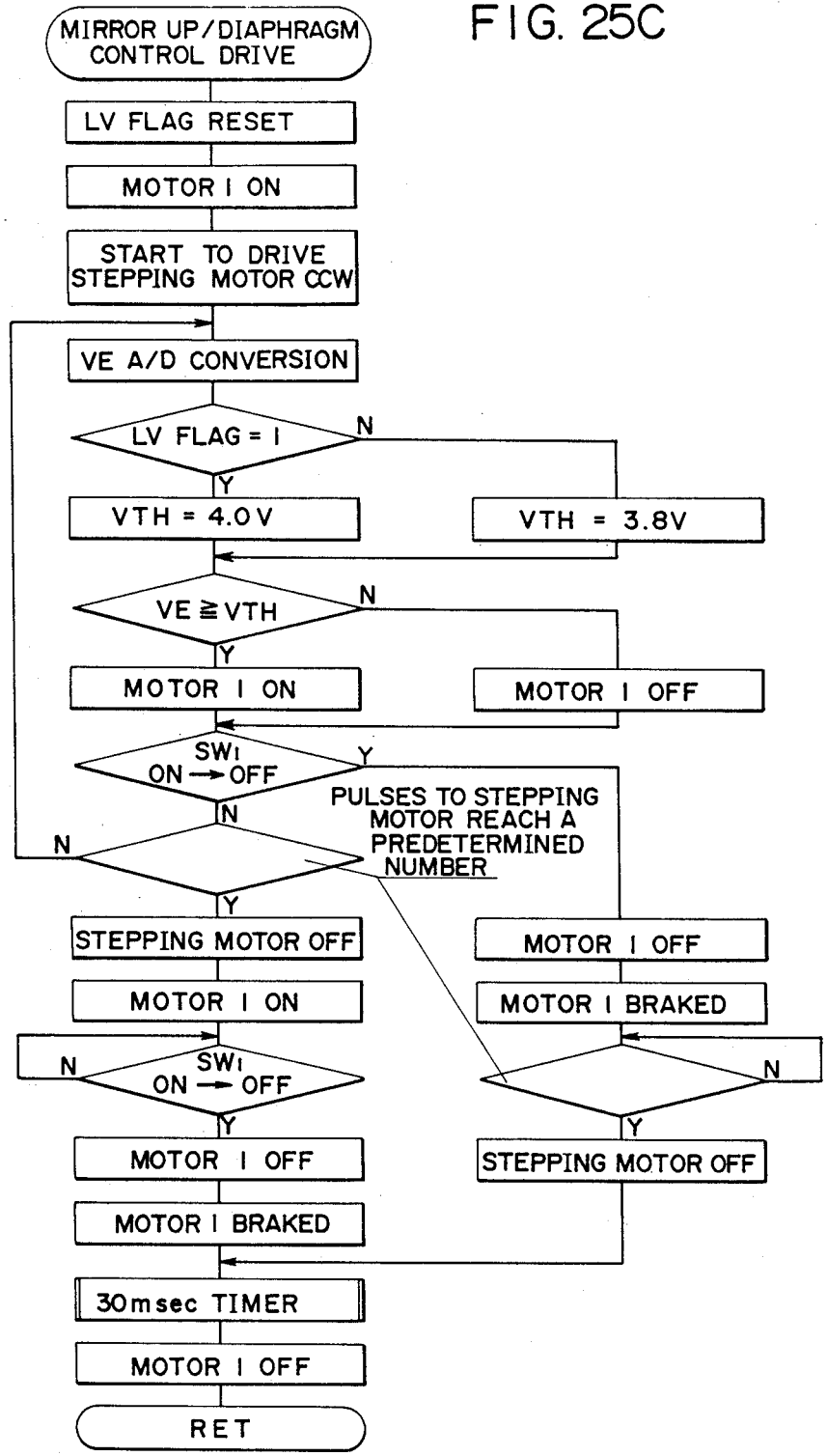

The application of this technique to the mirror up/-diaphragm controlling sequence is illustrated by a flow chart shown in FIG. 25C. Initially, LV flag (Low Voltage flag) is reset. This LV flag is reset when the supply voltage VE reduces below a threshold VTH for switching between the concurrent drive and the sequential drive. The motor 1 and the stepping motor then begin to be driven, followed by the A/D conversion of the supply voltage VE. Then LV flag is examined, and if it is set to 1, a choice is made so that VTH =4.0 V while if LV flag is reset to 0, a choice that VTH =3.8 V is made. A comparison is then made between VE and VTH. If VE ≧VTH, the motor 1 is turned ON while if VE <VTH, the motor 1 is turned OFF. The subsequent operation occurs in the same manner as shown in the flow chart of FIG. 22 and therefore will not be described. As compared with the first embodiment, this modification provides a hysteresis effect in the choice of the threshold VTH, thus preventing the occurrence of a frequent switching between the concurrent drive and the sequential drive when the supply voltage VE fluctuates around the threshold VTH.

FIG. 26 shows an electrical circuit used for a fifth embodiment of the invention, but it should be noted that only a portion thereof which differs from the electrical circuit of the fourth embodiment is illustrated. A reference voltage source 110 delivers a reference voltage of 4 V, for example. This output is compared against a supply voltage VE in a comparator 111, the output of which is delivered to CPU 70. CPU 70 includes an input terminal C15 (FIG. 20), which represents an external interrupt terminal, receiving a rising or falling edge of a voltage which acts as an interrupt.

Figure 27:
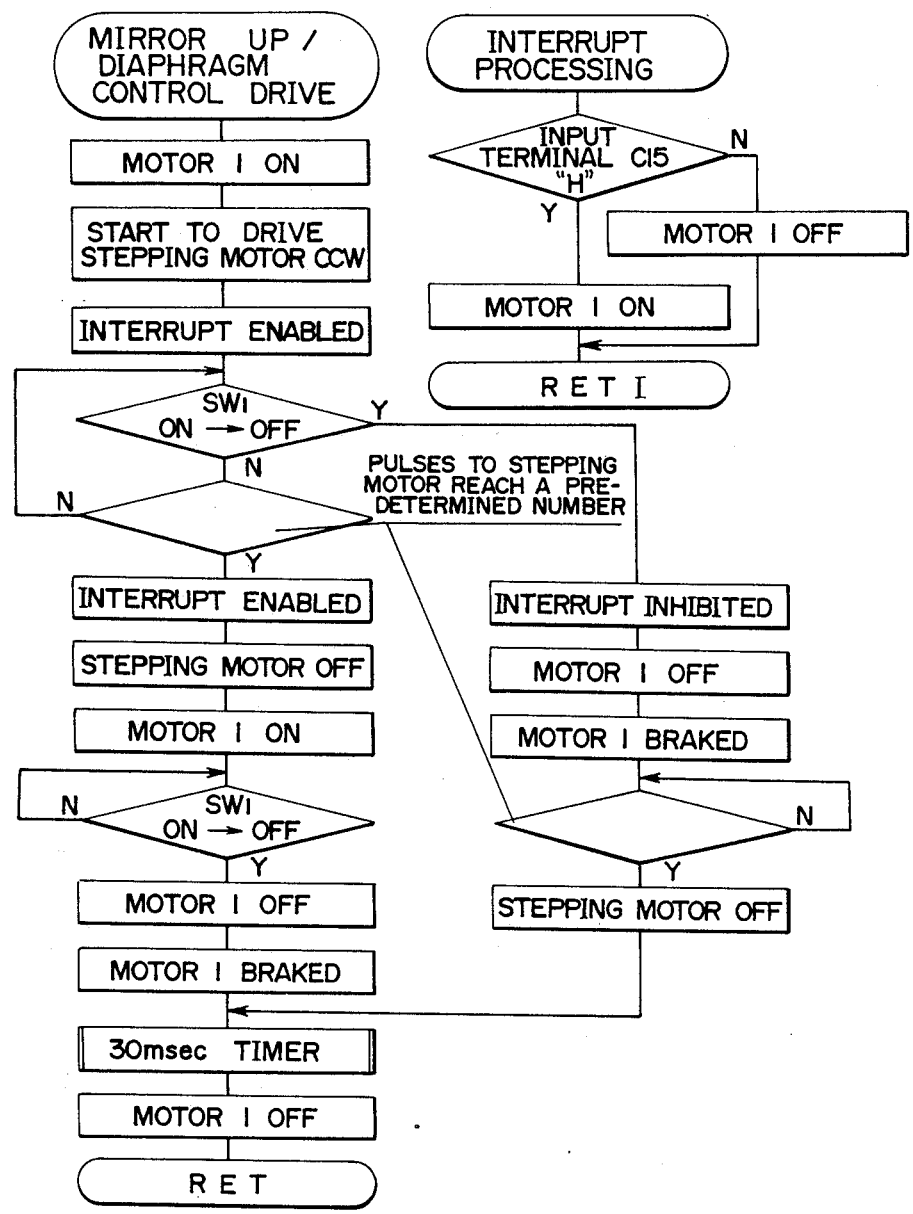
FIG. 27 is a flow chart of the fifth embodiment.

FIG. 27 is a flow chart illustrating the operation of the present embodiment as applied to a mirror up/diaphragm controlling sequence. Initially the motor 1 is turned ON, and then the stepping motor is started for rotation in the counter-clockwise direction. An external interrupt function from the input terminal C15 is then enabled. The ON/OFF condition of the switch SW1 is then examined. If it is ON, it is determined that the operation is in the process of the upward movement of the mirror. A number of pulses for the stepping motor is then examined to see if it has reached a determined number, and if not, it is determined that the operation is in the process of the diaphragm controlling operation and the program returns to a step which precedes the decision to see ON/OFF condition of the switch SW1. The described loop is repeated, and if the supply voltage VE reduces below or above the reference voltage, the comparator 111 provides an inverted output, thus producing an interrupt. During the interrupt processing, if the input terminal C15 assumes an "H" level, meaning that VE ≧4 V, the motor 1 is turned ON, thus employing the concurrent drive. If the input terminal C15 assumes an "L" level, meaning that VE <4 V, the motor 1 is turned OFF, thus employing the sequential drive. When the switch SW1 changes from ON to OFF or the given number of pulses have been applied to the stepping motor during the time the loop operation is repeated, the program exits from this loop and disables the interrupt, followed by turning the motor 1 OFF, and thus driving the stepping motor 50 alone. The operation which takes place subsequently remains the same as in the fourth embodiment, and therefore will not be described.

Figure 28A:
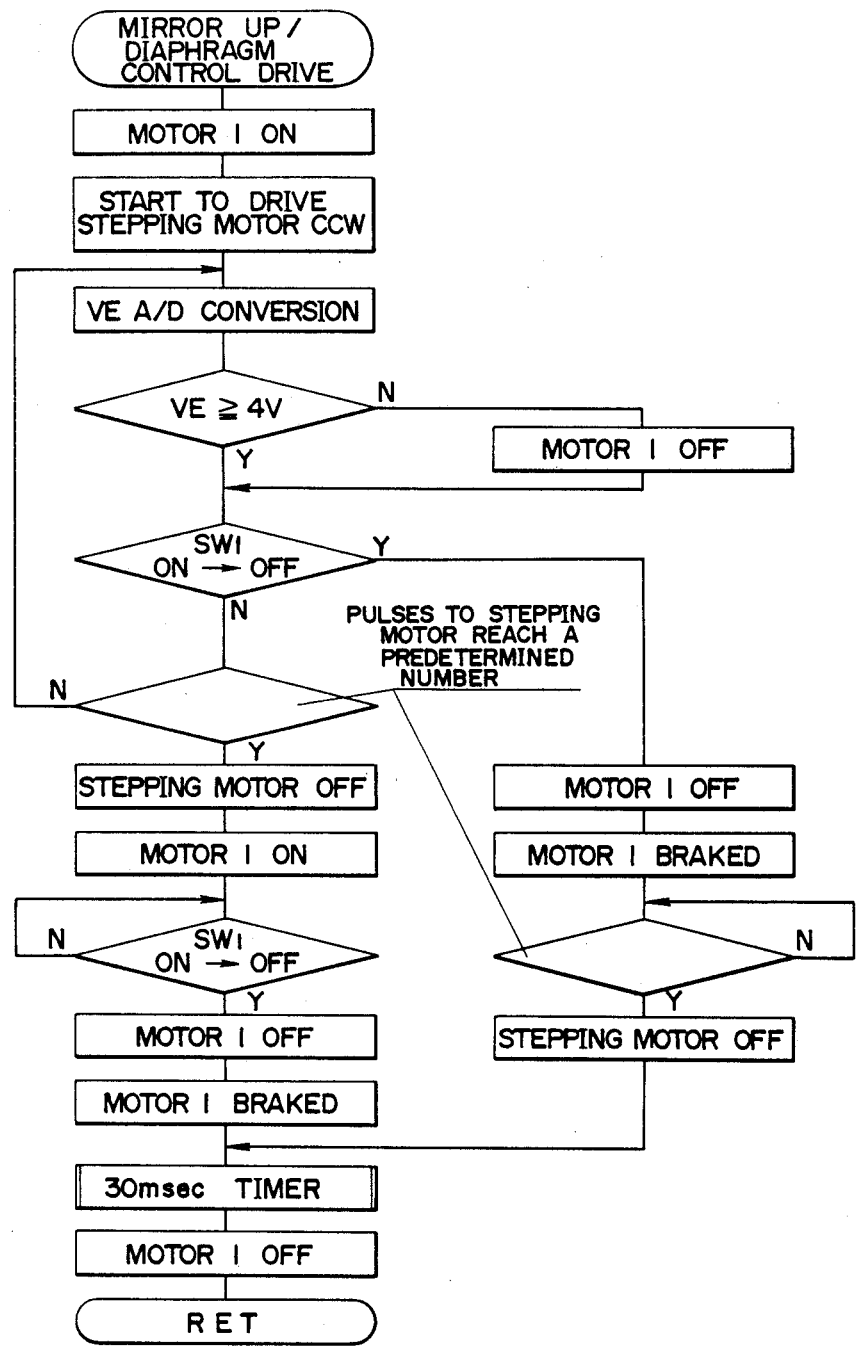
FIGS. 28A to 28E are a series of flow charts illustrating the operation of a motor driven camera according to a sixth embodiment of the invention.

A sixth embodiment of the invention will now be described, which includes the same electrical circuit as that of the fourth embodiment. The sixth embodiment differs from the fourth embodiment in that a switching to the sequential drive occurs when the supply voltage VE once reduces below 4 V as the motors are concurrently driven, and the operation subsequently does not switch back to the concurrent drive if the supply voltage VE rises above 4 V. The application of this embodiment to a mirror up/diaphragm controlling sequence is illustrated by a flow chart shown in FIG. 28A.

Another embodiment which is described below represents a development of the concept embodied in the sixth embodiment, namely, its application to a consecutive photographing mode in which successive pictures are taken while the release switch is maintained ON. In the consecutive photographing mode, it is undesirable that the drive mode be frequently switched in a careless manner. Accordingly, in this embodiment, as soon as the supply voltage VE once reduces below 4 V, the LV flag is set, thus maintaining the sequential drive for all subsequent sequences.

Figure 28B:
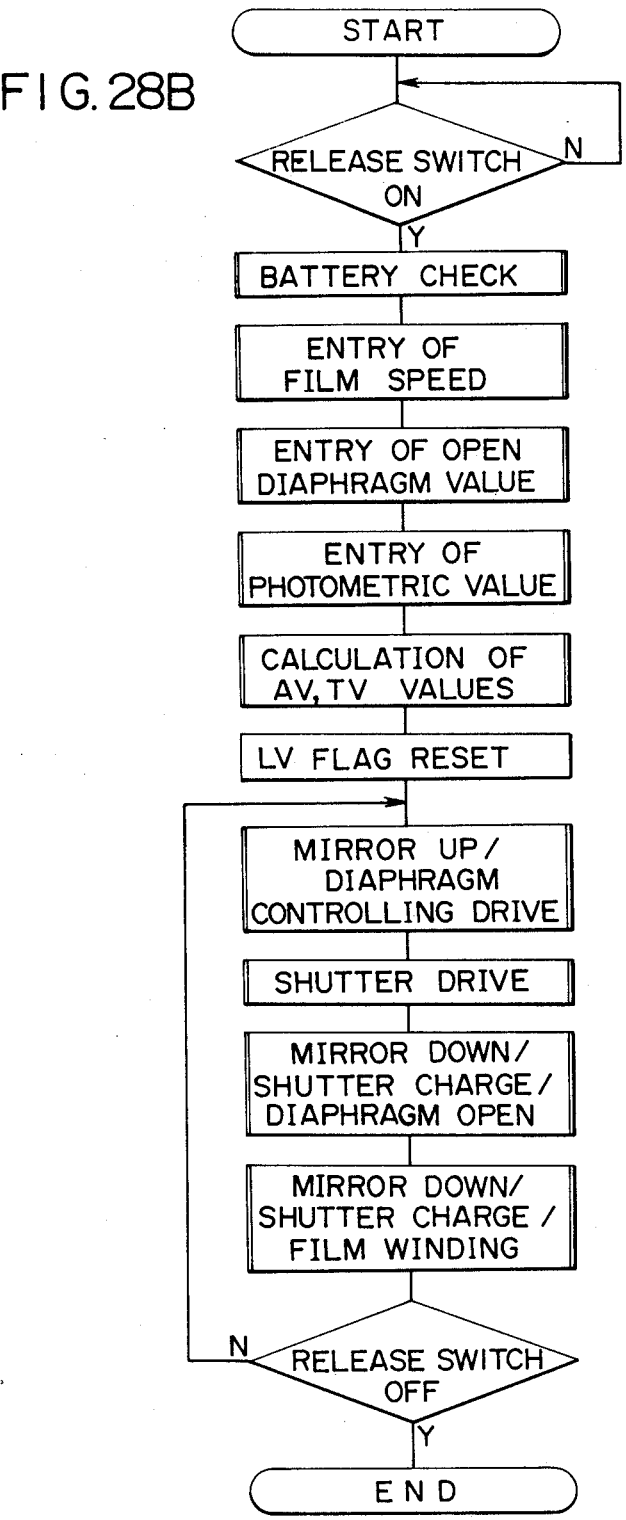
Figure 28C:
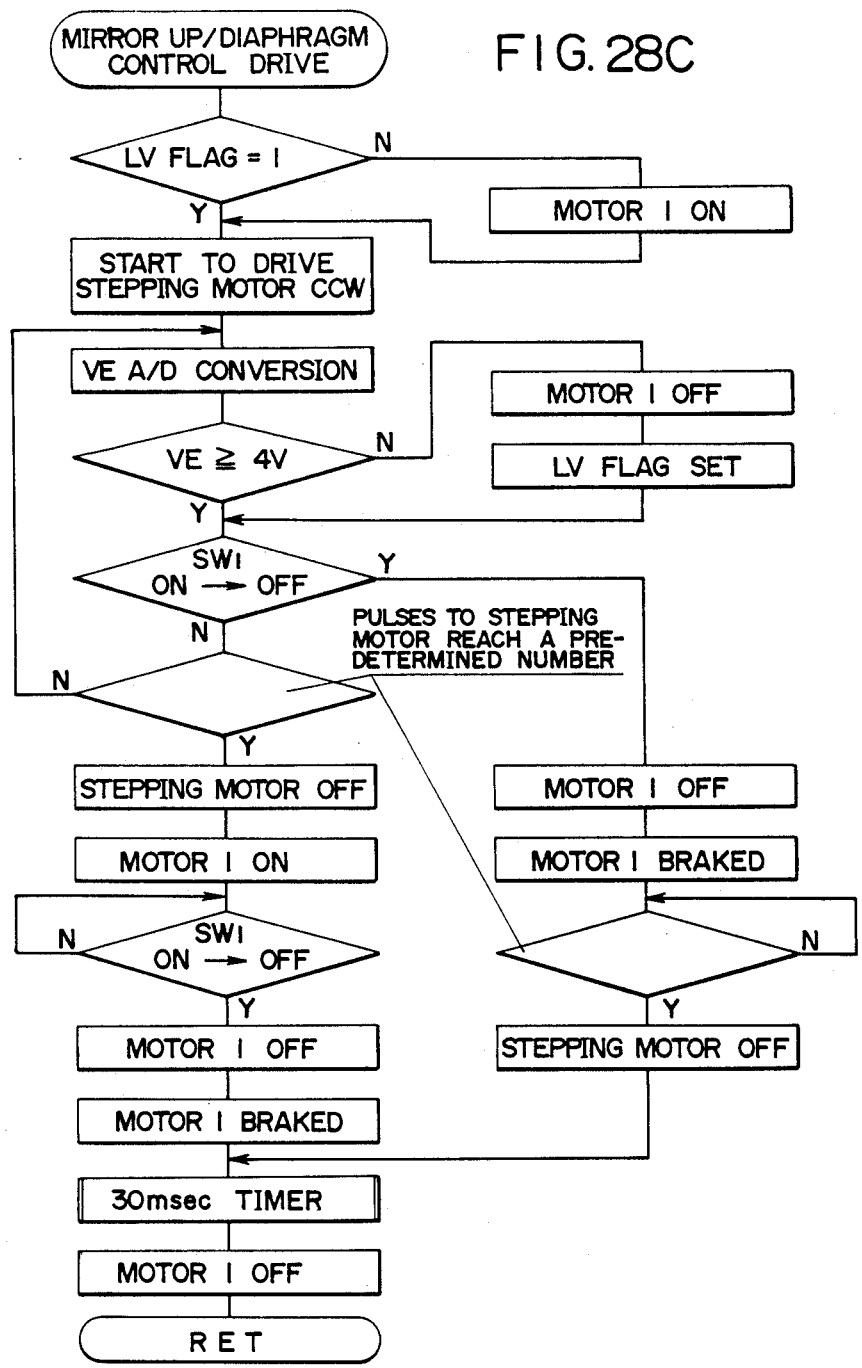
Figure 28D:
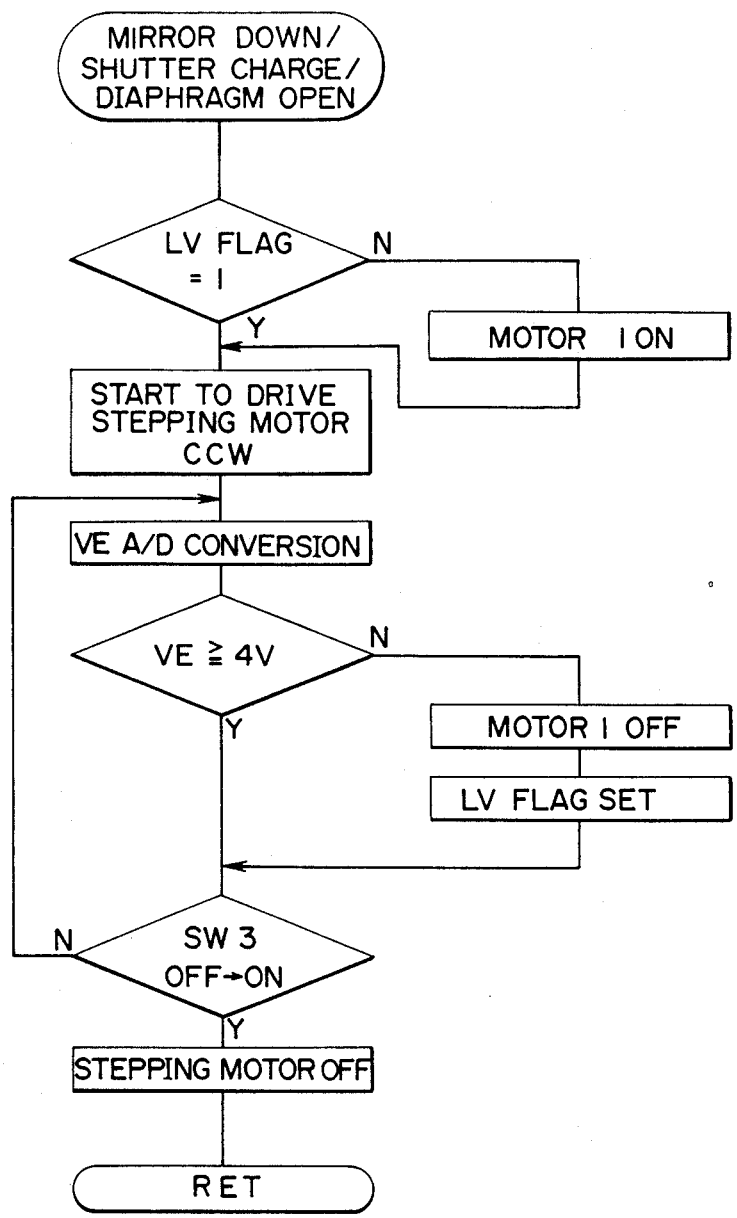
Figure 28E:
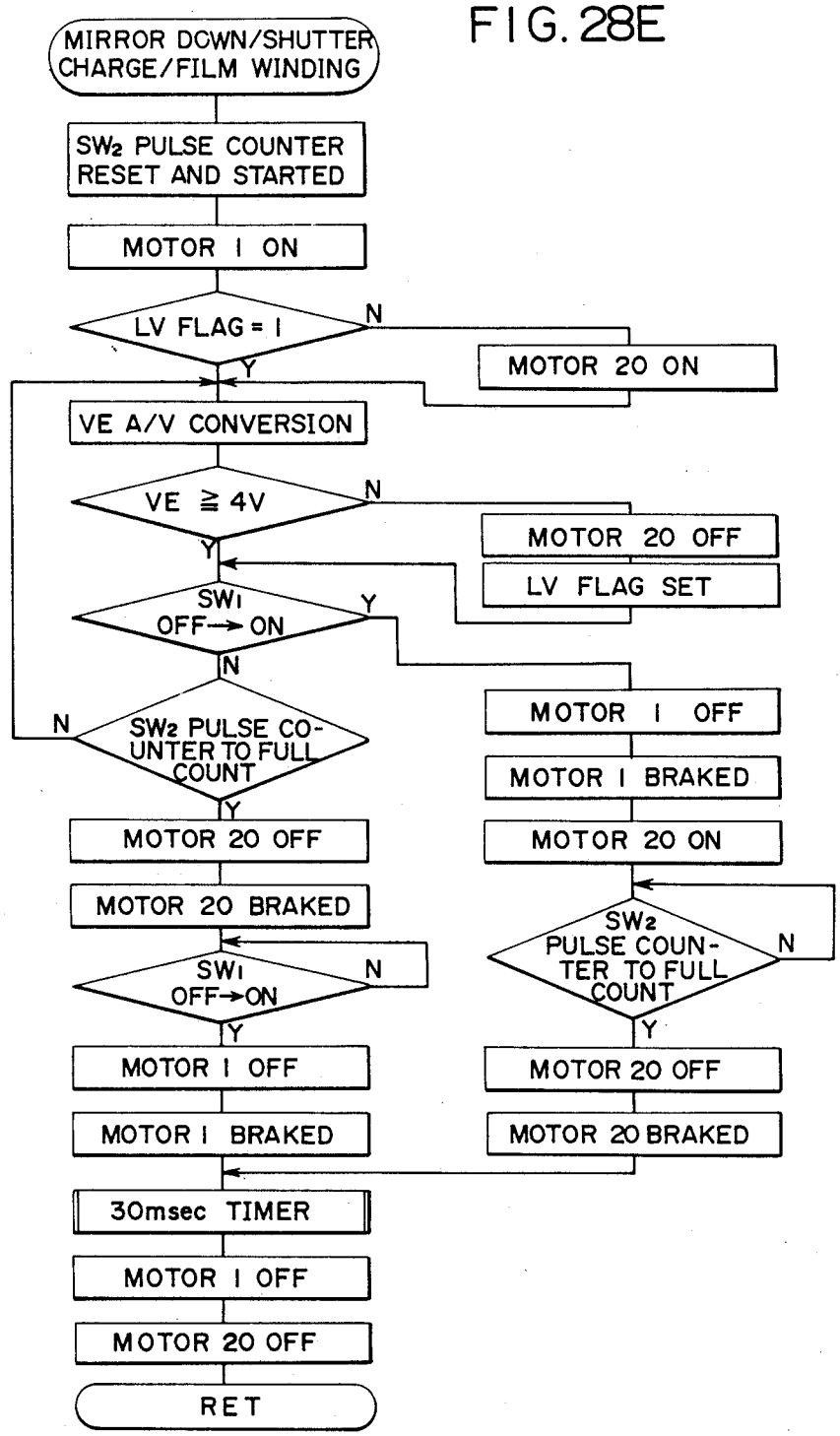

FIG. 28B shows a flow chart of a main program of the consecutive photographing mode; FIG. 28C is a flow chart which illustrates the mirror up/diaphragm controlling sequence; FIG. 28D is a flow chart which illustrates the mirror down/shutter charging/diaphragm opening sequence; and FIG. 28E is a flow chart which illustrates the mirror down/shutter charging/film winding sequence. It will be noted that a difference over the flow charts shown in FIGS. 22 to 24 is found in each sequence in that the release switch is turned OFF once the sequential drive is entered, and the operation does not return to the concurrent drive until the end of the consecutive photographing operation.

A seventh embodiment of the invention will now be described. The seventh embodiment uses the same electrical circuit as that of the fourth embodiment. In this embodiment, the capability of the power supply is determined during the initial sequence after it is determined that the release switch has been turned ON, and either the concurrent drive or the sequential drive is chosen depending on the result of such determination. A switching between the modes does not occur during the time the motor or motors are being driven.

FIG. 29 is a flow chart of the battery check operation. Initially an "H" level is placed on the output terminal C2 and the dummy load is turned ON. After 4 msec timer has timed out, the supply voltage VE is subject to A/D conversion. Then an "L" level is placed on the output terminal C2 to turn the dummy load OFF. If VE $\geq$ 4.2 V, the availability of a sufficient power supply is determined, and the D flag (a flag which selects the concurrent drive) is set and the program returns. If 3.6 V $\leq$ VE < 4.2 V, a degree of degradation in the capability of the power supply is determined. Accordingly, a battery warning is indicated by the display means 112 and the D flag is reset since the concurrent drive is impossible, whereupon the program returns. If VE < 3.6 V, the performance of a photographing sequence is determined to be impossible. Accordingly, the battery NG is indicated by the display means 112, and the release is locked. The program returns to the main routine for VE $\geq$ 3.6 V. However, before the mirror up/diaphragm controlling sequence, the D flag is examined. The concurrent drive is chosen if the D flag is set while the sequential drive is chosen if the D flag is not set.

Figure 30:
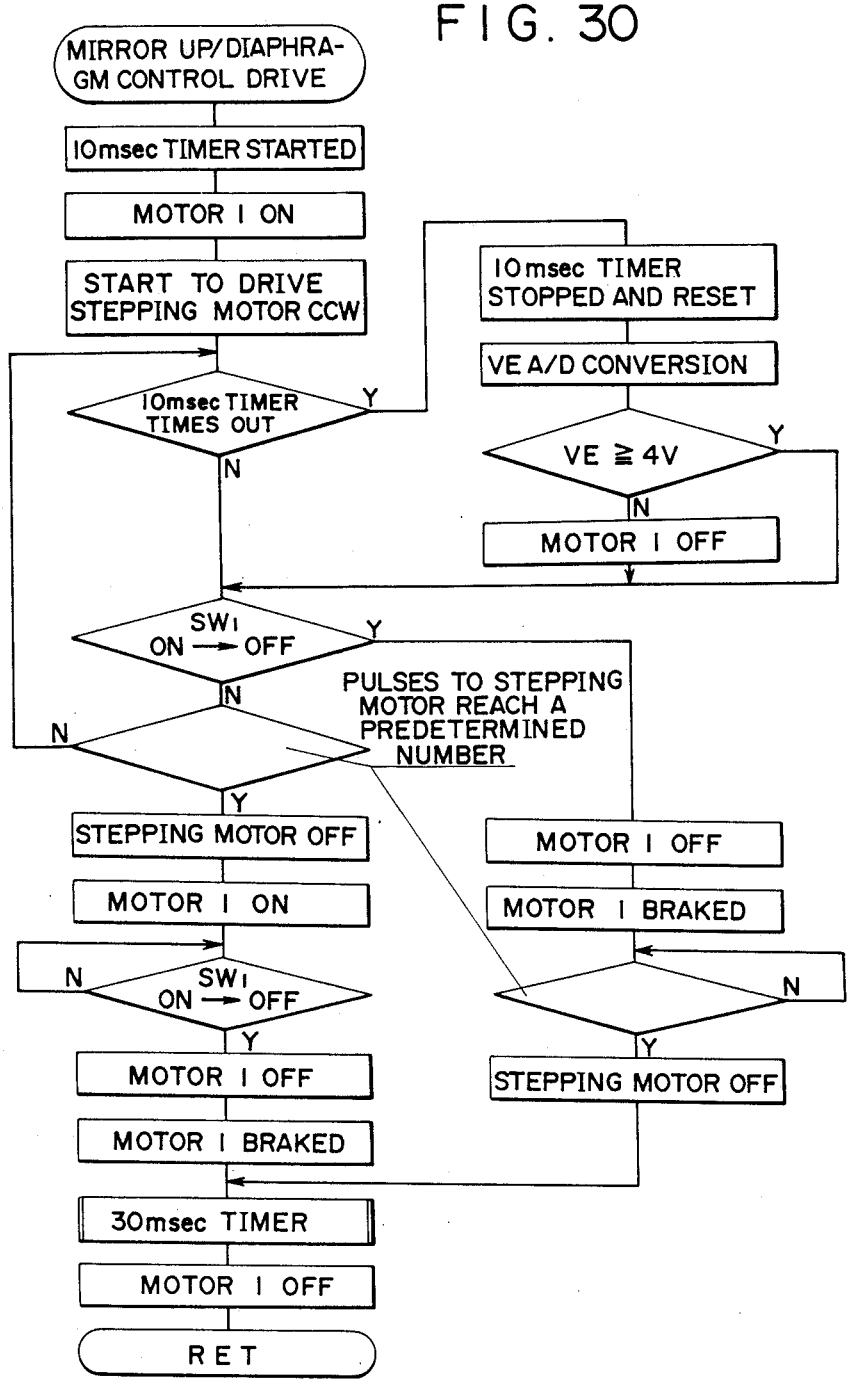
FIG. 30 is a flow chart of the operation of a motor driven camera according to an eighth embodiment of the invention.

An eighth embodiment of the invention will now be considered. The eighth embodiment uses the same electrical circuit as the fourth embodiment. In this embodiment, the concurrent drive takes place initially, and after a short time interval, the supply voltage VE is subject to A/D conversion. Susequently, the choice between the concurrent drive and the sequential drive is made depending on the prevailing level of the supply voltage VE. FIG. 30 is a flow chart illustrating the operation of the eighth embodiment as applied to the mirror up/diaphragm controlling sequence. A 10 msec timer is initially started, followed by turning the motor 1 ON and starting the stepping motor 50 to rotate counter-clockwise. In the loop in which the motor 1 and the stepping motor 50 are subject to the concurrent drive, the timer is examined, and when it times out, the timer is stopped, followed by the A/D conversion of the supply voltage VE. If VE $\geq$ 4 V, the concurrent drive is employed subsequently. On the contrary, if VE < 4 V, the motor 1 is turned OFF to choose the sequential drive. The subsequent operation remains the same as in the fourth embodiment.

It will be understood that there is a rush current into the motor which is at its maximum when starting it. Accordingly, it is most likely that the supply voltage will be depressed to its minimum value immediately after both motors are concurrently driven. Accordingly, this point in time is chosen to examine the supply voltage in order to determine the drive mode.

Figure 31:
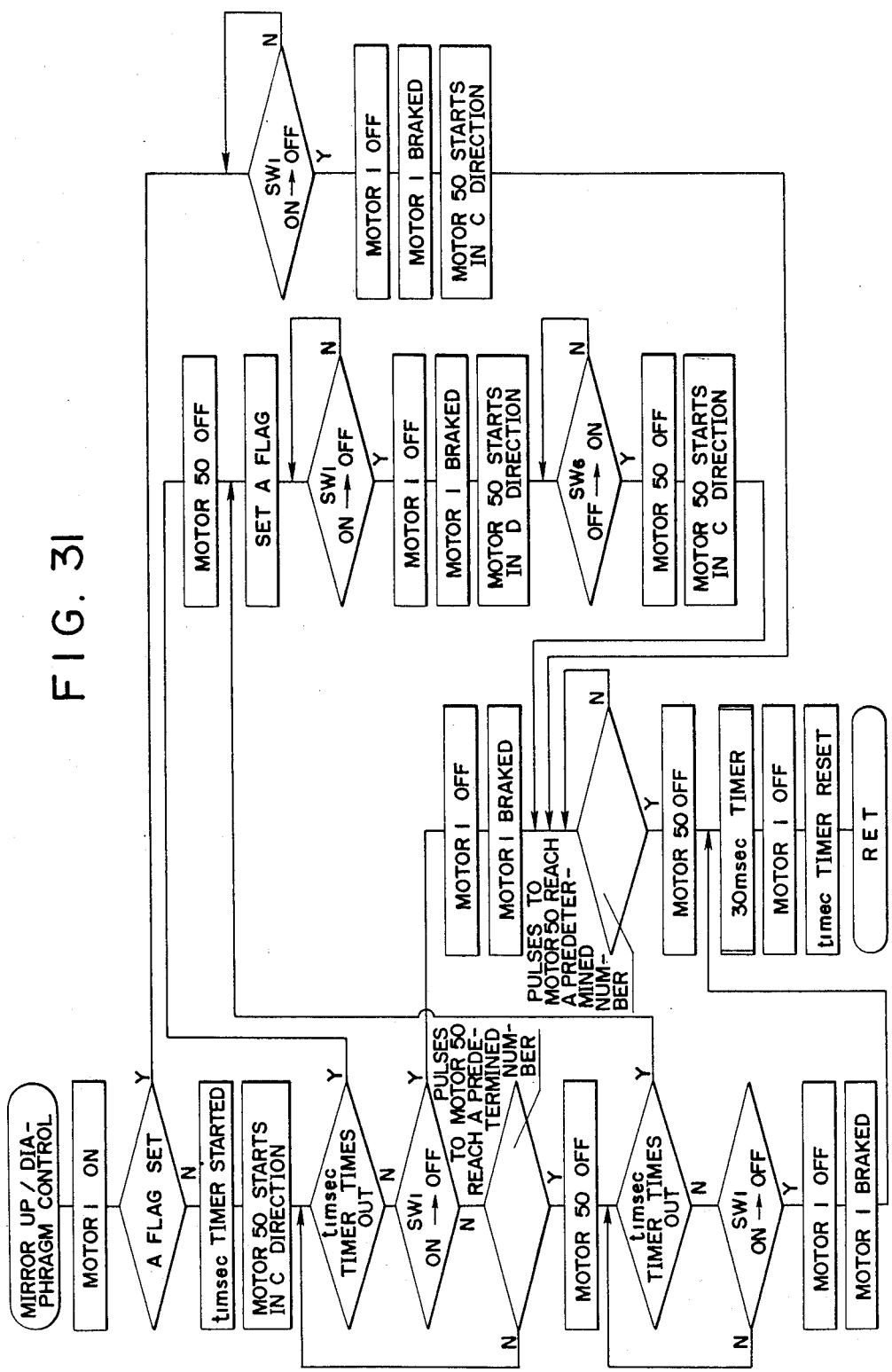
FIGS. 31 to 33 are flow charts of the operation of a motor driven camera according to a ninth embodiment of the invention.
Figure 32:
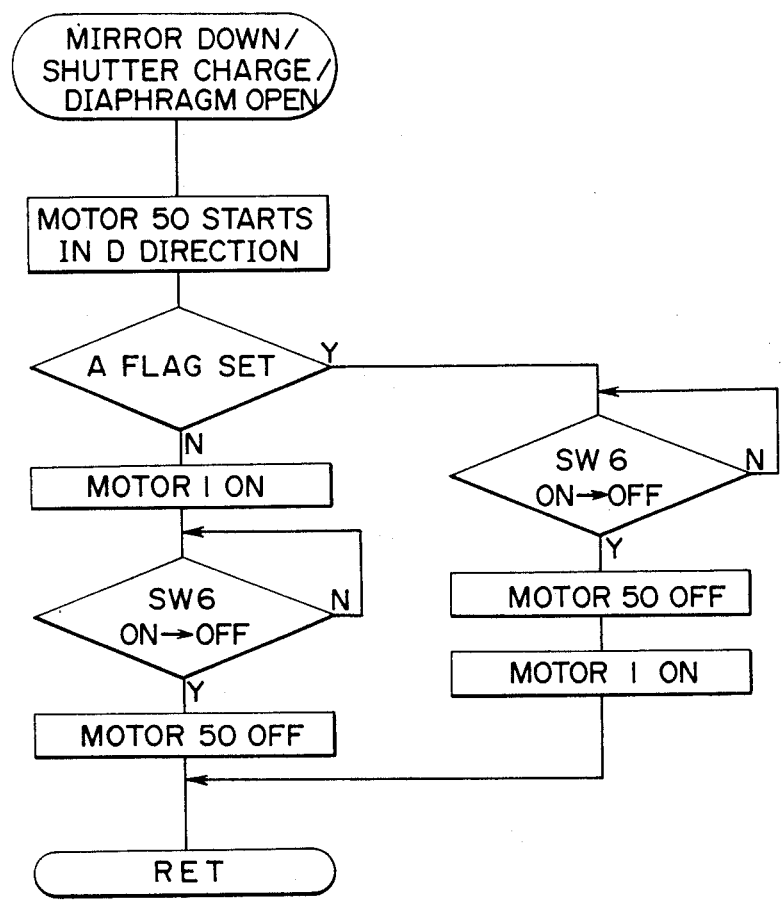
Figure 33:
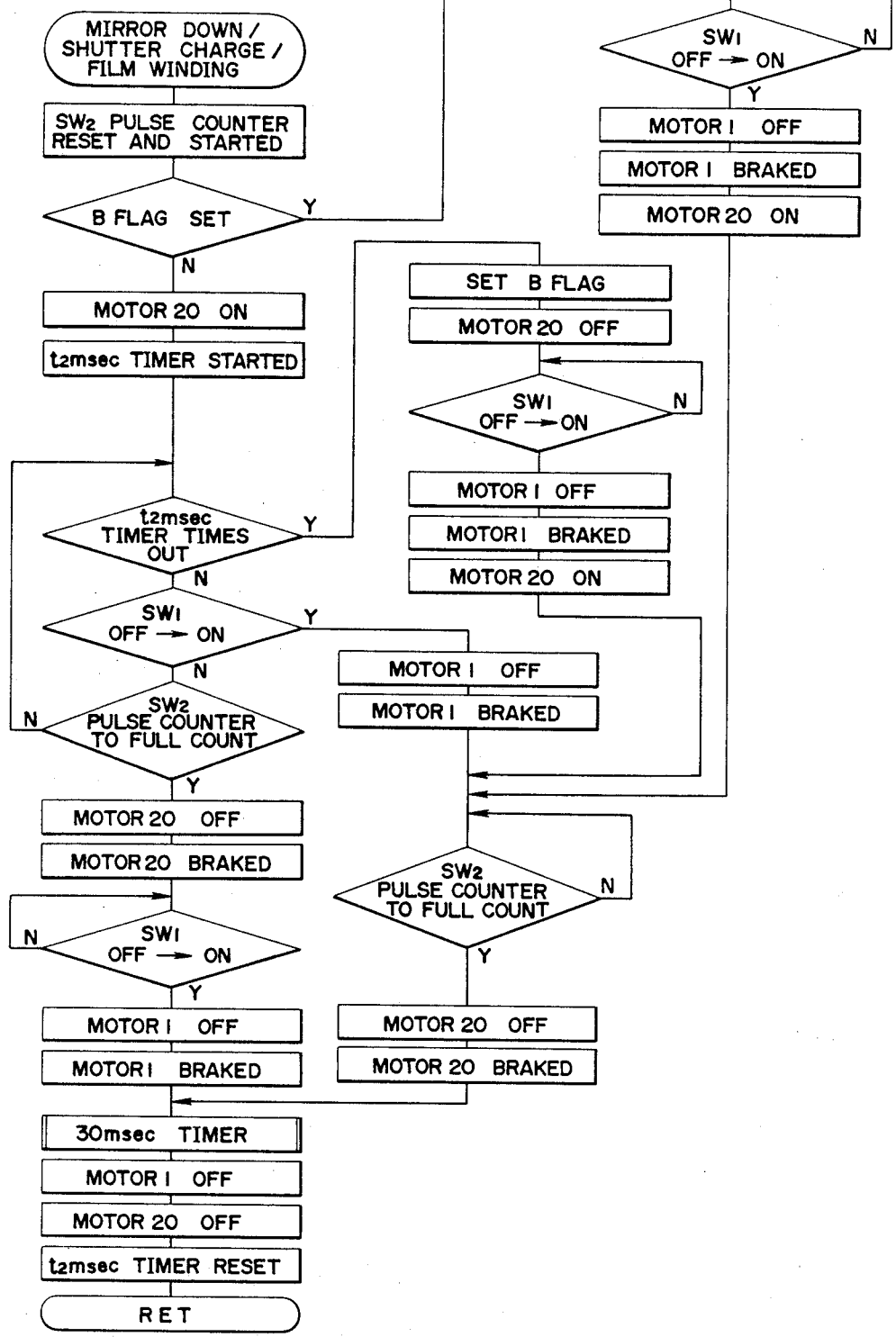
Figure 34:
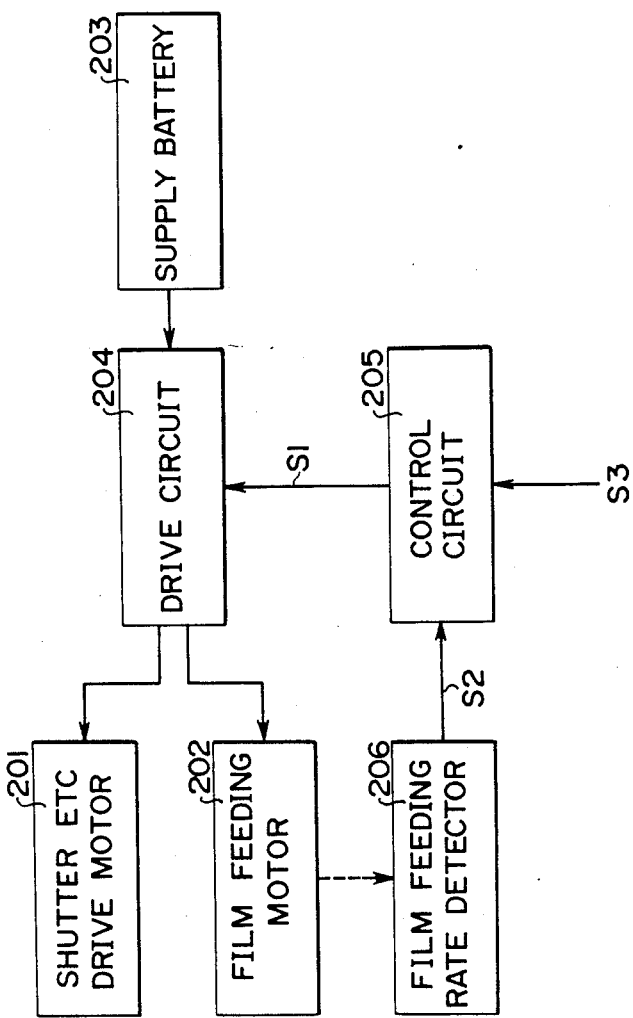
FIG. 34 is a block diagram of a conventional motor driven camera.

FIGS. 31 to 33 are flow charts illustrating the operation of a motor driven camera according to a ninth embodiment of the invention which accomplishes the sixth object initially mentioned. It is to be understood that the internal mechanism, the electrical circuit, their operations as well as the general flow of the program of this motor driven camera remain entirely the same as shown in FIGS. 19, 20 and 21, and therefore will not be described.

Summarizing the operational sequence of the ninth embodiment, the mirror driving motor 1 and the diaphragm driving stepping motor 50 are initially driven at the same time, and a length of time from starting to drive the motor 1 is determined. If the upward movement of the mirror is completed within a given time interval ($t_1$ msec), it is determined that there is no degradation in the performance of the storage battery, and the operational sequence is continued without change. If the upward movement of the mirror is not completed within the given time interval ($t_1$), the performance of the storage battery is determined to have been degraded to a point which prevents a satisfactory drive, and hence the motor 50 immediately ceases to be driven. The load upon the battery is reduced by sequentially driving the motor 1 first and then the motor 50, thus minimizing a voltage fall to enable the camera to be driven. Upon switching to the sequential drive, the A flag (a flag which is used to select the sequential drive for the subsequent mirror drive and diaphragm controlling sequence) is set. At the same time, because it is possible that the diaphragm driving, stepping motor 50 may be out of step, the diaphragm is once returned to its open condition after the completion of the upward movement of the mirror, and the diaphragm controlling operation is then tried again. If the A flag is set when the program indicated by the flow chart is to be executed, the motors 1 and 50 are sequentially driven from the beginning.

Describing the above operation in more detail with reference to a flow chart shown in FIG. 31, CPU 70 (see FIG. 20) initially places an "H" level on its output terminal C4 to turn transistor 86 ON, thus turning the motor 1 ON. The A flag is then examined, and if it is not set, the $t_1$ msec timer is started. CPU 70 then delivers pulses to its output terminals C7 to C14 in a predetermined order, with consequence that transistors 89 to 96 which are used to drive the stepping motor are repeatedly turned on/off in a predetermined order, thus driving the stepping motor 10 in the direction of the arrow C. The timer is then examined to see if it has timed out, and if not, CPU 70 monitors ON/OFF condition of the switch SW1 which is input to its input terminal C18. If it is ON, it is determined that the operation is in the process of the upward movement of the mirror. The number of pulses applied to the stepping motor 50 is then examined, and if it has not reached a predetermined number, the program returns to a step which again examines the $t_1$ msec timer. If the condition of the switch SW1 changes from ON to OFF during the time the loop operation is repeated, it is determined that the upward movement of the mirror has been completed, and an accordingly "L" level is placed on the output terminal C4 to turn the motor 1 OFF, followed by placing an "L" level on the output terminal C3 to turn transistor 85 ON, thus applying a rapid braking action to the motor 1 by short-circuiting it.

Subsequently, the stepping motor continues to be driven until the number of pulses reaches a predetermined value, whereupon the motor 50 is turned OFF. A 30 msec timer is started, and when it times out, the motor 1 is turned OFF. The purpose of this timer is to secure a braking time interval for the motor 1. The $t_1$ msec timer is then reset, and the present sequence is completed.

If the number of pulses applied to the stepping motor 50 reaches a predetermined number during the repetition of the loop including the examination of the $t_1$ msec timer, the ON/OFF of the switch SW1 and the number of pulses to the motor 50, it is determined that the diaphragm controlling operation has been completed, and hence the stepping motor 50 is turned OFF. Then the $t_1$ msec timer is examined to see if it has timed out and if not, the ON/OFF condition of the switch SW1 is monitored, repeating the above loop until it changes from ON to OFF. Upon changing to OFF, the motor 1 is turned OFF to brake the motor 1 rapidly, and the operation proceeds to the step of the 30 msec timer.

On the other hand, if the $t_1$ msec timer has timed out during the repetition of the above described loop, it is determined that degradation in the performance of the storage battery prevents a normal operation. Accoridngly, the motor 50 is turned OFF, allowing only the motor 1 to rotate. The A flag is set in order to select the sequential drive for the following mirror drive/diaphragm controlling sequence. Then the switch SW1 is examined to see if it is ON or OFF, and upon completion of the upward movement of the mirror, the motor 1 is turned OFF and then braked rapidly. Subsequently, CPU 70 delivers pulses to its output terminals C7 to C14 in a predetermined order in order to allow the stepping motor 50 to rotate in the direction of the arrow D. CPU 70 then monitors the ON/OFF condition of the switch SW6 which is inputted to its input terminal C16, and at the same time, when the diaphragm assumes an open condition and the switch SW6 changes from OFF to ON (as will be described later), the motor 50 is turned OFF, and the stepping motor 50 begins to be driven again in the direction of the arrow C, thus transferring to the examination to see if the predetermined number of pulses have been applied to the motor 50. If the $t_1$ msec timer times out in the loop which examines the time-out of this timer and ON/OFF condition of the switch SW1, it is determined that the both motors fail to operate normally due to a degradation in the performance of the storage battery, and the program proceeds to a step where the A flag is set.

On the other hand, if the A flag is set when starting the motor 1 to its ON condition, because the sequential drive was selected during the previous photographing operation, the motor 50 begins to be driven upon completion of driving the motor 1 at the step where the ON/OFF condition of the switch SW1 is examined and the motor 1 is turned OFF and braked, and the program proceeds to examining the number of pulses applied to the motor 50, thus executing the sequential drive.

The mirror down/shutter charging/diaphragm opening sequence will now be described in detail. Considering the operation of the mechanism initially, as the diaphragm unit within the lens barrel is controlled to a given aperture, the stepping motor 50 (see FIG. 19) is driven for rotation in the direction of the arrow D, whereby the diaphragm control member 53 rotates in the direction of the arrow B to open the diaphragm blades 52. When the pin 60 on the member 53 abuts against the stop 54a on the C-ring 54, the diaphragm open switch SW6 changes from OFF to ON, whereupon CPU 70 detects that the diaphragm is open.

On the other hand, when the mirror assumes its up position, the motor 1 is rotated clockwise again, whereby the output gear 2 and the gears 3, 4, 5 and 6 rotate in the respective directions indicated by associated arrows, whereby the mirror 15 moves down and the shutter 13 begins to be charged.

The described mechanism is operated according to a sequence shown by a flow chart of FIG. 32. Initially, CPU 70 delivers pulses to its output terminals C7 to C14 in a predetermined order so that the stepping motor 50 may be driven for rotation in the direction of the arrow D. The A flag is examined to see if the sequential drive was selected during the previous pass. If the A flag is not set, the motor 1 is turned ON, thus concurrently driving the motors 1 and 50. Upon detection of the open diaphragm condition, the motor 50 is turned OFF to complete the present sequence. It is to be noted that because the length of time required to complete the mirror down/shutter charging operation is greater than the length of time required for the diaphragm opening operation, the mirror down/shutter charging operation is under way when the diaphragm opening operation is completed.

On the other hand, if the A flag is set due to a degradation of the storage battery, the switch SW6 is examined, and after turning the motor 50 OFF to terminate the diaphragm opening operation, the motor 1 is turned ON, thus executing the sequential drive which initiates the downward movement of the mirror and the shutter charging operation.

The mirror down/shutter charging/film winding sequence will now be described in detail. Considering the operation of the mechanism initially, the film winding motor 20 is rotated clockwise. This causes the output gear 21, the gears 22, 23, 24, 25 and 26a and the spool 26 to rotate in the respective directions indicated by associated arrows. As a consequence, the film 31 is taken up on the spool 26, and the follower sprocket shaft 27 rotates in the direction indicated by the associated arrow as the film 31 runs. The rotation of the sprocket shaft 27 causes the gear 28 to rotate in the direction of the arrow, whereby the conductive contact 29 slides along the substrate 30, thus repeatedly making and braking the circuit between the conductive patterns 30a and 30b as the film 31 runs. This allows CPU 70 to detect the film feed. When the number of pulses, developed by the making and braking of the conduction between the conductive patterns 30a and 30b, reaches a value which corresponds to one film frame, CPU 70 ceases to rotate the motor 20, thus completing the film winding operation. Because the conductive contact 7 is connected to the conductive pattern 8b on the substrate 8 upon completion of the charging operation of the shutter 13 which is achieved by the rotation of the motor 1, CPU 70 ceases to rotate the motor 1. When both motors 1, 20 come to a stop, a series of photographing operations for one frame is completed, and the camera is ready to initiate another series of photographing operations for the next frame.

The described mechanism is operated according to a sequence which is shown by the flow chart of FIG. 33. Briefly, the mirror driving and shutter charging motor 1 and the film winding motor 20 are set in motion simultaneously, and the length of time from the starting of the motor 20 is determined. If the shutter charging operation or the film winding operation is completed within a given time interval ($t_2$ msec), it is possible to determine that there is no degradation in the performance of the storage battery and there is no excessive film loading, and consequently the operational sequence is continued. If neither the shutter charging operation nor the film winding operation is completed within the given time interval ($t_2$), it is determined that either the battery performance has been degraded or the film loading is excessively high. Accordingly, the motor 20 immediately ceases to be driven, and the motor 1 first and then the motor 20 are sequentially driven to reduce the loading upon the battery in order to minimize the voltage fall while enabling the camera to be driven. Upon transferring to the sequence in which the sequential drive is employed, the B flag (a flag which is used to select the sequential drive in the next following sequence, either the shutter charging or the film winding sequence) is set. If the B flag is set when the program indicated by this flow chart is to be executed, the motors 1 and 20 are sequentially driven from the beginning.

The flow chart shown in FIG. 33 will be described in detail. Initially, CPU 70 initializes a count in a pulse counter associated with the switch SW2, and then starts the counting operation. It is to be understood that this counter is designed to be incremented to its full count when a number of pulses corresponding to one film frame are input thereto. The B flag is then examined, and if it is not set, CPU 70 places an "H" level on its output terminal C6 to turn transistor 88 ON, thus turning the motor 20 ON. The $t_2$ msec timer is then started. This timer is monitored to see if it has timed out, and if not CPU 70 monitors the ON/OFF condition of the switch SW1 which is inputted through the input terminal C18. If it is OFF, it is determined that the downward movement of the mirror or the shutter charging operation is under way. CPU 70 then examines to see if the count in the pulse counter which counts the pulses from the switch SW2 which in turn is inputted through the input terminal C17 has reached a given number. If a given number is not reached, it is determined that the winding operation is under way, and the program returns to the examination of $t_2$ msec timer. While the operation in this loop is repeated, if the count reaches a given number, it is determined that a film winding for one frame has been completed. Accordingly, CPU 70 places an "L" level on its output terminal C6 to turn the motor 20 OFF, and then places an "L" level on its output terminal C5 to turn transistor 87 ON, thus braking the motor 20 by short-circuiting it.

It then monitors the ON/OFF condition of the switch SW1, and when the switch changes to ON, it determines that the downward movement of the mirror and the shutter charging operation have been completed. Hence CPU 70 turns the motor 1 OFF, followed by braking it. After the msec timer has timed out, both motors 1 and 20 are turned OFF. This timer secures a braking time for the motors 1 and 20. The $t_2$ msec timer is then reset to complete the present sequence.

During the repetition of the loop including the examination of the $t_2$ msec timer, the ON/OFF condition of the switch SW1 and the pulse counter associated therewith, if the switch SW1 initially changes from OFF to ON, it is determined that the downward movement of the mirror and the shutter charging operation have been completed. Thus, the motor 1 is turned OFF, and is then braked rapidly by short-circuiting it. The pulse counter associated with the switch SW2 is then monitored, and when it has reached its full count, the completion of the winding operation is determined, thus turning the motor 20 OFF and braking it, followed by 30 msec timer step.

During the repetition of the operation in the loop which includes the examintion of $t_2$ msec timer, the ON/OFF condition of the switch SW1 and the pulse counter associated with the switch SW2, when the $t_2$ msec timer has timed out, it is determined that there is either excessive degradation in the storage battery or an excessive film loading. Accordingly, the B flag which selects the sequential drive during the next following shutter charging/film winding sequence is set, temporarily turning the motor 20 OFF. The condition of the switch SW1 is then monitored, and when it changes from OFF to ON, the completion of the downward movement of the mirror and the shutter charging operation is determined. Thus the motor 1 is turned OFF and braked. The motor 20 is then turned ON to resume the winding operation, and the operation transfers to the examination of the pulse counter associated with the switch SW2.

When the B flag is set as a result of the choice of the sequential drive during the previous photographing operation, as the OFF/OFF condition of the switch SW1 is examined, the motor 20 begins to be driven upon termination of and braking the motor 1, and the sequential drive is executed in which the pulse counter associated with the switch SW2 is examined.

In the present embodiment, the A flag and the B flag may be reset when a power switch, not shown, is turned off or when the storage battery is changed.

In the present embodiment, a determination of whether or not to change the drive is independently performed in each of the mirror up/diaphragm controlling sequence and the mirror down/shutter charging/film winding sequence. However, it should be understood that if a switching to the sequential drive occurs in any one sequence such as the mirror up/diaphragm controlling sequence, the sequential drive may also be employed for any other subsequent sequence or sequences.

In addition, in the mirror up/diaphragm controlling sequence, the length of time required for the upward movement of the mirror may be determined and the length of time determined may be compared against a plurality of decision levels so that the subsequent drive may be chosen in accordance with a particular level without departing from the spirit and scope of the present invention.

What is claimed is:
1. A motor driven camera comprising:
 a first motor for performing a film winding operation;
 a second motor for performing a shutter charging operation;
 control means operable to switch between a concurrent drive mode in which said first and second motors are concurrently driven and a sequential drive mode in which said first and second motors are sequentially driven, the control means choosing the concurrent drive mode subsequent to the completion of a shutter operation;

means for detecting a film winding rate;

switching means for determining that the winding rate detected by the detecting means is below a given rate and for switching the control means to the sequential drive mode if the detected rate is below the given rate;

and sustaining means which is set in accordance with the switching operation of the switching means to maintain the control means in the sequential drive mode when it is set.

2. A motor driven camera according to claim 1 and including means for resetting said sustaining means including an operating switch, said means for resetting having a set state and a reset state whereby operation of said operating switch moves said means for resetting to said reset state and said means for resetting is operated to set said state responsive to selection of said sequential drive mode by said switching means, whereby photographic picture taking is conducted in the sequential drive mode once the sequential drive mode has been selected and said means for resetting is in said set state, unless said reset means is operated to said reset state after the camera has been switched to the sequential drive mode.

3. A motor driven camera according to claim 1 and further including a timer circuit which is set responsive to setting of said sustaining means, said timer circuit providing an output for resetting said sustaining means after expiration of a given time period, whereby picture taking is conducted in the sequential drive mode for a given period of time.

4. A motor driven camera comprising:

a first motor for performing a film winding operation;

a second motor for performing a shutter charging operation;

control means operable to switch between a concurrent drive mode in which said first and second motors are concurrently driven and a sequential drive mode in which said first and second motors are sequentially driven, the control means choosing the concurrent drive mode upon completion of a shutter operation;

means for detecting a film winding rate;

switching means for determining that a film winding rate detected by the detecting means is below a given rate and for switching the control means to the sequential drive mode if the detected rate is below the given rate;

and presetting means for choosing a first given rate for the given rate during the initial phase, for choosing a second given rate higher than the first given rate for the given rate as the winding rate becomes retarded below the first given rate and the switching means operates, and for choosing the first given rate for the given rate as the winding rate increases above the second given rate.

5. A motor driven camera according to claim 1 or 4 in which said means for detecting a film winding rate comprises pulse generating means which is driven in association with a film winding operation, the generating means determining whether pulses generate within a given time period or not.

6. A motor driven camera according to claim 5 in which the pulse generating means comprises a conductive contact which is adapted to rotate in synchronism with the rotation of a follower sprocket shaft having claws engageable with perforations in a film, and an annular conductive pattern formed on a substrate and including radially extending fingers at a given angular interval.

7. A motor driven camera comprising a first motor for performing a film winding operation;

a second motor for performing a shutter charging operation;

means for detecting the rotational speed of the second motor;

and control means for driving the second motor subsequent to the termination of a shutter operation and for concurrently driving the first motor also if an output from the detecting means is higher than a given value during the time the second motor is being driven, the control means beginning to drive the first motor subsequent to the termination of the drive of the second motor when an output from the detecting means is less than the given value.

8. A motor driven camera according to claim 7 in which the means for detecting the rotational speed of the second motor comprises means for generating pulses in interlocked relationship with this motor, and a timer which detects the period of such pulses.

9. A motor driven camera comprising:

a first motor for performing a film winding operation;

a second motor for performing at least the driving of a movable reflecting mirror which is associated with a viewfinder;

means for detecting the speed of at least one of the upward and downward movements of the mirror;

means for determining if the speed of movement detected by the detecting means is greater or not greater than a given speed;

and control means for choosing a concurrent drive mode in which said first and second motors are concurrently driven when the determining means determines that the speed of movement is higher than the given speed and for choosing a sequential drive mode in which said first and second motors are sequentially driven when the speed of movement is less than the given speed.

10. A motor driven camera according to claim 9 in which the means for detecting the speed of one of the upward and downward movements of the mirror comprises pulse generating means which is driven in interlocked relationship with the second motor, the speed of movement being detected in terms of the number of pulses or the width of pulse generated by the pulse generating means.

11. A motor driven camera comprising:

a first motor for driving a first operating mechanism;

a second motor for driving a second operating mechanism;

a power feeding circuit operable to switch between a concurrent drive state in which the first motor and the second motor are concurrently energized and a sequential drive state in which the first motor is energized, and the second motor is energized subsequent to the termination of the operation of the first motor, the power feeding circuit being responsive to an operation initiate signal to energize either the first motor or said first and second motors;

first and second motors detecting means for detecting the completion of operation of the first and the second operating mechanism and developing a corresponding output signal;

a power supply for feeding a drive current to the motor or motors through the power feeding circuit;

power feeding control means for detecting a voltage of the power supply over a time interval from the initiation of operation of the power feeding circuit until either the first or the second detecting means produces an output signal, for operating the power feeding circuit in the concurrent drive state when the detected voltage exceeds a given voltage value and for operating the power feeding circuit in the sequential drive state when the detected voltage is equal to or less than the give voltage value.

12. A motor driven circuit according to claim 11 in which the power feeding control means has plural thresholds for determining the voltage level, thereby imparting a hysteresis effect.

13. A motor driven camera comprising:
a first motor for driving a first operating mechanism;
a second motor for driving a second operating mechanism;
means responsive to an operation initiate signal to initiate the energization of the first and the second motor;
voltage detecting means for detecting the voltage of a power supply and developing a signal when the voltage of the power supply reduces to or below a given voltage value;
means responsive to a signal from the voltage detecting means to block the energization of the first motor;
termination detecting means for detecting the termination of operation of the second operating mechanism;
and means for disabling the blocking means responsive to the detection of the termination of operation by said termination detecting means.

14. A motor driven camera according to claim 13 in which the control means comprises a central processing unit, and a signal indicating a reduction in the voltage is supplied to an interrupt input terminal of the processing unit, whereby a switching whether or not to energize the first motor is determined by such interrupt.

15. A motor driven camera according to claim 11 or 13 in which the first operating mechanism comprises a diaphragm mechanism and a first motor comprises a stepping motor which drives the diaphragm mechanism, and the second operating mechanism comprises a combination of a shutter charging mechanism and a movable reflecting mirror drive mechanism and the second motor comprises a DC motor which drives the mirror and the shutter charging operation.

16. A motor driven camera according to claim 11 or 13 in which the first operating mechanism comprises a combination of a shutter charging and a movable reflecting mirror drive mechanism and the first motor comprises a DC motor which drives the mirror and the shutter charging operation, and the second operating mechanism comprises a film winding mechanism and the second motor comprises a DC motor which drives the film winding mechanism.

17. A motor driven camera comprising:
a first motor for driving a first operating mechanism;
a second motor for driving a second operating mechanism;
control means for controlling the drive of the first and the second motor;
decision means for comparing the voltage of a power supply which is connected to said first and second motors against a given value and for delivering a reduced voltage signal whenever the voltage of the power supply is equal to or less than the given value;
wherein the decision means has a threshold greater than the given value, the decision means producing a concurrent drive mode signal when the detected voltage of the power supply is higher than the threshold and producing a sequential drive mode signal when the detected voltage of the power supply is intermediate between the given value and the threshold, the control means being responsive to the concurrent drive mode signal to establish a concurrent drive mode in which the first and second motors are concurrently driven, the control means being responsive to the sequential drive mode signal to establish a sequential drive mode in which the first motor is initially driven and the second motor is then driven subsequent to the termination of the driving of the first motor.

18. A motor driven camera comprising:
a first motor for driving a first operating mechanism;
a second motor for driving a second operating mechanism;
motor control means including a concurrent drive mode in which said first and second motors are concurrently driven and a sequential drive mode in which only the first motor is initially driven and the second motor is driven subsequent to the termination of the drive of the first motor, the motor control means being responsive to a drive initiate signal to choose the concurrent drive mode;
timer means for determining a given length of time from the initiation of operation of the motor control means and producing an output after such length of time;
and decision means responsive to an output from the timer means to compare the voltage of a power supply against a threshold, the decision means producing a switching signal to the motor control means which causes the sequential drive mode to be chosen when the voltage of the power supply is equal to or less than the threshold.

19. A motor driven camera according to claim 17 or 18 in which the first operating mechanism comprises a diaphragm mechanism and a first motor comprises a stepping motor which drives the diaphragm mechanism, and the second operating mechanism comprises a combination of a shutter charging mechanism and a movable reflecting mirror drive mechanism and the second motor comprises a DC motor which drives the motor and the shutter charging operation.

20. A motor driven camera according to claim 17 or 18 in which the first operating mechanism comprises a combination of a shutter charging and a movable reflecting mirror drive mechanism and the first motor comprises a DC motor which drives the mirror and the shutter charging operation, and the second operating mechanism comprises a film winding mechanism and the second motor comprises a DC motor which drives the film winding mechanism.

21. A method of controlling a motor driven camera including a first motor for driving a first operating mechanism, a second motor for driving a second operating mechanism, motor control means having three modes including a concurrent drive mode in which said first and second motors are concurrently driven, a first motor drive mode in which only the first motor is driven and a second motor drive mode in which only the second motor is driven, and detecting mechanism for detecting the completion of operation of the first operating mechanism; comprising the steps of comparing the voltage of a power supply against a given voltage value;

choosing the concurrent drive mode when the voltage compared is equal to or above the given value and choosing the first motor drive mode when the compared voltage is equal to or less than the given value;

repeating the comparing step and the choosing step;

and terminating the repeating step and transferring to the execution of the second motor drive mode.

22. A motor control apparatus for camera comprising a first motor for operating a first mechanism within a camera, a second motor for operating a second mechanism, and switching means operable to switch between a first sequence in which the first motors and second motors are concurrently operated and a second sequence in which the first and second motors are operated in the time sequence, the switching means switching between the first and the second sequences in accordance with given threshold levels, the threshold levels being effective to impart a hysteresis response.

23. A motor driven camera comprising:

a plurality of motors, each for driving respective actuating means of a camera;

a motor drive circuit for feeding a power from a storage battery to said plurality of motors;

and control means for delivering a control signal to the motor drive circuit for controlling a drive sequence of said plurality of motors;

wherein at least one of the actuating means includes detecting means which detects the termination of its operation, the control means including timer means which determines a length of time from the initiation of energization of the motor which drives the actuating means, the control means choosing a drive sequence in which a particular combination of said plurality of motors are concurrently driven when the length of time until the signal indicating the termination is supplied is less than a given value, the control means choosing a drive sequence in which motors in the particular combination are sequentially driven when the length of time is longer than the given value; and sustaining means for sustaining the drive sequence in which the motors are driven in a time sequence whenever it is chosen.

24. A motor control apparatus for camera comprising a control circuit having a first sequence in which a first mechanism within a camera is operated by a motor, a second sequence in which a second mechanism is operated by a motor, and a third sequence in which a third mechanism is operated by a motor, the control circuit being operative to activate the third sequence initially in response to the depression of a release button, followed by the activation of the first sequence and the second sequence either concurrently or in a time sequence, the control circuit including switching means which switches the first and second sequences between a concurrent activation and an activation in a time sequence in accordance with the operating condition of the third sequence.

25. A motor control apparatus for camera according to claim 24 in which the control circuit includes sustaining means which sustains the activation in a time sequence whenever it is chosen.

26. A motor driven camera comprising a plurality of motors, each for driving a plurality of actuating means within a camera;

a drive circuit for driving said plurality of motors;

a sequence control circuit for controlling said plurality of motors;

a power supply for feeding power to said plurality of motors;

and voltage comparison circuit for comparing the voltage of the power supply against one or more voltage levels and for delivering a result of comparison to the sequence control circuit, the sequence control circuit including two or more drive sequences for said plurality of motors, a particular one of the sequences being chosen in accordance with an output from the voltage comparison circuit.

27. A motor driven camera comprising:

a first motor for driving a first operating mechanism;

a second motor for driving a second operating mechanism;

a power feeding circuit operable to switch between a concurrent drive in which the first and the second motor are concurrently energized and a sequential drive in which the first motor is energized, and the second motor is energized subsequent to the termination of the operation of the first motor, the power feeding circuit responsive to an operation initiate signal to energize either the first motor or the both motors;

first and second detecting means for detecting the completion of operation of the first and the second operating mechanism and developing a corresponding output signal;

a power supply for feeding a drive current to the motor or motors through the power feeding circuit;

power feeding control means for detecting a voltage of the power supply over a time interval from the initiation of operation of the power feeding circuit until either the first or the second detecting means produces an output signal, for switching the power feeding circuit to the concurrent drive when the detected voltage exceeds a given voltage value and for switching the power feeding circuit to the sequential drive when the detected voltage is equal to or less than the given voltage value.

28. A motor driven camera according to claim 27 in which a first decision voltage is used when switching from the concurrent drive to the sequential drive and a second decision voltage, which is by a given value greater than the first decision voltage, is used when switching from the sequential drive to the concurrent drive, thus providing a hysteresis effect in the switching operation.

29. A motor driven camera comprising:

a first motor for driving a first operating mechanism;

a second motor for driving a second operating mechanism;

a power feeding circuit operable to switch between a concurrent drive in which the first and the second motor are concurrently energized and a sequential drive in which the first motor is energized, and the second motor is energized subsequent to the termination of the operation of the first motor, the power feeding circuit responsive to an operation initiate signal to energize either the first motor or the both motors;

first and second detecting means for detecting the completion of operation of the first and the second operating mechanism and developing a corresponding output signal;

a power supply for feeding a drive current to the motor or motors through the power feeding circuit;

power feeding control means for detecting a voltage of the power supply over a time interval from the initiation of operation of the power feeding circuit until either the first or the second detecting means produces an output signal, for switching the power feeding circuit to the sequential drive when the detected voltage is equal to or less than the given voltage value.

30. A motor driven camera according to claim 29, further including sustaining means for sustaining the sequential drive for subsequent sequence or sequences after the feeding control means has switched to the sequential drive.

31. A motor driven camera comprising:
a first motor for driving a first operating mechanism;
a second motor for driving a second operating mechanism;
a power feeding circuit operable to switch between a concurrent drive mode in which the first motor and the second motor are concurrently energized and a sequential drive mode in which the first motor is energized, and the second motor is energized subsequent to the termination of the operation of the first motor, the power feeding circuit being responsive to an operation initiate signal to energize either said first motor or said first and second motors;
first and second detecting means for respectively detecting the completion of operation of the first and the second operating mechanism and developing a corresponding output signal;
a power supply for feeding a drive current to the motor or motors through the power feeding circuit;
power feeding control means for detecting a particular condition within said camera for operating the power feeding circuit in the concurrent drive mode when the monitor condition reaches a predetermined state and for operating the power feeding circuit in the sequential drive mode when the monitor condition has not yet reached said predetermined state; and
means for maintaining said sequential drive mode for subsequent camera operations responsive to initiation of said sequential drive mode.

32. A motor driven camera according to claim 31 wherein the monitored condition is the power supply voltage.

33. A motor driven camera comprising:
a first motor for driving a first operating mechanism;
a second motor for driving a second operating mechanism;
a power feeding circuit operable to switch between a concurrent drive mode in which the first motor and the second motor are concurrently energized and a sequential drive mode in which the first motor is energized, and the second motor is energized subsequent to the termination of the operation of the first motor, the power feeding circuit being responsive to an operation initiate signal to energize either said first motor or said first and second motors;
first and second detecting means for respectively detecting the completion of operation of the first and the second operating mechanism and developing a corresponding output signal;
a power supply for feeding a drive current to the motor or motors through the power feeding circuit;
power feeding control means for detecting a particular condition within said camera for operating the power feeding circuit in the concurrent drive mode when the monitor condition reaches a predetermined state and for operating the power feeding circuit in the sequential drive mode when the monitor condition has not yet reached said predetermined state, wherein the monitored condition is the rate of a film winding operation.

34. A motor driven camera comprising:
a first motor for driving a first operating mechanism;
a second motor for driving a second operating mechanism;
a power feeding circuit operable to switch between a concurrent drive mode in which the first motor and the second motor are concurrently energized and a sequential drive mode in which the first motor is energized, and the second motor is energized subsequent to the termination of the operation of the first motor, the power feeding circuit being responsive to an operation initiate signal to energize either said first motor or said first and second motors;
first and second detecting means for respectively detecting the completion of operation of the first and the second operating mechanism and developing a corresponding output signal;
a power supply for feeding a drive current to the motor or motors through the power feeding circuit;
power feeding control means for detecting a particular condition within said camera for operating the power feeding circuit in the concurrent drive mode when the monitor condition reaches a predetermined state and for operating the power feeding circuit in the sequential drive mode when the monitor condition has not yet reached said predetermined state, wherein the monitored condition is ambient temperature.

35. A motor driven camera comprising:
a first motor for driving a first operating mechanism;
a second motor for driving a second operating mechanism;
a power feeding circuit operable to switch between a concurrent drive mode in which the first motor and the second motor are concurrently energized and a sequential drive mode in which the first motor is energized, and the second motor is energized subsequent to the termination of the operation of the first motor, the power feeding circuit being responsive to an operation initiate signal to energize either said first motor or said first and second motors;
first and second detecting means for respectively detecting the completion of operation of the first and the second operating mechanism and developing a corresponding output signal;

a power supply for feeding a drive current to the motor or motors through the power feeding circuit;

power feeding control means for detecting a particular condition within said camera for operating the power feeding circuit in the concurrent drive mode when the monitor condition reaches a predetermined state and for operating the power feeding circuit in the sequential drive mode when the monitor condition has not yet reached said predetermined state wherein the monitored condition is the rate of movement of a movable mirror.

* * * * *

UNITED STATES PATENT AND TRADEMARK OFFICE
CERTIFICATE OF CORRECTION

PATENT NO. : 4,958,175
DATED : September 18, 1990
INVENTOR(S) : Asakura et al.

It is certified that error appears in the above-identified patent and that said Letters Patent is hereby corrected as shown below:

Column 18, line 27, "tight" should be --light--
Column 22, line 11, "$\alpha AV$" should be --$\Delta AV$--
Column 24, line 38, delete "25"
Column 29, line 3, "an accordingly" should be
  --accordingly an--
Column 29, lines 32-33, "Accoridngly" should be
  --Accordingly--
Column 32, line 15, "examintion" should be
  --examination--
Column 32, line 34, "OFF/OFF" should be --OFF/ON--
Column 32, line 36, after "of" insert --driving--
Column 32, line 36, after "braking" insert --of--
Column 35, line 13, "give" should be --given--

Signed and Sealed this

Twenty-first Day of April, 1992

Attest:

HARRY F. MANBECK, JR.

*Attesting Officer*   *Commissioner of Patents and Trademarks*